(12) United States Patent
Matsushima et al.

(10) Patent No.: US 7,961,276 B2
(45) Date of Patent: Jun. 14, 2011

(54) CIRCULAR POLARIZER, LIQUID CRYSTAL DISPLAY DEVICE, AND TERMINAL DEVICE

(75) Inventors: Jin Matsushima, Tokyo (JP); Ken Sumiyoshi, Tokyo (JP); Shin-Ichi Uehara, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 179 days.

(21) Appl. No.: 11/779,298

(22) Filed: Jul. 18, 2007

(65) Prior Publication Data

US 2008/0018834 A1      Jan. 24, 2008

(30) Foreign Application Priority Data

Jul. 18, 2006   (JP) ................................. 2006-196115

(51) Int. Cl.
G02F 1/1335     (2006.01)

(52) U.S. Cl. ........................... 349/98; 349/118; 349/120

(58) Field of Classification Search .................... 349/98, 349/117–120, 75
See application file for complete search history.

(56) References Cited

U.S. PATENT DOCUMENTS

| | | | | |
|---|---|---|---|---|
| 5,493,431 A * | 2/1996 | Baba et al. ..................... | 349/117 |
| 5,940,155 A * | 8/1999 | Yang et al. ..................... | 349/120 |
| 6,295,109 B1 * | 9/2001 | Kubo et al. .................... | 349/119 |
| 6,606,193 B2 * | 8/2003 | Umemoto ...................... | 359/497 |
| 7,250,200 B2 * | 7/2007 | Elman ............................. | 428/1.3 |
| 2004/0032547 A1 * | 2/2004 | Yano et al. ..................... | 349/96 |
| 2005/0231660 A1 * | 10/2005 | Fujita et al. .................... | 349/98 |
| 2005/0270458 A1 * | 12/2005 | Ishikawa et al. ............... | 349/118 |

FOREIGN PATENT DOCUMENTS

JP         2000-035570       2/2000

OTHER PUBLICATIONS

Jisaki et al., "Development of transflective LCD for high contrast and wide viewing angle by using homeotropic alignment," Asia Display, IDW '01, No. LCT8-3, pp. 133-136 (2001).

* cited by examiner

*Primary Examiner* — Mark A Robinson
*Assistant Examiner* — Robert Tavlykaev
(74) *Attorney, Agent, or Firm* — Young & Thompson

(57) ABSTRACT

In the liquid crystal display device of the present invention, a circular polarizer is provided to each of a pair of substrates that hold a liquid crystal layer, wherein the circular polarizer on the display surface side is composed of a polarizer, λ/2 plate in which Rth>0, and a λ/4 plate in which Rth<0; and the circular polarizer on the backlight side is composed of a polarizer, a λ/2 plate in which Rth<0, and a λ/4 plate in which Rth>0. Rth is a retardation in the thickness direction of a λ/2 plate or a λ/4 plate. A reduction is achieved in the absolute value of the sum of the Rth between the λ/2 plate for which Rth>0 and the λ/2 plate for which Rth<0, and in the absolute value of the sum of the Rth between the λ/4 plate for which Rth<0 and the λ/4 plate for which Rth>0. A circular polarizer having excellent wavelength characteristics and excellent viewing angle characteristics when viewed at an angle is thereby obtained, and a liquid crystal display device and a terminal device that use the circular polarizer are obtained.

23 Claims, 33 Drawing Sheets

FIG. 1 (RELATED ART)
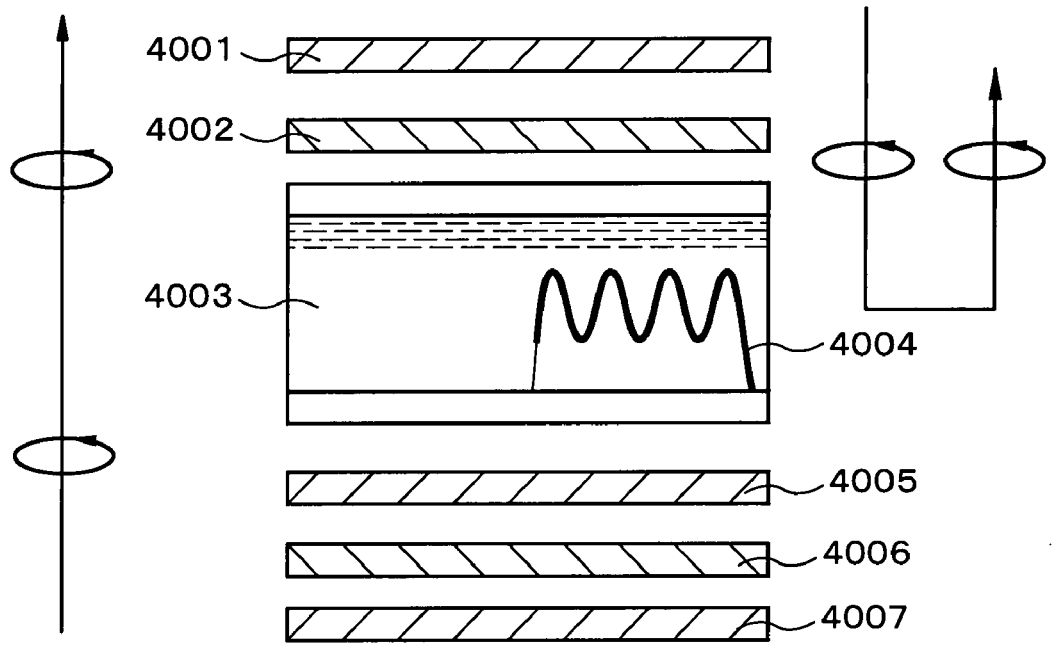
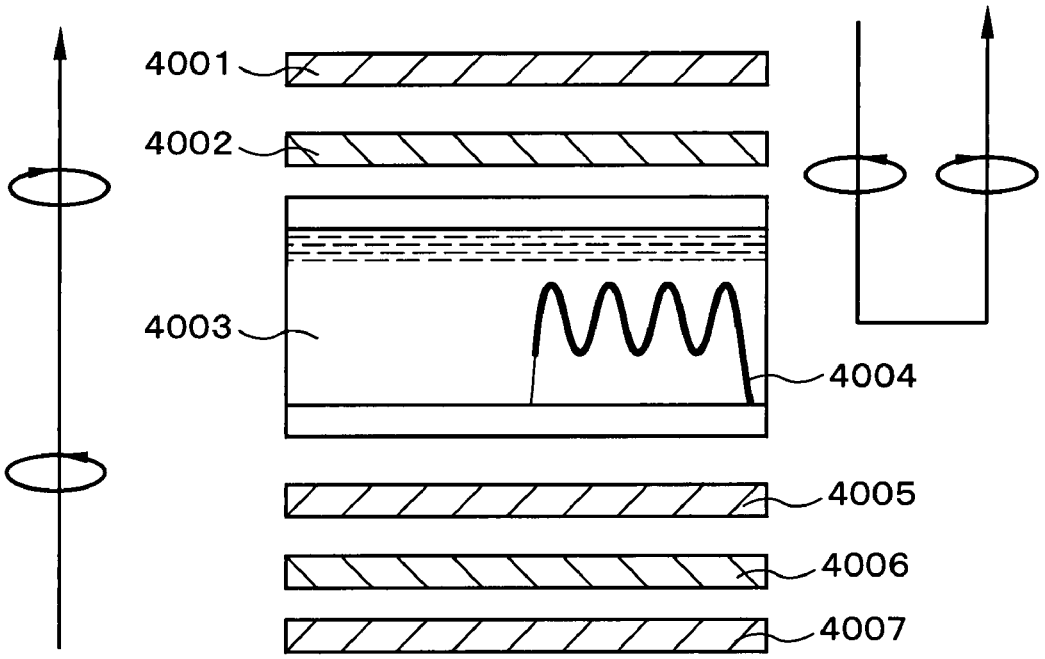

FIG. 2 (BACKGROUND ART)

| 2006. POLARIZER |||
|---|---|---|
| 2011. λ/2 PLATE |||
| 2007. λ/4 PLATE |||
| 2002. SUBSTRATE |||
| 2004. OPPOSING ERECTRODE |||
| 2005. LC LAYER (VERTICAL ALIGNMENT) |||
| 2003. REFLECTION ELECTRODE | 2008. TRANSMISSION ELECTRODE ||
| 2001. SUBSTRATE |||
| 2010. λ/4 PLATE |||
| 2012 λ/2 PLATE |||
| 2009. POLARIZER |||

FIG. 4
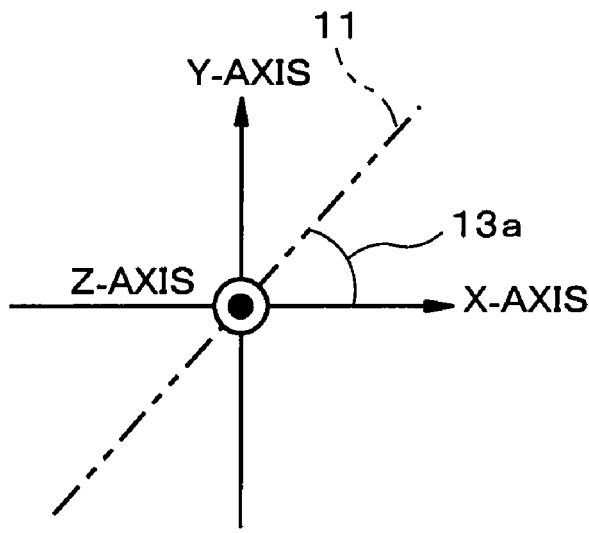
(a)
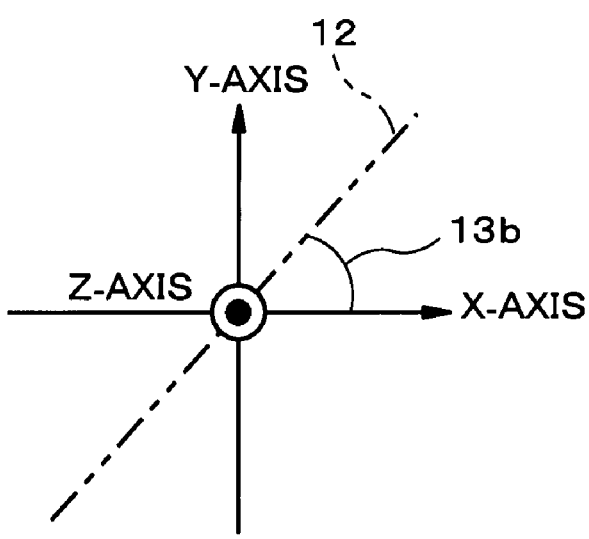
(b)

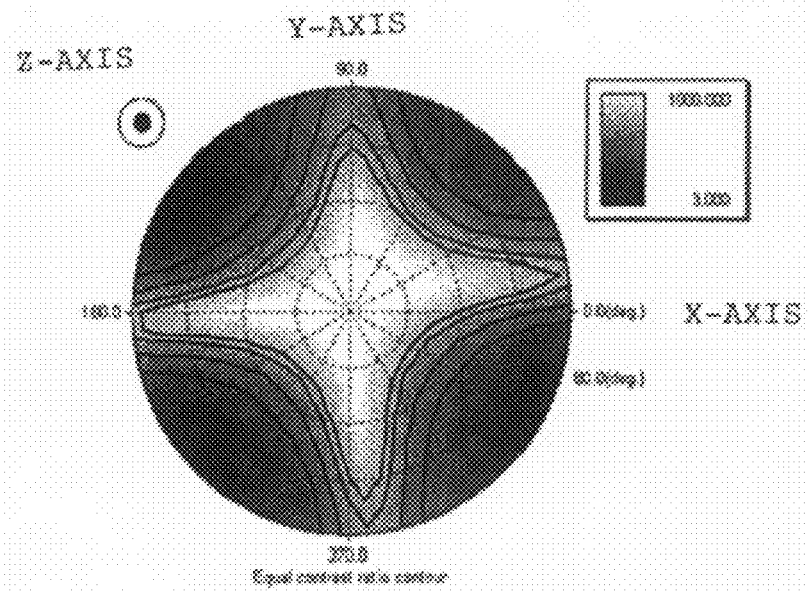
EQUAL CONTRAST CURVES FOR CONTRASTS OF
300, 200, 100, 50, AND 10 FROM THE INSIDE
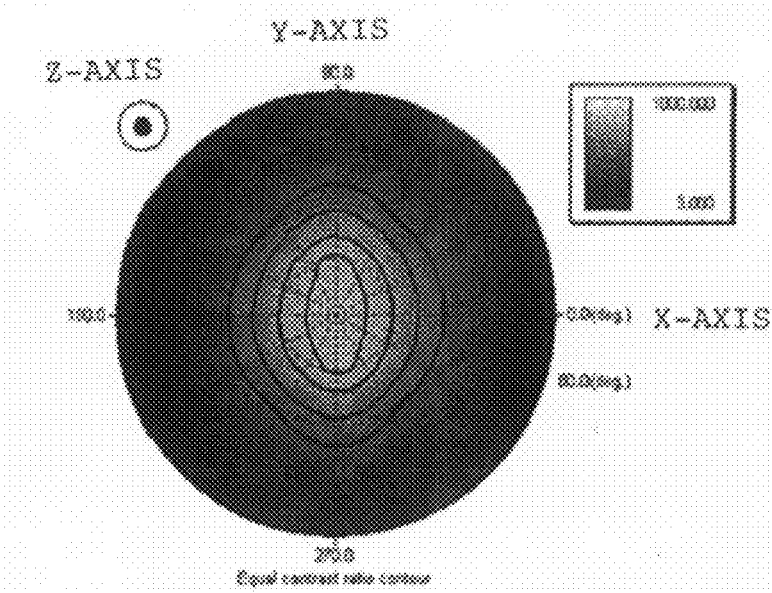
EQUAL CONTRAST CURVES FOR CONTRASTS OF
300, 200, 100, 50, AND 10 FROM THE INSIDE

EQUAL CONTRAST CURVES FOR CONTRASTS OF
300, 200, 100, 50, AND 10 FROM THE INSIDE

EQUAL CONTRAST CURVES FOR CONTRASTS OF
300, 200, 100, 50, AND 10 FROM THE INSIDE

FIG.13
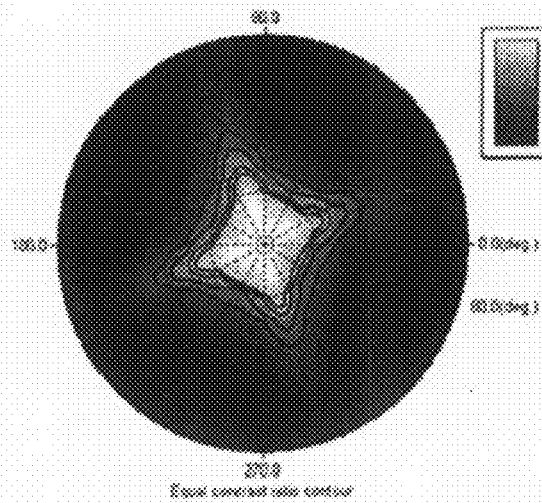
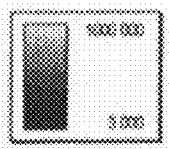
EQUAL CONTRAST CURVES FOR CONTRASTS OF
300, 200, 100, 50, AND 10 FROM THE INSIDE
FIG.14
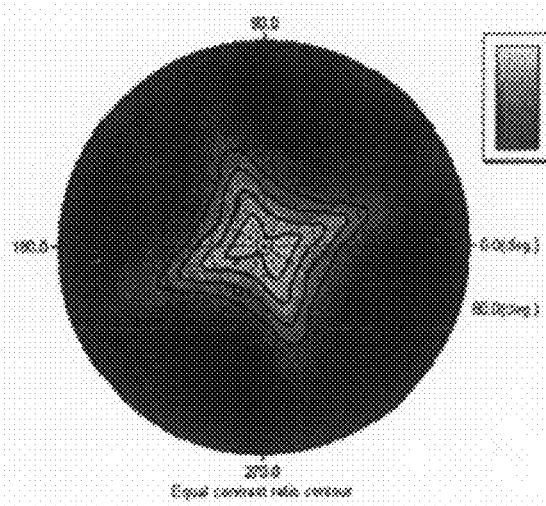
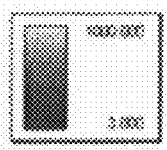
EQUAL CONTRAST CURVES FOR CONTRASTS OF
300, 200, 100, 50, AND 10 FROM THE INSIDE

EQUAL CONTRAST CURVES FOR CONTRASTS OF
300, 200, 100, 50, AND 10 FROM THE INSIDE

EQUAL CONTRAST CURVES FOR CONTRASTS OF
300, 200, 100, 50, AND 10 FROM THE INSIDE

EQUAL CONTRAST CURVES FOR CONTRASTS OF
300, 200, 100, 50, AND 10 FROM THE INSIDE

EQUAL CONTRAST CURVES FOR CONTRASTS OF
300, 200, 100, 50, AND 10 FROM THE INSIDE

EQUAL CONTRAST CURVES FOR CONTRASTS OF
300, 200, 100, 50, AND 10 FROM THE INSIDE

EQUAL CONTRAST CURVES FOR CONTRASTS OF
300, 200, 100, 50, AND 10 FROM THE INSIDE

EQUAL CONTRAST CURVES FOR CONTRASTS OF
300, 200, 100, 50, AND 10 FROM THE INSIDE

EQUAL CONTRAST CURVES FOR CONTRASTS OF
300, 200, 100, 50, AND 10 FROM THE INSIDE

EQUAL CONTRAST CURVES FOR CONTRASTS OF
300, 200, 100, 50, AND 10 FROM THE INSIDE

EQUAL CONTRAST CURVES FOR CONTRASTS OF
300, 200, 100, 50, AND 10 FROM THE INSIDE

EQUAL CONTRAST CURVES FOR CONTRASTS OF
300, 200, 100, 50, AND 10 FROM THE INSIDE

EQUAL CONTRAST CURVES FOR CONTRASTS OF
300, 200, 100, 50, AND 10 FROM THE INSIDE

FIG.27
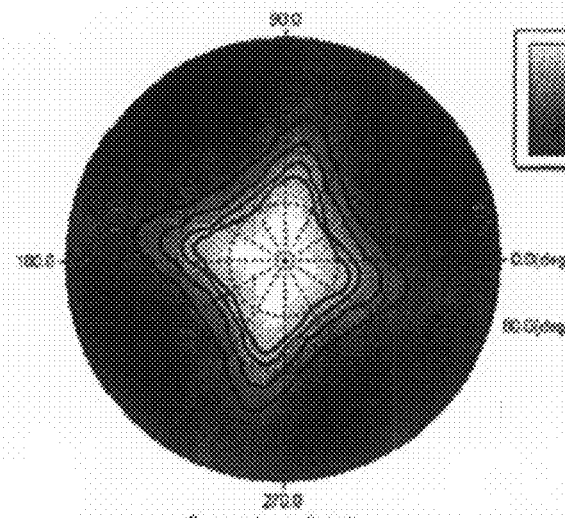
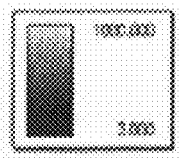
EQUAL CONTRAST CURVES FOR CONTRASTS OF
300, 200, 100, 50, AND 10 FROM THE INSIDE
FIG.28
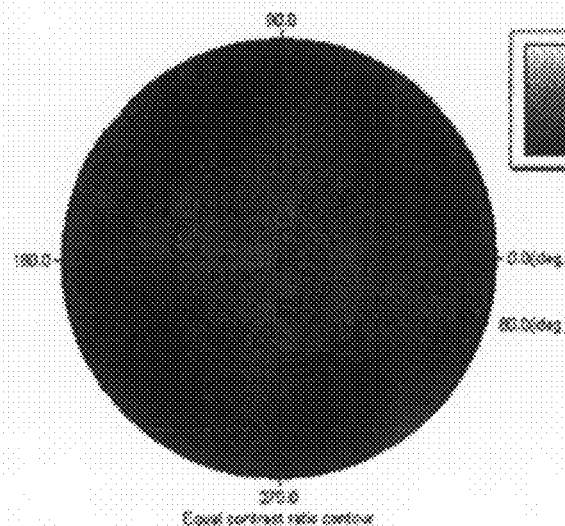
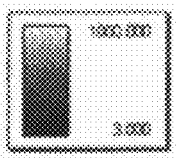
EQUAL CONTRAST CURVES FOR CONTRASTS OF
300, 200, 100, 50, AND 10 FROM THE INSIDE

EQUAL CONTRAST CURVES FOR CONTRASTS OF
300, 200, 100, 50, AND 10 FROM THE INSIDE

EQUAL CONTRAST CURVES FOR CONTRASTS OF
300, 200, 100, 50, AND 10 FROM THE INSIDE

EQUAL CONTRAST CURVES FOR CONTRASTS OF
300, 200, 100, 50, AND 10 FROM THE INSIDE

EQUAL CONTRAST CURVES FOR CONTRASTS OF
300, 200, 100, 50, AND 10 FROM THE INSIDE

CIRCULAR POLARIZER, LIQUID CRYSTAL DISPLAY DEVICE, AND TERMINAL DEVICE

BACKGROUND OF THE INVENTION

1. Field of the Invention

The present invention relates to a circular polarizer, and to a liquid crystal display device and a terminal device that use the circular polarizer, and particularly relates to a circular polarizer having excellent wavelength characteristics and excellent viewing angle characteristics when viewed at an angle, and to a liquid crystal display device and a terminal device that use the circular polarizer.

2. Description of the Related Art

Because of their thin profile, light weight, small size, low energy consumption, and other advantages, display devices that use liquid crystals have been widely deployed and used in a range of devices that includes monitors, televisions (TV: Television), and other large terminal devices; notebook-type personal computers, cash dispensers, vending machines, and other mid-sized terminal devices; and personal TVs, PDAs (Personal Digital Assistance: personal information terminal), mobile telephones, mobile gaming devices, and other small terminal devices. In the liquid crystal panel that is the primary component of a liquid crystal display device, information is displayed by using an electric field to control the orientation of liquid crystal molecules, and numerous modes have been proposed according to the combination of the type and initial orientation of the liquid crystal molecules, the direction of the electric field, and other characteristics. Among these modes, the modes most often used in a conventional terminal device include an STN (Super Twisted Nematic) mode using a simple matrix structure, and a TN (Twisted Nematic) mode using an active matrix structure. However, a liquid crystal panel that uses these modes has a narrow range of angles in which contrast ratios can be correctly distinguished, and grayscale inversion occurs outside the optimum viewing position.

This problem of grayscale inversion was relatively insignificant in mobile telephones and other terminal devices when the display content consisted mainly of telephone numbers and other characters. However, with recent technological development, terminal devices have come to display not only text information, but also large amounts of image information. The visibility of images is therefore severely reduced by grayscale inversion. Liquid crystal panels that use a mode having a wide range of angles at which contrast ratio can be correctly distinguished without the occurrence of grayscale inversion are therefore gradually being installed in terminal devices. Liquid crystal panels having this type of mode are referred to generically as wide-viewing-angle liquid crystal panels, and IPS (In-Plane Switching) modes and other horizontal field modes, multi-domain vertical alignment modes, and the like are applied therein.

Among the wide-viewing-angle modes, the multi-domain vertical alignment mode is a scheme that has domains in which the orientation directions compensate for each other in a vertical-alignment-mode liquid crystal panel in which a vertical alignment state exists when a voltage is not applied, and the liquid crystal molecules align parallel to the substrate boundary when a voltage is applied. Specifically, liquid crystal molecules that are oriented in a certain direction are optically compensated for by liquid crystal molecules of another domain that are aligned in a different direction, and the viewing angle is improved.

Although the liquid crystal molecules are oriented at an angle when a voltage is applied in this multi-domain vertical alignment mode, the effects of the angled liquid crystal molecules are optically compensated for, and the viewing angle is improved.

In contrast, in an IPS scheme or other horizontal field mode, the liquid crystal molecules are uniaxially oriented parallel to the substrate, and when a voltage is applied parallel to the substrate, the liquid crystal molecules rotate while maintaining a state parallel to the substrate. Specifically, since the liquid crystal molecules do not stand upright in relation to the substrate even when a voltage is applied, the advantage of a wide viewing angle is gained in principle.

In a display device that uses liquid crystals, the liquid crystal molecules as such do not emit light, and some type of light must therefore be used in order for the display to be visible. These liquid crystal display devices can be generally classified as transmissive, reflective, or semi-transmissive (using transmitted light and reflected light jointly) according to the type of light source used. Energy consumption can be reduced in the reflective type, since external light can be utilized in the display device, but contrast ratio and other aspects of display performance are inferior compared to the transmissive type. Therefore, transmissive and semi-transmissive liquid crystal display devices are currently in the mainstream. In transmissive and semi-transmissive liquid crystal display devices, a light source is installed on the back surface of a liquid crystal panel, and a display is created using the light emitted by the light source. In particular, medium-sized liquid crystal display devices are carried by a user and used under various conditions. Therefore, semi-transmissive liquid crystal display devices that have high visibility in any situation are used as such medium-sized devices as a result of the fact that the reflective display is visible in bright locations, and the transmissive display is visible in dark locations.

An ECB (Electrically Controlled Birefringence) mode or the aforementioned multi-domain vertical alignment mode having characteristics of high resolution and wide viewing angle has been used in the past in liquid crystal panels used in these semi-transmissive liquid crystal display devices.

FIG. 1 is a sectional view showing the vertical-alignment-mode semi-transmissive liquid crystal panel used in the first conventional liquid crystal display device described in AsiaDisplay/IDW01, p. 134. As shown in FIG. 1, in the vertical-alignment-mode semi-transmissive liquid crystal display device that is the first conventional example, a backlight 4007, a lower polarizer 4006, a lower λ/4 plate 4005, a liquid crystal layer 4003, an upper λ/4 plate 4002, and an upper polarizer 4001 are layered in sequence from the back side, and a reflecting plate 4004 is formed under the liquid crystal layer 4003 of the reflective display region. Since liquid crystals having negative dielectric anisotropy are vertically oriented in the liquid crystal layer, there is no refractive index anisotropy in the plane of the display when a voltage is not applied, and the liquid crystal layer is isotropic. The upper λ/4 plate 4002 and the lower λ/4 plate 4005 are also arranged so that the slow axes thereof are orthogonal to each other. An optical sheet in which a λ/4 plate and a polarizer that emits linearly polarized light are placed together so that the absorption axis of the polarizer and the low axis of the λ/4 plate are at a 45 degree angle in the manner of the present conventional example has the effect of emitting circularly polarized light. A polarizer that generates circularly polarized light in this manner is generally referred to as a circular polarizer, and is distinguished from a polarizer that emits linearly polarized light.

In the first conventional vertical-alignment-mode semi-transmissive liquid crystal panel thus configured as described in AsiaDisplay/IDW01, p. 134, light that passes through the upper polarizer 4001 enters the upper λ/4 plate 4002 as linearly polarized light, and is emitted as counterclockwise circular polarized light in the reflective display region in the off state in which a voltage is not applied. The light then enters the liquid crystal layer 4003, but since the liquid crystal layer does not have refractive index anisotropy in the plane of the display as previously mentioned, there is no change in the polarization state. Consequently, the light enters the reflecting plate 4004 without modification as counterclockwise circularly polarized light, is converted to clockwise circularly polarized light upon being reflected by the reflecting plate 4004, and enters the liquid crystal layer 4003. The light that passes as clockwise circularly polarized light through the liquid crystal layer 4003 without modification reenters the upper λ/4 plate 4002, and is converted to linearly polarized light, but since the light enters in a state of circular polarization in the opposite direction from when the light entered, the emitted light is linearly polarized light that is orthogonal to the incident light. The light that enters the upper polarizer 4001 is therefore absorbed by the polarizer. Specifically, the display turns black when a voltage is not applied in the reflective display part. However, when a voltage is applied, since the liquid crystal that was vertically aligned is no longer upright, and birefringence occurs in the display plane, the polarization state changes so that light is emitted, and the display turns white. Specifically, a normally black reflective display is created.

In the transmissive region in the off state in which a voltage is not applied, light emitted from the backlight 4007 that enters the lower polarizer 4006 becomes linearly polarized light, enters the lower λ/4 plate 4005, and enters the liquid crystal layer 4003 as clockwise circularly polarized light. As described above, the liquid crystal layer 4003 to which a voltage is not applied does not have optical anisotropy in the display plane, and the incident clockwise circularly polarized light is therefore emitted without modification from the liquid crystal layer 4003, and enters the upper λ/4 plate 4002. The light that enters the upper λ/4 plate 4002 is converted to linearly polarized light, but is absorbed by the upper polarizer 4001. Specifically, the display turns black when a voltage is not applied in the transmissive display part. However, when a voltage is applied, since the liquid crystal that was vertically aligned is no longer upright, and birefringence occurs in the display plane, the polarization state changes so that light is emitted, and the display turns white. Specifically, a normally black reflective display is created.

FIG. 2 is a schematic sectional diagram showing the vertical-alignment-mode semi-transmissive liquid crystal panel used in the second conventional liquid crystal display device described in Japanese Laid-open Patent Application No. 2000-035570. The circular polarizer in the first conventional liquid crystal display device was composed of a polarizer and a λ/4 plate, whereas the circular polarizer in the present conventional example is composed of a polarizer, a λ/2 plate, and a λ/4 plate. As shown in FIG. 2, in the vertical-alignment-mode semi-transmissive liquid crystal display device as the second conventional example, a polarizer 2009, a λ/2 plate 2012, a λ/4 plate 2010, a substrate 2001, a reflection electrode 2003 and a transmission electrode 2008, an LC layer (vertical alignment) 2005, an opposing electrode 2004, a substrate 2002, a λ/4 plate 2007, a λ/2 plate 2011, and a polarizer 2006 are layered in sequence from the back side. The slow axis of the λ/2 plate 2012 and the slow axis of the λ/2 plate 2011, and the slow axis of the λ/4 plate 2010 and the slow axis of the λ/4 plate 2007 are arranged orthogonally to each other, respectively. The LC layer is a liquid crystal layer.

In the first conventional liquid crystal display device, the circular polarizer was configured as a wavelength plate having a polarizer and a λ/4 plate. A wavelength plate is generally fabricated from a polymer film, wherein the refractive index anisotropy of the polymer film increases the shorter the wavelength, and decreases the longer the wavelength. Therefore, when the wavelength plate is set so as to be a λ/4 plate at 550 nm, for example, the wavelength plate does not function adequately as a λ/4 plate at wavelengths other than those near 550 nm, due to the wavelength dependency of the refractive index anisotropy of the λ/4 plate, light leakage occurs at wavelengths other than those near 550 nm in the reflective mode of a dark display, and an adequate black level is not obtained.

In the second conventional liquid crystal display device, since the circular polarizer is composed of a polarizer, a λ/2 plate, and a λ/4 plate, the wavelength dependency of the refractive index anisotropy that occurs when linearly polarized light is converted to circularly polarized light is cancelled out to a certain degree. The light can thereby be converted to circularly polarized light in the reflective mode in a state in which there is minimal fluctuation in the polarization state in a wide wavelength band of the visible light region. The contrast ratio of the reflective mode and the coloration of a dark display in the reflective mode can therefore be improved. A circular polarizer that is capable of circularly polarizing light in a state in which there is minimal fluctuation of the polarization state in a wide wavelength band is referred to as a broadband circular polarizer.

In the second conventional liquid crystal display device, the broadband circular polarizer was composed of a polarizer, a λ/2 plate, and a λ/4 plate, but according to Japanese Laid-open Patent Application No. 2000-35570, a broadband circular polarizer can be formed using a different configuration. For example, a polarizer and three λ/2 plates may be used, or a polarizer, two λ/2 plates, and a λ/4 plate may be used.

A circular polarizer is used not only in vertical-alignment-mode semi-transmissive liquid crystal panels, but also in multi-domain vertical-alignment-mode transmissive liquid crystal panels. When a linear polarizer is used in a multi-domain vertical alignment mode, regions in which liquid crystals lie down parallel or orthogonal to the absorption axis of the linear polarizer do not contribute to the transmittance. However, when a circular polarizer is used in a multi-domain vertical alignment mode, the liquid crystals contribute to the transmittance regardless of the direction in which the liquid crystals lie down, and the transmittance is increased.

However, the conventional techniques described above have such problems as the following.

Specifically, compared to a case in which a linear polarizer is used, a liquid crystal display device that uses the conventional circular polarizer has inferior viewing angle characteristics.

The cause of this problem will be described using an example in which the circular polarizer is composed of a polarizer and a λ/4 plate. The λ/4 plate in the circular polarizer is designed so as to act as a λ/4 plate with respect to light that enters from the direction normal to the surface of the λ/4 plate. Specifically, the λ/4 plate is designed so that the retardation Re of the in-plane direction is one-fourth of the wavelength. The retardation Re is determined by the thickness d of the λ/4 plate and the difference between the in-plane refractive indices nx, ny in the principal axis direction. As for light that is at an angle from the normal line, i.e., when the display is viewed from an angle, the retardation is not solely the Re determined by nx and ny, but is also affected by the refractive index nz of the principal axis in the thickness direction, and the increased optical path length due to the angle in relation to the normal line. Therefore, when the display is viewed at an angle, the λ/4 plate functions as a retardation plate that differs from the original λ/4 plate, and the combination of the polarizer and the λ/4 plate functions as an elliptical polarizer rather than a circular polarizer. Furthermore, a circular polarizer composed of one polarizer and a plurality of in-plane retardation plates is more significantly affected by the difference of the retardation when viewed at an angle than a circular polarizer that is composed of one polarizer and one in-plane retardation plate having retardation in the in-plane direction.

Since a linear polarizer is used in the transmissive liquid crystal display device, the viewing angle performance is superior to the viewing angle performance obtained when a circular polarizer is used. It was therefore impossible to enhance the viewing angle performance of a common transmissive liquid crystal display device beyond that of the transmissive display of the conventional semi-transmissive liquid crystal display device.

Furthermore, since the conventional broadband circular polarizer also had unsatisfactory viewing angle characteristics, the viewing angle performance of the reflective display of the semi-transmissive liquid crystal display device could not be enhanced beyond the viewing angle performance of the common transmissive liquid crystal display device.

SUMMARY OF THE INVENTION

An object of the present invention is to provide a circular polarizer that has excellent wavelength characteristics and excellent wide viewing-angle characteristics, and to provide a liquid crystal display device and a terminal device that use the circular polarizer.

The circular polarizer according to the present invention comprises a plurality of in-plane retardation plates having a retardation Re>0 in an in-plane direction when the retardation Re of an in-plane direction is as indicated by Equation 1 below:

$$Re=(nx-ny) \times d;\quad \text{[Equation 1]}$$

and a retardation Rth in a thickness direction is as indicated by Equation 2 below:

$$Rth=((nx+ny)/2-nz) \times d \quad \text{[Equation 2]}$$

(wherein nx is a refractive index in a direction in which a maximum refractive index occurs in a plane, ny is a refractive index in an in-plane direction orthogonal to the direction in which the maximum refractive index occurs, nz is a refractive index in a thickness direction, and d is a thickness); and a polarizer for polarizing incident light and then transmitting the light to the in-plane retardation plates, or receiving light that has passed through the in-plane retardation plates; wherein at least one of the in-plane retardation plates satisfies the relation Rth<0.

A retardation plate that has a retardation in the in-plane direction will be referred to hereinafter as an in-plane retardation plate. The in-plane retardation plates are composed of a film, for example, and the axis that is parallel to the direction of the maximum refractive index in the plane of the film is referred to as the slow axis. The circular polarizer of the present invention is composed of a polarizer and an in-plane retardation plate in which Re>0, and is formed, for example, by layering n in-plane retardation plates, wherein numbers i (wherein i=1, 2, ..., n) are assigned in the layering sequence to the in-plane retardation plates that constitute the circular polarizer, the polarizer being placed in front. The retardation in the thickness direction of the i-th in-plane retardation plate is indicated as RTh1($i$). In the present invention, there is at least one m-th in-plane retardation plate for which RTh1($m$)<0.

Another circular polarizer may also be formed in corresponding fashion to such an in-plane retardation plate. Numbers j (wherein j=1, 2, ..., n) may also be assigned in the layering sequence to the plurality of in-plane retardation plates that constitute the other circular polarizer, the polarizer being placed in front. The retardation in the thickness direction of the j-th in-plane retardation plate constituting the other circular polarizer is indicated as Rth2($j$).

It is preferred at this time that Rth2(1)>0 when RTh1(1)<0 for m=1, Rth2(2)>0 when RTh1(2)<0 for m=2, ..., and Rth2($m$)>0 when RTh1($m$)<0 for m. By using this configuration, when the circular polarizer of the present invention is used in a liquid crystal display device in combination with another circular polarizer that corresponds to the structure of the in-plane retardation plates of the circular polarizer of the present invention, it is possible in particular to obtain a liquid crystal display device whose viewing angle characteristics in the transmissive display are superior to those obtained by the conventional circular polarizer. Specifically, the viewing angle characteristics are further enhanced when the absolute value of the sum of the Rth values is small.

A configuration may be adopted in which at least one of the in-plane retardation plates satisfies the relation Rth>0. Through the use of such a circular polarizer, since an in-plane retardation plate in which Rth<0 and an in-plane retardation plate in which Rth>0 reduce the Rth of each other within a single circular polarizer, the viewing angle characteristics of the circular polarizer are enhanced.

The circular polarizer according to the present invention comprises a plurality of in-plane retardation plates having a retardation Re>0 in an in-plane direction when the retardation Re of an in-plane direction is (nx−ny)×d, and a retardation Rth in a thickness direction is ((nx+ny)/2−nz)×d (wherein nx is a refractive index in a direction in which a maximum refractive index occurs in a plane; ny is a refractive index in an in-plane direction orthogonal to the direction in which the maximum refractive index occurs; nz is a refractive index in a thickness direction; and d is a thickness), and a polarizer for polarizing incident light and then transmitting the light to the in-plane retardation plates, or receiving light that has passed through the in-plane retardation plates, wherein all of the in-plane retardation plates satisfy the relation Rth=0.

In the present invention, the use of a circular polarizer having at least two or more in-plane retardation plates in which Rth is substantially zero suppresses an increase in the retardation in the thickness direction of the circular polarizer, and the viewing angle characteristics of the circular polarizer are thereby enhanced. The following can be expressed particularly in the case of the present configuration. In an in-plane retardation plate in which Rth is substantially zero, the range of tilted viewing angles is wide, and there is minimal misalignment of retardations. Therefore, the in-plane retardation plates function as a circular polarizer in a wide range of tilted viewing angles. Specifically, the viewing angle characteristics of the circular polarizer are enhanced. Since this circular polarizer uses two or more in-plane retardation plates, the circular polarizer is also made into a broadband circular polarizer.

The in-plane retardation plates may also be λ/4 plates or λ/2 plates. Such a circular polarizer enables the use of λ/4 plates and λ/2 plates that are widely circulated in the current market, and cost can be lowered relative to developing all new components.

A configuration may be adopted in which the wavelength dependency of in-plane birefringence of the in-plane retardation plates decreases in monotone fashion with respect to an increase in wavelength. A configuration may also be adopted in which the wavelength dependency of in-plane birefringence of the in-plane retardation plates increases in monotone fashion with respect to an increase in wavelength.

High contrast ratio is required in a transmissive display relative to a reflective display. In the present invention, a plurality (n) in-plane retardation plates is layered. Numbers (i=1, 2, ..., n) are assigned in the layering sequence to the in-plane retardation plates that constitute the circular polarizer of the present invention, the polarizer being placed in front. The Re of each in-plane retardation plate is indicated as $Re1(i)$. Another circular polarizer may also be formed. Numbers (j=1, 2, ..., n) are also assigned in the layering sequence to the plurality of in-plane retardation plates that constitute the other circular polarizer 2, the polarizer being placed in front. The Re of the plurality of in-plane retardation plates constituting the other circular polarizer are indicated as $Re2(j)$.

In a preferred configuration in the present invention, $Re1(m)=Re2(m)$, and the difference of the placement angle (the angle between the slow axes in the in-plane retardation plates) is set to 90 degrees for the m-th in-plane retardation plate in the circular polarizer and the m-th in-plane retardation plate in the other circular polarizer so that the wavelength dispersion characteristics of the in-plane retardations compensate for each other. At this time, when $Re1(m)$ increases the shorter the wavelength, and $Re2(m)$ decreases the shorter the wavelength, for example, the difference of the in-plane retardations increases on the short-wavelength side and the long-wavelength side, and it becomes difficult to compensate for the wavelength dispersion characteristics of $Re1(m)$ and $Re2(m)$ in the entire visible light region. Accordingly, the difference of the in-plane retardations in each wavelength of $Re1(m)$ and $Re2(m)$ is preferably small. Consequently, the present invention is easily implemented when the wavelength dependency of in-plane birefringence decreases in monotone fashion with respect to wavelength for both $Re1(m)$ and $Re2(m)$. Conversely, the wavelength dependency of in-plane birefringence may also increase in monotone fashion with respect to wavelength for both $Re1(m)$ and $Re2(m)$.

A configuration may be adopted in which the circular polarizer has another in-plane retardation plate between the polarizer and the in-plane retardation plates, wherein the other in-plane retardation plate is disposed so that a slow axis of the other in-plane retardation plate is perpendicular or parallel to an absorption axis of the polarizer. This configuration enhances the viewing angle characteristics of the linear polarizer and further enhances the viewing angle characteristics of the circular polarizer.

The liquid crystal display device according to the present invention is reflective, and uses the circular polarizer.

Using a broadband circular polarizer that has enhanced viewing angle characteristics in the present invention makes it possible to obtain a liquid crystal display device that has excellent contrast ratio and viewing angle characteristics.

A configuration may also be adopted in the liquid crystal display device wherein a liquid crystal layer compensating plate for optically compensating for a liquid crystal layer is disposed between the circular polarizer and a liquid crystal cell of the liquid crystal display device. In such a liquid crystal display device, the liquid crystal layer compensating plate compensates for the anisotropy of the liquid crystal layer, which affects the contrast ratio and the viewing angle characteristics, and since the circular polarizer of the present invention is also used, the contrast ratio and the viewing angle characteristics of the liquid crystal display device are enhanced.

The abovementioned liquid crystal display device also preferably comprises the circular polarizer provided on a display surface of the liquid crystal cell of the liquid crystal display device, and a reflector used for reflective display provided within the liquid crystal cell, wherein a region between the circular polarizer and the reflector is placed in an optically isotropic phase during black display. Circularly polarized light must not be modulated by a retardation during black display in order for the contrast ratio and the viewing angle characteristics of the reflective display to be enhanced in the liquid crystal display device in which the circular polarizer is used. Accordingly, during black display in the liquid crystal display device, the contrast ratio and the viewing angle characteristics of the liquid crystal display device are enhanced by making the in-plane retardation and the thickness-direction retardation zero in the region from the circular polarizer to the reflector used for reflective display.

The terminal device according to the present invention has the abovementioned liquid crystal display device mounted therein.

The liquid crystal display device according to the present invention comprises a liquid crystal cell in which a liquid crystal layer is provided between a pair of substrates, and circular polarizers provided to each substrate surface of the liquid crystal cell, wherein the circular polarizers have a plurality of in-plane retardation plates having a retardation Re>0 in an in-plane direction when the retardation Re of an in-plane direction is (nx=ny) x d, and a retardation Rth in a thickness direction is ((nx+ny)/2−nz)×d (wherein nx is a refractive index in a direction in which a maximum refractive index occurs in a plane; ny is a refractive index in an in-plane direction orthogonal to the direction in which the maximum refractive index occurs; nz is a refractive index in a thickness direction; and d is a thickness), and a polarizer for polarizing incident light and then transmitting the light to the in-plane retardation plates, or receiving light that has passed through the in-plane retardation plates; wherein the in-plane phase difference plates that constitute both of the circular polarizers includes an in-plane phase difference plate in which Rth>0, and an in-plane phase difference plate in which Rth<0.

In the present invention, an in-plane retardation plate in which Rth>0 and an in-plane retardation plate in which Rth<0 are used as the m-th in-plane retardation plate constituting one of the circular polarizers, and the m-th in-plane retardation plate that constitutes the other circular polarizer, whereby $RTh1(m)$ and $Rth2(m)$ reduce the retardations of each other in the thickness direction. The viewing angle characteristics of the circular polarizers are therefore enhanced, and the viewing angle characteristics of the liquid crystal display device are enhanced. Since both circular polarizers use two or more in-plane retardation plates, the bandwidth of the circular polarizers can also be increased.

The in-plane retardation plates may be λ/4 plates or λ/2 plates in the abovementioned liquid crystal display device. Such a liquid crystal display device enables the use of λ/4 plates and λ/2 plates that are widely circulated. in the current market for the circular polarizers in the liquid crystal display device, and cost can be lowered relative to developing all new components.

A configuration may be adopted in the abovementioned liquid crystal display device wherein the circular polarizers provided to a display surface have an in-plane retardation plate in which Rth>0, and an in-plane retardation plate in which Rth<0. In such a liquid crystal display device, since an in-plane retardation plate in which Rth>0 and an in-plane retardation plate in which Rth<0 reduce the thickness-direction retardation of each other in the circular polarizer on the display surface side, the viewing angle characteristics of the circular polarizer are enhanced, and the viewing angle characteristics of the reflective display region of the liquid crystal display device are also enhanced.

A configuration may be adopted in which the wavelength dependency of in-plane birefringence of the in-plane retardation plates in the abovementioned liquid crystal display device decreases in monotone fashion with respect to an increase in wavelength. A configuration may also be adopted in which the wavelength dependency of in-plane birefringence of the in-plane retardation plates increases in monotone fashion with respect to an increase in wavelength. In such a liquid crystal display device, the wavelength dispersion characteristics of the in-plane retardations can be compensated for between $RTh1(m)$ and $Rth2(m)$ of the circular polarizers provided to both sides of the liquid crystal cell, and the decrease in contrast ratio of the transmissive display region caused by the use of circular polarizers is suppressed.

In the abovementioned liquid crystal display device, the sum of Rth of the inplane retardation plates that constitute the circular polarizer in between the two polarizers is preferably 0. In such a liquid crystal display device, the thickness-direction retardation that causes modulation of circularly polarized light during angled viewing is compensated for and reduced substantially to zero by the Rth of the films, and the viewing angle characteristics are thereby enhanced.

A configuration is preferably adopted in the abovementioned liquid crystal display device wherein the polarizer has a protective film on the in-plane retardation plates, and the sum of Rth of the in-plane retardation plates that constitute the circular polarizer in between two of the polarizers, and a retardation in a thickness direction of the protective film is 0. Polarizers often have a structure in which a polarizing layer is sandwiched between protective films. For example, triacetyl cellulose (TAC) is often used in the protective film, but TAC has a retardation in the thickness direction, although the value of the retardation is small. In the liquid crystal display device of the present invention, the viewing angle characteristics are enhanced by making the sum of the Rth of the films zero, including the Rth of the protective film.

A configuration may be adopted in the abovementioned liquid crystal display device wherein at least one of the circular polarizers has an in-plane retardation plate besides the in-plane retardation plates that is disposed between the polarizer and the in-plane retardation plates so that a slow axis of the other in-plane retardation plate is perpendicular or parallel to an absorption axis of the polarizer. In such a liquid crystal display device, the viewing angle characteristics of the linear polarizer are enhanced, and the viewing angle characteristics of the liquid crystal display device are also further enhanced.

The abovementioned liquid crystal display device is preferably configured so that the sum of the retardation between two of the polarizers in a thickness direction of the constituent members is 0 during black display in the liquid crystal display device. In such a liquid crystal display device, the sum of the retardation in the thickness direction of the liquid crystal layer and the Rth of the in-plane retardation plates, the protective films, and other components is substantially zero during black display in the liquid crystal display device, and the viewing angle characteristics of the liquid crystal display device are thereby enhanced.

A configuration may be adopted in the abovementioned liquid crystal display device wherein a liquid crystal layer compensating plate for optically compensating for the liquid crystal layer is disposed between the circular polarizer and the liquid crystal cell. In such a liquid crystal display device, since the optical anisotropy of the liquid crystal layer is compensated for by the liquid crystal layer compensating plate, the contrast ratio and the viewing angle characteristics of the liquid crystal display device are enhanced.

In the abovementioned liquid crystal display device, the liquid crystal layer may be a liquid crystal layer that is vertically aligned during black display. In such a liquid crystal display device, the contrast ratio and the viewing angle characteristics of the liquid crystal display device are enhanced through the use of vertical-alignment- mode liquid crystals having excellent contrast ratio and viewing angle characteristics.

In the abovementioned liquid crystal display device having a liquid crystal compensating plate, a configuration may be adopted wherein the liquid crystal cell has a reflective display region and a transmissive display region, the liquid crystal layer has a retardation in an in-plane direction parallel to a display surface, and at least the liquid crystal layer of the transmissive display region is driven by a lateral field. In such a liquid crystal display device, providing a liquid crystal layer compensating plate for cancelling out the in-plane retardation in the display plane of the liquid crystal layer in a lateral-field-driven semi-transmissive liquid crystal display device makes it possible to provide a liquid crystal display device that is capable of a suitable display even when a circular polarizer is used. Specifically, even when a circular polarizer is used in a lateral-field-driven semi-transmissive liquid crystal display device, the transmissive display region and the reflective display region can be matched with each other in a normally black mode. Since the liquid crystal layer is driven by a lateral field, excellent viewing angle characteristics can be provided, and since the compensating plate acts to cancel out the refractive index anisotropy of the liquid crystal layer, it is possible to prevent adverse effects on the viewing angle performance that are caused by refractive index anisotropy.

In the abovementioned liquid crystal display device, a configuration may be adopted wherein one each of the liquid crystal layer compensating plate is provided between the liquid crystal layer and the two circular polarizers, one liquid crystal layer compensating plate of two of the liquid crystal layer compensating plates reduces a retardation in an in-plane direction of the liquid crystal layer in the reflective display region, and two of the liquid crystal layer compensating plates reduce a retardation in an in-plane direction of the liquid crystal layer in the transmissive display region. This configuration makes it possible to compensate for the in-plane retardation in both the reflective display region and the transmissive display region, and to provide a lateral-field-driven liquid crystal display device having excellent display quality.

A configuration may be adopted in which one liquid crystal layer compensating plate of two of the liquid crystal layer compensating plates reduces a retardation in a thickness direction of the liquid crystal layer in the reflective display region, and two of the liquid crystal layer compensating plates reduce a retardation in a thickness direction of the liquid crystal layer in the transmissive display region. Since this configuration makes it possible to compensate for the thickness-direction retardation in both the reflective display region and the transmissive display region, a lateral-field-driven liquid crystal display device having enhanced viewing angle characteristics can be provided.

In the abovementioned liquid crystal display device, a configuration may be adopted wherein the liquid crystal layer compensating plate is provided only between the liquid crystal layer and one of the two circular polarizers, and the single liquid crystal layer compensating plate reduces a retardation in an in-plane direction of the liquid crystal layer in the reflective display region, and a retardation in an in-plane direction of the liquid crystal layer in the transmissive display region. The number of liquid crystal layer compensating plates used can thereby be reduced, and cost can be reduced.

In the abovementioned liquid crystal display device, a configuration may be adopted wherein the liquid crystal layer compensating plate reduces a retardation in a thickness direction of the liquid crystal layer in the reflective display region, and a retardation in a thickness direction of the liquid crystal layer in the transmissive display region. Since adopting such a configuration makes it possible to compensate for the retardation in the thickness direction for both the reflective display region and the transmissive display region, a lateral-field-driven liquid crystal display device having enhanced viewing angle characteristics can be provided.

In a preferred configuration of the abovementioned liquid crystal display device, the liquid crystal layer compensating plate has a retardation in an in-plane direction, and the retardation in the thickness direction is negative. The in-plane retardation and the thickness-direction retardation of the liquid crystal layers of the reflective display region and the transmissive display region can thereby be effectively negated.

In the abovementioned liquid crystal display device, the liquid crystal layer compensating plate may be set to a value so as to cancel out and render isotropic the retardation in the in-plane direction of the liquid crystal layer in the transmissive display region. The performance of the transmissive display can thereby be increased, since the performance desired in a transmissive display is generally higher than in a reflective display.

In the abovementioned liquid crystal display device, the liquid crystal layer compensating plate may be set to a value so as to cancel out and render isotropic the retardation in the in-plane direction of the liquid crystal layer in the reflective display region. The performance of the reflective display can thereby be increased.

In the abovementioned liquid crystal display device, a configuration may be adopted wherein the wavelength dependency of in-plane birefringence of the liquid crystal layer compensating plate increases in monotone fashion with respect to an increase in wavelength. The wavelength dependency of in-plane birefringence of a liquid crystal layer often increases in monotone fashion with respect to an increase in wavelength. Accordingly, when a configuration is adopted in which the wavelength dependency of the in-plane birefringence of the liquid crystal layer compensating plate increases in monotone fashion with respect to an increase in wavelength, there is not often a significant difference in the wavelength dependency of birefringence between the liquid crystal layer and the liquid crystal layer compensating plate, the in-plane retardation of the liquid crystal layer in a broad band of visible light can be effectively reduced, and contrast ratio can be enhanced.

The terminal device according to the present invention has the abovementioned liquid crystal display device mounted therein.

The liquid crystal display device according to the present invention has a reflective display region and a transmissive display region; and the liquid crystal display device comprises a circular polarizer having a polarizer and an in-plane retardation plate that has a positive retardation in an in-plane direction and a positive retardation in a thickness direction, and is disposed towards the liquid crystal layer with respect to the polarizer; and a circular polarizer having a polarizer and an in-plane retardation plate that has a positive retardation in an in-plane direction and a negative retardation in a thickness direction, and is disposed towards the liquid crystal layer with respect to the polarizer; wherein the circular polarizers sandwich the liquid crystal layer, the liquid crystal layer of the liquid crystal display device has a retardation in an in-plane direction in a plane parallel to a display surface, and the liquid crystal layer of at least the transmissive display region is driven by a lateral field; and a liquid crystal layer compensating plate is provided between said liquid crystal layer and at least one of said two circular polarizers, and the liquid crystal layer compensating plate reduces a retardation in an in-plane direction of the liquid crystal layer.

In the present invention, the in-plane retardation plates reduce the thickness-direction retardation of each other, whereby the viewing angle characteristics are enhanced in a lateral-field-driven semi-transmissive liquid crystal display device. Furthermore, providing a liquid crystal layer compensating plate for cancelling out the in-plane retardation in the display plane of the liquid crystal layer in a lateral-field-driven semi-transmissive liquid crystal display device makes it possible to provide a liquid crystal display device that is capable of a suitable display even when a circular polarizer is used. Specifically, even when a circular polarizer is used in a lateral-field-driven semi-transmissive liquid crystal display device, the transmissive display region and the reflective display region can be matched with each other in a normally black mode. Since the liquid crystal layer is driven by a lateral field, excellent viewing angle characteristics can be provided, and since the compensating plate acts to cancel out the refractive index anisotropy of the liquid crystal layer, it is possible to prevent adverse effects on the viewing angle performance that are caused by refractive index anisotropy.

The liquid crystal display device according to the present invention has a reflective display region and a transmissive display region; and the liquid crystal display device comprises two circular polarizers composed solely of a polarizer and an in-plane retardation plate that has a positive retardation in an in-plane direction and a retardation of zero in a thickness direction, and is disposed towards the liquid crystal layer with respect to the polarizer; wherein the circular polarizers sandwich the liquid crystal layer, the liquid crystal layer of the liquid crystal display device has a retardation in an in-plane direction in a plane parallel to a display surface, and the liquid crystal layer of at least the transmissive display region is driven by a lateral field; and a liquid crystal layer compensating plate is provided between the liquid crystal layer and at least one of the circular polarizers, wherein the liquid crystal layer compensating plate reduces a retardation in an in-plane direction of the liquid crystal layer.

In the present invention, an increase in the thickness-direction retardation of the circular polarizer is suppressed through the use of a circular polarizer that has at least one in-plane retardation plate whose Rth is substantially zero, and the viewing angle characteristics are thereby enhanced in the lateral-field-driven semi-transmissive liquid crystal display device.

The in-plane retardation plates may be $\lambda/4$ plates or $\lambda/2$ plates. Such a liquid crystal display device enables the use of $\lambda/4$ plates and $\lambda/2$ plates that are widely circulated in the current market for the circular polarizers in the liquid crystal display device, and cost can be lowered relative to developing all new components.

In the liquid crystal display device, a configuration may be adopted wherein the wavelength dependency of in-plane birefringence of the in-plane retardation plates decreases in monotone fashion with respect to an increase in wavelength. A configuration may also be adopted in the liquid crystal display device wherein the wavelength dependency of in-plane birefringence of the in-plane retardation plates increases in monotone fashion with respect to an increase in wavelength. In such a liquid crystal display device, the wavelength dispersion characteristics of the in-plane retardations can be compensated for between the in-plane retardation plates of the circular polarizers provided to both sides of the liquid crystal layer, and the decrease in contrast ratio of the transmissive display region caused by the use of circular polarizers is suppressed.

A configuration may be adopted wherein the abovementioned liquid crystal display device comprises another in-plane retardation plate between the polarizer and the in-plane retardation plates in at least one of the two circular polarizers, wherein the other in-plane retardation plate is disposed so that an absorption axis and a slow axis of the polarizer are perpendicular or parallel to each other. In such a liquid crystal display device, the viewing angle characteristics of the linear polarizer are enhanced, and the viewing angle characteristics of the liquid crystal display device are further enhanced.

In the abovementioned liquid crystal display device, a configuration may be adopted wherein one each of the liquid crystal layer compensating plate is provided between the liquid crystal layer and the two circular polarizers, one liquid crystal layer compensating plate of two of the liquid crystal layer compensating plates reduces a retardation in an in-plane direction of the liquid crystal layer in the reflective display region, and two of the liquid crystal layer compensating plates reduce a retardation in an in-plane direction of the liquid crystal layer in the transmissive display region. This configuration makes it possible to compensate for the in-plane retardation in both the reflective display region and the transmissive display region, and to provide a lateral-field-driven liquid crystal display device having excellent display quality.

A configuration may be adopted in which one liquid crystal layer compensating plate of two of the liquid crystal layer compensating plates reduces a retardation in a thickness direction of the liquid crystal layer in the reflective display region, and two of the liquid crystal layer compensating plates reduce a retardation in a thickness direction of the liquid crystal layer in the transmissive display region. This configuration makes it possible to compensate for the thickness-direction retardation in both the reflective display region and the transmissive display region, and to provide a lateral-field-driven liquid crystal display device having enhanced viewing angle characteristics.

A configuration may be adopted in which the liquid crystal layer compensating plate is provided only between the liquid crystal layer and one of the two circular polarizers, and the single liquid crystal layer compensating plate reduces a retardation in an in-plane direction of the liquid crystal layer in the reflective display region, and a retardation in an in-plane direction of the liquid crystal layer in the transmissive display region. The number of liquid crystal layer compensating plates used can thereby be reduced, and cost can be reduced.

In the abovementioned liquid crystal display device, a configuration may be adopted wherein the liquid crystal layer compensating plate reduces a retardation in a thickness direction of the liquid crystal layer in the reflective display region, and a retardation in a thickness direction of the liquid crystal layer in the transmissive display region. Since the thickness-direction retardation can thereby be compensated for in both the reflective display region and the transmissive display region, a lateral-field-driven liquid crystal display device having enhanced viewing angle characteristics can be provided.

In a preferred configuration of the abovementioned liquid crystal display device, the liquid crystal layer compensating plate has a retardation in an in-plane direction, and the retardation in the thickness direction is negative. The in-plane retardation and the thickness-direction retardation of the liquid crystal layers of the reflective display region and the transmissive display region can thereby be effectively negated.

In the abovementioned liquid crystal display device, the liquid crystal layer compensating plate is preferably set to a value so as to cancel out and render isotropic the retardation in the in-plane direction of the liquid crystal layer in the transmissive display region. The performance of the transmissive display can thereby be increased, since the performance desired in a transmissive display is generally higher than in a reflective display.

In the abovementioned liquid crystal display device, the liquid crystal layer compensating plate is preferably set to a value so as to cancel out and render isotropic the retardation in the in-plane direction of the liquid crystal layer in the reflective display region. The performance of the reflective display can thereby be increased.

In the abovementioned liquid crystal display device, a configuration may be adopted wherein the wavelength dependency of in-plane birefringence of the liquid crystal layer compensating plate increases in monotone fashion with respect to an increase in wavelength.

The terminal device according to the present invention has the abovementioned liquid crystal display device mounted therein.

According to the present invention, the retardations in the thickness direction of the retardation plates can be reduced in the in-plane retardation plates that constitute the circular polarizers, the effects of misalignment of the retardations during viewing at an angle can be reduced, and it is possible to provide a circular polarizer having excellent viewing angle characteristics, and a liquid crystal display device and terminal device that use the circular polarizer.

BRIEF DESCRIPTION OF THE DRAWINGS

FIG. 1 is a sectional view showing the vertical-alignment-mode semi-transmissive liquid crystal panel used in the first conventional liquid crystal display device described in AsiaDisplay/IDW01, p. 134;

FIG. 2 is a schematic sectional view showing the vertical-alignment-mode semi-transmissive liquid crystal panel used in the second conventional liquid crystal display device described in Japanese Laid-open Patent Application No. 2000-035570;

FIG. 4 is a front view showing the angles at which the retardation plates and the polarizer are disposed;

FIG. 9 is an equal contrast ratio diagram showing the results of evaluating the viewing angle characteristics in the transmissive display region of the liquid crystal display device according to Typical Structure Example 1;

FIG. 10 is an equal contrast ratio diagram showing the results of evaluating the viewing angle characteristics in the reflective display region of the liquid crystal display device according to Typical Structure Example 1;

FIG. 13 is an equal contrast ratio diagram showing the results of evaluating the viewing angle characteristics in the transmissive display region of the liquid crystal display device according to Comparative Structure Example 2;

FIG. 14 is an equal contrast ratio diagram showing the results of evaluating the viewing angle characteristics in the reflective display region of the liquid crystal display device according to Comparative Structure Example 2;

FIG. 27 is an equal contrast ratio diagram showing the results of evaluating the viewing angle characteristics in the transmissive display region of the liquid crystal display device according to Comparative Structure Example 4;

FIG. 28 is an equal contrast ratio diagram showing the results of evaluating the viewing angle characteristics in the reflective display region of the liquid crystal display device according to Comparative Structure Example 4;

DESCRIPTION OF THE PREFERRED EMBODIMENTS

Figure 3:
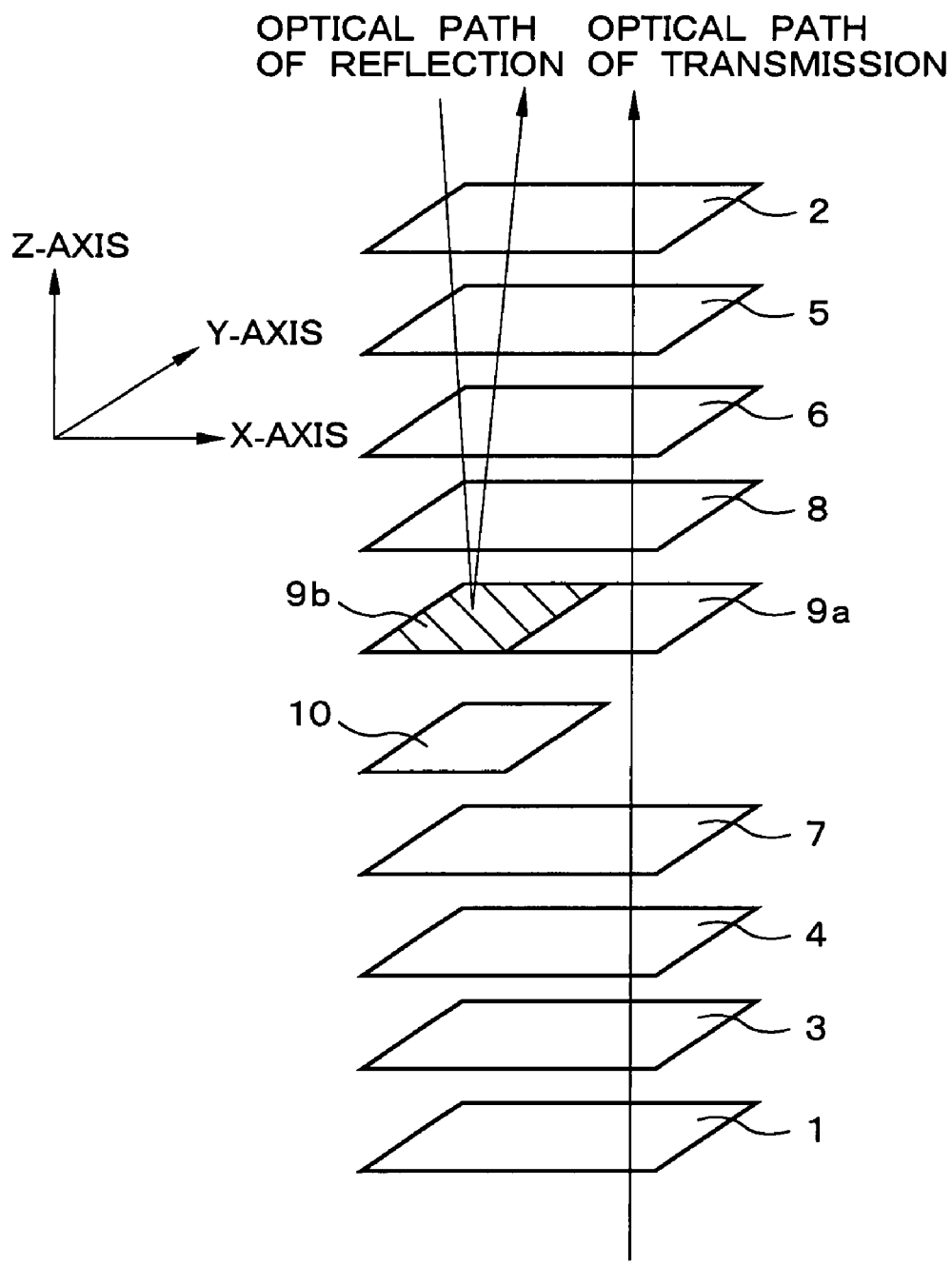
FIG. 3 is a diagram showing a schematic perspective view of the structure of the liquid crystal display device according to Embodiment 1, and a diagram showing the structure of the circular polarizer of the present invention.
Figure 5:
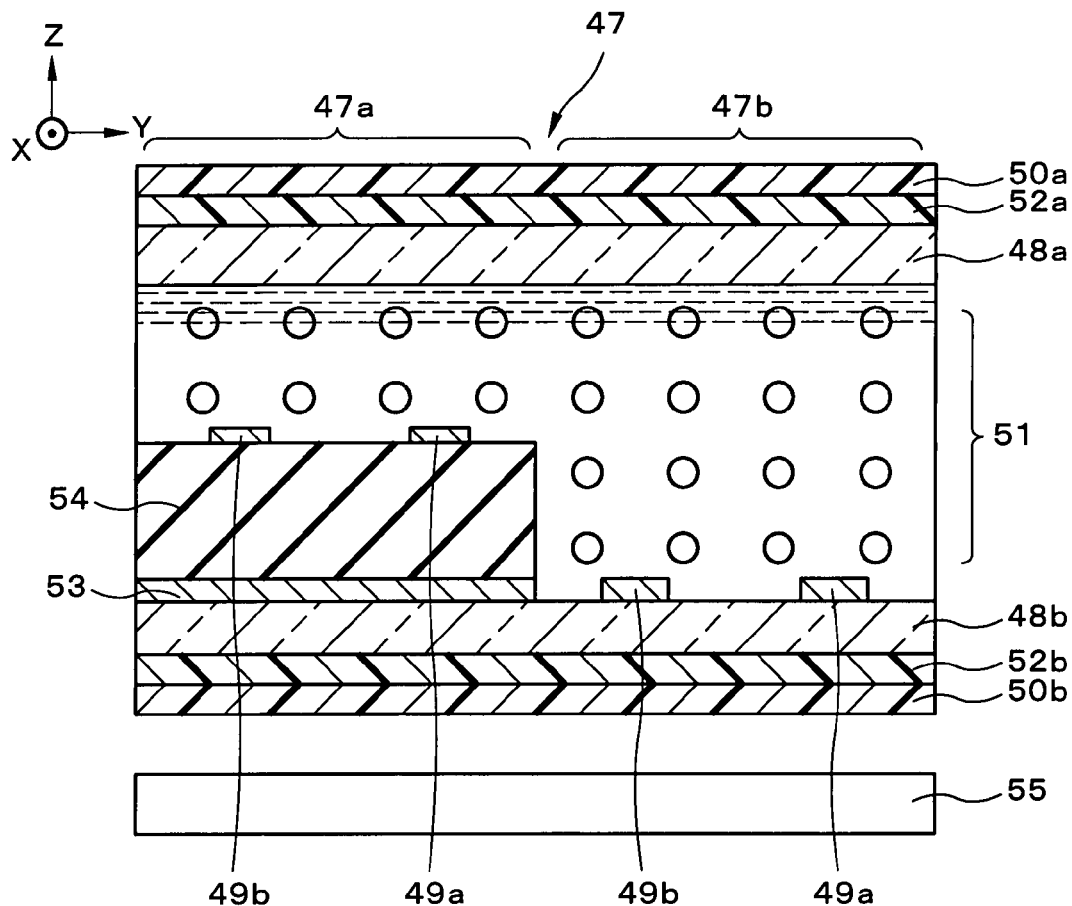
FIG. 5 is a sectional view showing the structure of the liquid crystal display device according to Embodiment 1.

Embodiments of the present invention will be described in detail hereinafter with reference to the accompanying drawings. FIG. 3 is a diagram showing a schematic perspective view of the structure of the liquid crystal display device according to Embodiment 1, and a diagram showing the structure of the circular polarizer of the present invention. FIG. 5 is also a sectional view showing the structure of the liquid crystal display device according to Embodiment 1.

In the liquid crystal display device 47 according to Embodiment 1 as shown in FIG. 5, an upper substrate 48a and a lower substrate 48b are disposed so as to face each other across a minute gap, and a liquid crystal layer 51 is held in the gap. Two types of electrodes that include pixel electrodes 49a and common electrodes 49b are formed on the surface of the lower substrate 48b that faces the upper substrate 48a. These two types of electrodes are formed in a comb shape, and the pixel electrodes 49a and the common electrodes 49b are arranged so as to alternate in the direction (Y direction) orthogonal to the longitudinal direction of the comb. These electrodes are formed from ITO (Indium Tin Oxide) or another transparent conductor. A reflector 53 and an insulation layer 54 are provided between the electrodes and the lower substrate 48b in part of the region in which the pixel electrodes 49a and the common electrodes 49b are formed. When the liquid crystal display device 47 is viewed from the display side, the portion in which the reflector 53 is provided acts as a reflective display region 47a, and the other portion acts as a transmissive display region 47b. A reflective display region 47a and a transmissive display region 47b are thus formed in a single pixel, and the liquid crystal display device 47 is composed of numerous pixels arranged in a matrix. The thickness of the liquid crystal layer 51 in the reflective display region 47a is half the thickness of the liquid crystal layer in the transmissive display region 47b, due to the presence of the insulation layer 54.

An upper liquid crystal layer compensating plate 52a is provided to the surface of the upper substrate 48a opposite the lower substrate 48b, and an upper circular polarizer 50a is furthermore provided on the surface of the upper liquid crystal layer compensating plate 52a. In the same manner, a lower liquid crystal layer compensating plate 52b is provided to the surface of the lower substrate 48b opposite the upper substrate 48a, and a lower circular polarizer 50b is furthermore provided on the surface of the lower liquid crystal layer compensating plate 52b. A backlight 55 that acts as a light source for transmissive display is also provided under the lower circular polarizer 50b. In the present specification, the portion other than the backlight in the liquid crystal display device is referred to as the liquid crystal panel. The assembly of the liquid crystal layer and the upper and lower substrates that sandwich the liquid crystal layer is referred to as the liquid crystal cell.

An XYZ orthogonal coordinate system is set up as described below for convenience in the present specification. The direction from the liquid crystal layer 51 to the polarizer 50a is the +Z direction, and the opposite direction is the −Z direction. The +Z direction and the −Z direction are collectively referred to as the Z-axis direction. The horizontal direction of FIG. 3 is the Y-axis direction, wherein the direction to the right is the +Y direction, and the opposite direction is the −Y direction. The +X direction is the direction in which a right-handed coordinate system is established. Specifically, when the person's right thumb is in the +X direction, and the index finger is in the +Y direction, the middle finger is in the +Z direction.

When the XYZ orthogonal coordinate system is set up as described above, the direction in which the pixel electrodes 49a and the common electrodes 49b are arranged in alternating fashion is the Y-axis direction. The direction in which the pixel electrodes 49a or the common electrodes 49b extend, i.e., the longitudinal direction of the comb-shaped electrodes, is the X-axis direction (which is tilted 15 degrees according to the definition given hereinafter). The display surface of the liquid crystal display device 47 is the XY plane. Furthermore, as for the structure in the Z-axis direction, the backlight 55, the lower circular polarizer 50b, the lower liquid crystal layer compensating plate 52b, the lower substrate 48b, the liquid crystal layer 51, the upper substrate 48a, the upper liquid crystal layer compensating plate 52a, and the upper circular polarizer 50a are arranged in this sequence from the −Z direction to the +Z direction.

The upper circular polarizer 50a and the lower circular polarizer 50b are in a circular polarizer assembly whereby the rotation directions of circularly polarized light are opposite each other. For example, when the upper circular polarizer 50a forms clockwise circularly polarized light from light that enters from the −Z direction, the lower circular polarizer 50b forms counterclockwise circularly polarized light from light that enters from the +Z direction.

Figure 6:
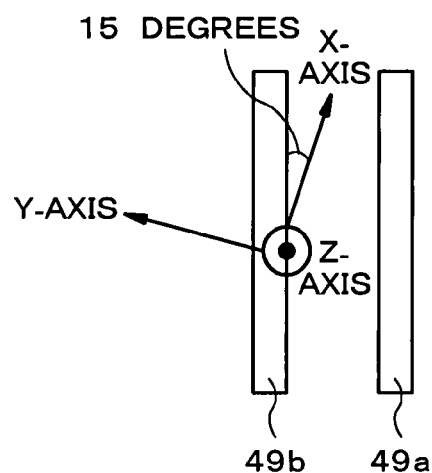
FIG. 6 is a diagram showing the positional relationship between the XYZ coordinate system and the comb electrode in the liquid crystal display device according to Embodiment 1.

The liquid crystal layer 51 includes positive liquid crystal molecules having positive dielectric anisotropy, for example, and a common orientation treatment is used to obtain a parallel orientation so that the longitudinal direction of the liquid crystal molecules are substantially within the XY plane in an initial state in which a voltage is not applied across the pixel electrodes 49a and the common electrodes 49b. For convenience in the present invention, the longitudinal direction of the liquid crystal molecules is parallel to the X-axis, and the longitudinal direction of the comb-shaped electrodes is set so as to be rotated +15 degrees from the X-axis in the XY plane, as shown in FIG. 6. The counterclockwise direction is positive.

The in-plane retardation Re and the thickness-direction phase different Rth are defined by the following equations:

$$Re = (nx - ny) \times d \qquad \text{[Equation 3]}$$

$$Rth = ((nx + ny)/2 - nz) \times d \qquad \text{[Equation 4]}$$

(wherein nx is the refractive index in the direction in which the maximum refractive index occurs in a retardation plate; ny is the refractive index in the in-plane direction orthogonal to the direction in which the maximum refractive index occurs; nz is a refractive index in the thickness direction; and d is the thickness).

A retardation plate that has a retardation in an in-plane direction is referred to as an in-plane retardation plate. The Nz coefficient is defined by the equation below.

$$Nz=(nx-nz)/(nx-ny) \quad \text{[Equation 5]}$$

When nx=ny, Nz cannot be defined, but the equation below is established when nx≠ny.

$$Rth=Re/2\times(2\times Nz-1) \quad \text{[Equation 6]}$$

The axis that is parallel to the direction of the maximum refractive index in the plane of the film used to form the in-plane retardation plate is referred to as the slow axis. The in-plane retardation plates in the present invention have a Re less than zero The upper liquid crystal layer compensating plate 52a is a compensating plate provided in order to cancel out an render optically isotropic the retardation in the thickness direction and the in-plane retardation of the liquid crystal layer 51 in the black display state of the reflective display region 47a, and an in-plane retardation plate in which Nz=0, for example, is used.

Specifically, the upper liquid crystal layer compensating plate 52a in Embodiment 1 has a value of the in-plane retardation of the liquid crystal layer 51 in the black display state of the reflective display region 47a, and a value of the retardation in the thickness direction having a difference reference numeral. The slow axis of the upper liquid crystal layer compensating plate 52a and the longitudinal direction of the liquid crystal molecules are arranged perpendicular to each other. Specifically, the slow axis of the upper liquid crystal layer compensating plate 52a is rotated 90 degrees in the XY plane.

In the same manner as the upper liquid crystal layer compensating plate 52a, an in-plane retardation plate in which Nz=0, for example, is used for the lower liquid crystal layer compensating plate 52b, and the slow axis thereof is positioned perpendicular to the longitudinal direction of the liquid crystal molecules of the liquid crystal layer 51 in the transmissive display region 47b. Specifically, the slow axis of the lower liquid crystal layer compensating plate 52b is rotated 90 degrees in the XY plane. The values of the retardations of the lower liquid crystal layer compensating plate 52b in the in-plane direction and the thickness direction are set in accordance with the upper liquid crystal layer compensating plate 52a so as to cancel out and render isotropic the in-plane retardation and thickness-direction retardation of the liquid crystal layer 51 of the transmissive display region 47b when a voltage is not applied to the pixel electrodes 49a and the common electrodes 49b. For example, when the thickness of the liquid crystal layer 51 in the transmissive display region 47b is set to twice the thickness of the liquid crystal layer 51 in the reflective display region 47a, since the birefringence of the liquid crystal molecules is the same for the transmissive display region 47b and the reflective display region 47a, retardation films that have exactly the same characteristics are used for the upper liquid crystal layer compensating plate 52a and the lower liquid crystal layer compensating plate 52b. The optical anisotropy in both the liquid crystal layer 51 of the reflective display region 47a and the liquid crystal layer 51 of the transmissive display region 47b is cancelled out and made isotropic by the upper liquid crystal layer compensating plate 52a and the lower liquid crystal layer compensating plate 52b.

FIG. 3 is a schematic perspective view showing the structure of the liquid crystal display device based on the structure of the liquid crystal display device in FIG. 5. The XYZ coordinate system is defined in the same manner as in FIG. 5. In the transmissive display region of the liquid crystal display device according to Embodiment 1 as shown in FIG. 3, an upper substrate not shown in the drawing and a lower substrate are disposed so as to face each other across a minute gap, and a liquid crystal layer 9a is held in the gap. The liquid crystal layer is composed of two regions that include a transmissive part and a reflective part that has a reflector. In the present liquid crystal display device, a polarizer 2, a λ/2 plate 5 in which Rth>0, a λ/4 plate 6 in which Rth<0, a liquid crystal layer compensating plate 8, a liquid crystal layer 9a, a liquid crystal layer compensating plate 7, a λ/4 plate 4 in which Rth>0, a λ/2 plate 3 in which Rth<0, and a polarizer 1 are provided in sequence as viewed from the display side. In the transmissive display region of Embodiment 1, the viewing angle characteristics of the transmissive display are enhanced by reducing the absolute value of the sum of the retardations in the thickness direction between the λ/2 plate 3 in which Rth<0 and the λ/2 plate 5 in which Rth>0, and between the λ/4 plate 4 in which Rth>0 and the λ/4 plate 6 in which Rth<0. Although not shown in the drawing, a backlight used as the light source for the transmissive display is provided under the polarizer 1.

In the reflective display region of the liquid crystal display device according to Embodiment 1 as shown in FIG. 3, an upper substrate not shown in the drawing and a lower substrate are disposed so as to face each other across a minute gap, and a liquid crystal layer 9b is held in the gap. In the present liquid crystal display device, the polarizer 2, the λ/2 plate 5 in which Rth>0, the λ/4 plate 6 in which Rth<0, the liquid crystal layer compensating plate 8, the liquid crystal layer 9b, and a reflecting plate 10 are provided in sequence as viewed from the display side. In such a configuration, the viewing angle characteristics of the reflective display are enhanced by reducing the absolute value of the sum of the Rth between the λ/2 plate 5 in which Rth>0 and the λ/4 plate 6 in which Rth<0.

Figure 7:
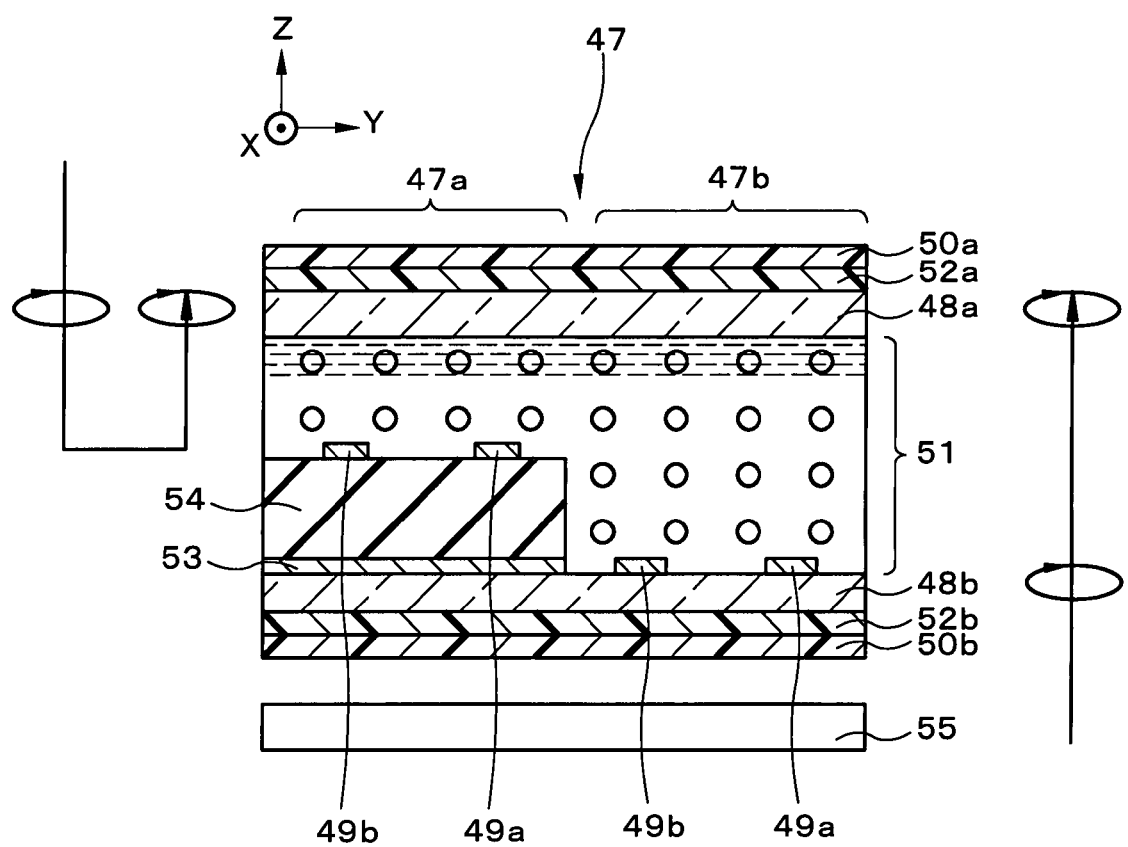
FIG. 7 is a schematic diagram showing the optical operations that occur when a voltage is not applied between the pixel electrodes and the common electrodes in the liquid crystal display device according to Embodiment 1.
Figure 8:
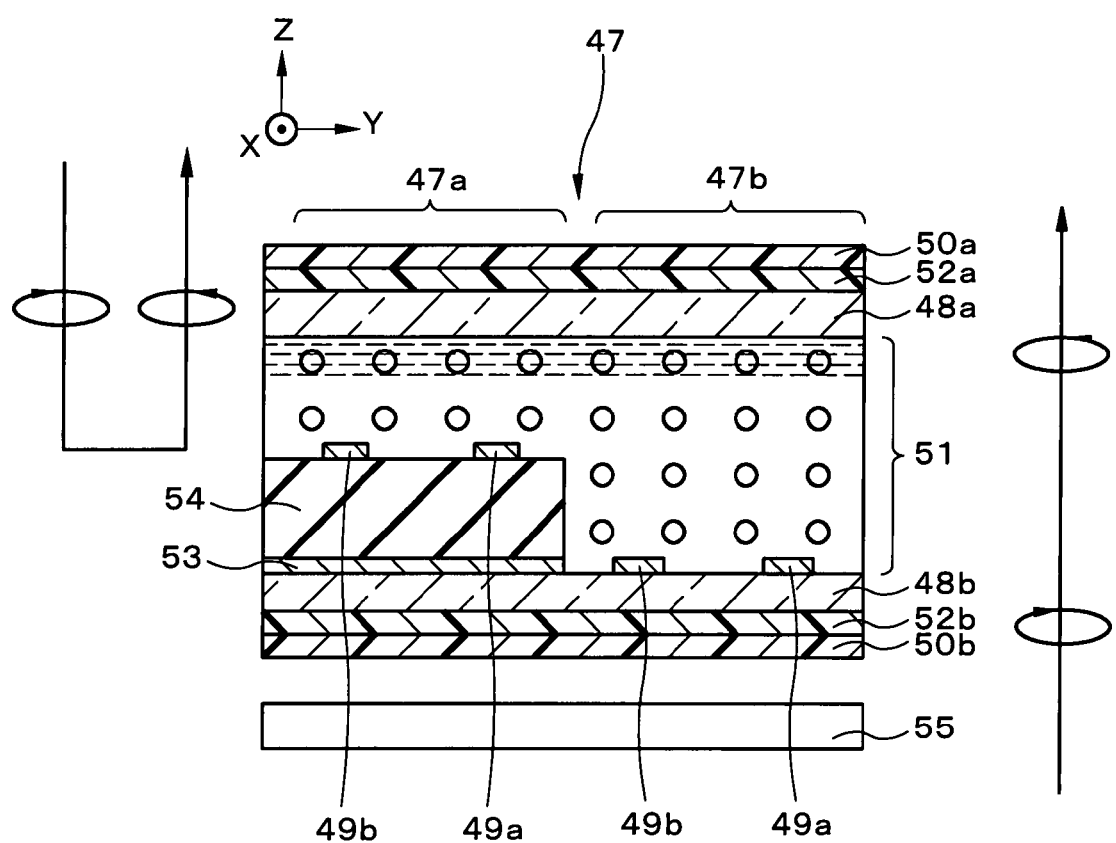
FIG. 8 is a schematic diagram showing the optical operations that occur when a voltage is applied between the pixel electrodes and the common electrodes in the liquid crystal display device according to Embodiment 1.

The following description is of the operation of the liquid crystal display device according to Embodiment 1 thus configured, i.e., the optical modulation operation of the liquid crystal display device according to the present embodiment. FIG. 7 is a schematic diagram showing the optical operations that occur when a voltage is not applied between the pixel electrodes and the common electrodes in the liquid crystal display device according to the present embodiment; and FIG. 8 is a schematic diagram showing the optical operations that occur when a voltage is applied between the pixel electrodes and the common electrodes.

As shown in FIG. 7, when a voltage is not applied to the pixel electrodes 49a and the common electrodes 49b, external light that enters the upper circular polarizer 50a in the reflective display region 47a is emitted as clockwise circularly polarized light to the upper liquid crystal layer compensating plate 52a. As previously mentioned, the retardation in the display plane of the liquid crystal layer 51 of the reflective display region 47a is cancelled out and made isotropic by the upper liquid crystal layer compensating plate 52a when a voltage is not applied to the pixel electrodes 49a and the common electrodes 49b. Therefore, the light that passes through the upper liquid crystal layer compensating plate 52a and the liquid crystal layer 51 of the reflective display region 47a maintains a state of clockwise circular polarization. The light that then passes through the insulation layer 54 and reaches the reflector 53 is converted to counterclockwise circularly polarized light upon being reflected by the reflector 53, and the light re-enters the insulation layer 54, the liquid crystal layer 51, and the upper liquid crystal layer compensating plate 52a of the reflective display region 47a. In the same manner as in the approach route, the retardation in the display plane of the liquid crystal layer 51 of the reflective display region 47a is cancelled out and made isotropic by the upper liquid crystal layer compensating plate 52a, and the light emitted from the upper liquid crystal layer compensating plate 52a maintains a state of counterclockwise circular polarization This light enters the upper circular polarizer 50a, and although the upper circular polarizer 50a transmits clockwise circularly polarized light, counterclockwise circularly polarized light is absorbed. The light is therefore not emitted from the upper circular polarizer 50a, and a black display is created. Specifically, the reflective display region 47a is a black display when a voltage is not applied to the pixel electrodes 49a and the common electrodes 49b.

The following description is of the optical operations that occur in the transmissive display region 47b when a voltage is not applied to the pixel electrodes 49a and the common electrodes 49b. The transmissive display light emitted from the backlight 55 enters the lower circular polarizer 50b, and is emitted as counterclockwise circularly polarized light. The light enters the lower liquid crystal layer compensating plate 52b, the liquid crystal layer 51 of the transmissive display region 47b, and the upper liquid crystal layer compensating plate 52a in sequence. However, since the retardation in the display plane of the liquid crystal layer 51 of the transmissive display region 47b is cancelled out and made isotropic by the lower circular polarizer 50b and the upper circular polarizer 50a, the light enters the upper circular polarizer 50a unmodified in a state of counterclockwise circular polarization. The upper circular polarizer 50a transmits clockwise circularly polarized light, but absorbs counterclockwise circularly polarized light. The light is therefore not emitted from the upper circular polarizer 50a, and a black display is created. Specifically, in the same manner as in the reflective display region 47a, the transmissive display region 47b is a black display when a voltage is not applied to the pixel electrodes 49a and the common electrodes 49b.

The following description is of the optical operations that occur in the present liquid crystal display device when a voltage is applied to the pixel electrodes and the common electrodes. As shown in FIG. 8, when a voltage is applied to the pixel electrodes 49a and the common electrodes 49b, an orientation change occurs in the liquid crystal layer 51 in the transmissive display region 47b and the reflective display region 47a, and the refractive index anisotropy therefore changes. In the reflective display region 47a, external light that is converted to clockwise circularly polarized light and emitted from the upper circular polarizer 50a enters the upper liquid crystal layer compensating plate 52a and the liquid crystal layer 51 of the reflective display region 47a. However, since the refractive index anisotropy of the liquid crystal layer 51 is changed by the voltage as previously mentioned, the polarization state of the clockwise circularly polarized light changes.

The amount of this change varies according to the applied voltage and the thickness of the liquid crystal layer, but a case is described in the present embodiment in which there is a one-quarter wavelength rotation, and the light is converted to linearly polarized light. The linearly polarized light reaches the reflector 53, but since the reflector 53 has no effect that changes the state of the linearly polarized light, the light is emitted as linearly polarized light without modification, and the light re-enters the liquid crystal layer 51 of the reflective display region 47a, and the upper liquid crystal layer compensating plate 52a. In the same manner as in the approach route, since the liquid crystal layer 51 of the reflective display region 47a and the upper liquid crystal layer compensating plate 52a act as a λ/4 plate, the linearly polarized light is converted to clockwise circularly polarized light, and enters the upper circular polarizer 50a. As previously described, the upper circular polarizer 50a transmits clockwise circularly polarized light, and the light is therefore emitted to create a white display. Specifically, the reflective display region is a white display when a voltage is applied to the pixel electrodes 49a and the common electrodes 49b.

The following description is of the optical operations that occur in the transmissive display region 47b when a voltage is applied to the pixel electrodes 49a and the common electrodes 49b. The transmissive display light emitted from the backlight 55 enters the lower circular polarizer 50b, and is emitted as counterclockwise circularly polarized light. The light then enters the lower liquid crystal layer compensating plate 52b, the liquid crystal layer 51 of the transmissive display region 47b, and the upper liquid crystal layer compensating plate 52a in sequence, but since the refractive index anisotropy of the liquid crystal layer 51 is changed by the voltage as previously described, the polarization state of the counterclockwise circularly polarized light changes. The amount of this change varies according to the applied voltage and the thickness of the liquid crystal layer, but a case is described in the present embodiment in which there is a one-half wavelength rotation, and the light is converted to clockwise circularly polarized light. The clockwise circularly polarized light that enters the upper circular polarizer 50a passes through the upper circular polarizer 50a, and a white display is created. Specifically, as in the reflective display region 47a, the transmissive display region 47b is a white display when a voltage is applied to the pixel electrodes 49a and the common electrodes 49b.

A normally black-mode semi-transmissive liquid crystal display device is thus created in which the transmissive display region and the reflective display region are both driven by a lateral field.

The effects of the present embodiment will next be described. According to the present embodiment, the retardations in the thickness direction of the in-plane retardation plates that constitute the circular polarizers are reduced by the in-plane retardation plates that constitute the circular polarizers, the effects of the retardations during angled viewing are reduced, and the viewing angle characteristics are enhanced. A circular polarizer having excellent viewing angle characteristics can therefore be provided, and the viewing angle characteristics are also enhanced in a liquid crystal display device and a terminal device that use such a circular polarizer of the present embodiment. The retardation in the thickness direction can also be reduced by the in-plane retardation plates that constitute the circular polarizer, there is no need to add an additional retardation plate that has a retardation in the thickness direction, the number of films can be reduced, the thickness of the circular polarizer and the liquid crystal display device can be reduced, and the cost can be reduced.

In the present embodiment, the transmissive display region is composed of the polarizer 2, the λ/2 plate 5 in which Rth>0, the λ/4 plate 6 in which Rth<0, the liquid crystal layer compensating plate 8, the liquid crystal layer 9a, the liquid crystal layer compensating plate 7, the λ/4 plate 4 in which Rth>0, the λ/2 plate 3 in which Rth<0, and the polarizer 1 arranged in sequence. However, in such a configuration for reducing the absolute value of the sum of the Rth between at least the λ/2 plate 3 and the λ/2 plate 5, or the λ/4 plate 4 and the λ/4 plate 6, any of the in-plane retardation plates may be designed so that Rth<0, Rth>0, or Rth=0. However, the absolute value of the Rth is preferably reduced for both the λ/2 plates and the λ/4 plates. In the same manner, the reflective display region in Embodiment 1 is configured so that the absolute value of the sum of the Rth is reduced between the λ/2 plate 5 in which Rth>0 and the λ/4 plate 6 in which Rth<0, but the viewing angle characteristics of the transmissive display region can be enhanced even in a configuration in which this absolute value is not reduced.

In the present embodiment, a λ/2 plate and a λ/4 plate are used as in-plane retardation plates, but a configuration that includes two or more of any type of in-plane retardation plate is possible insofar as a broadband circular polarizer can be created by layering with a polarizer, as described particularly in Japanese Laid-open Patent Application No. 2000-35570. However, since the effectiveness of an in-plane retardation plate is minimal when the in-plane retardation is less than 30 nm, numerous in-plane retardation plates are necessary. An in-plane retardation of 30 nm or more is therefore preferred in terms of cost and reducing the thickness of the circular polarizer.

In the present embodiment, the nx and ny of the λ/2 plate 3 in which Rth<0 and the λ/2 plate 5 in which Rth>0 are constant and independent of wavelength, and each in-plane retardation is also constant and independent of wavelength. Consequently, setting the difference in the arrangement angle of the λ/2 plate 3 in which Rth<0 and the λ/2 plate 5 in which Rth>0 to 90 enables mutual compensation of the wavelength dispersion characteristics of the in-plane retardations, and high contrast ratio is obtained in the transmissive display region.

However, when the in-plane retardation of the λ/2 plate 3 in which Rth<0 increases the shorter the wavelength, and the in-plane retardation of the λ/2 plate 5 in which Rth>0 decreases the shorter the wavelength, for example, the difference of the in-plane retardations increases on the short-wavelength side and the long-wavelength side, and it becomes difficult to compensate for the wavelength dispersion characteristics of the in-plane retardations in the entire visible light region. Accordingly, the difference between the in-plane retardation of the λ/2 plate 3 in which Rth<0 and the in-plane retardation of the λ/2 plate 5 in which Rth>0 is preferably small and independent of wavelength. Such a configuration is easily implemented when the wavelength dependency of in-plane birefringence decreases in monotone fashion with respect to both wavelengths for the λ/2 plate 3 in which Rth<0 and the λ/2 plate 5 in which Rth>0. Alternatively, the wavelength dependency of in-plane birefringence may also increase in monotone fashion with respect to both wavelengths for the λ/2 plate 3 in which Rth<0 and the λ/2 plate 5 in which Rth>0. The same applies in the case of the λ/4 plate 4 in which Rth>0 and the λ/4 plate 6 in which Rth<0.

Polarizers often have a structure in which a polarizing layer is sandwiched between protective films. For example, triacetyl cellulose (hereinafter referred to as TAC) is often used in the protective film, but TAC has a retardation in the thickness direction, although the value of the retardation is small. When the viewing angle characteristics are adversely affected by the retardation in the thickness direction of the TAC, the thickness-direction retardation of the TAC is preferably taken into account in the same manner as the in-plane retardation plates of the circular polarizer.

In the liquid crystal display device of the present embodiment, the retardation in the display plane of the reflective display region 47a and the transmissive display region 47b is completely cancelled out by the upper liquid crystal layer compensating plate 52a and the lower liquid crystal layer compensating plate 52b, but this configuration is not limiting.

Specifically, the extent to which the retardation is compensated for is also related to manufacturing and design problems, and the important point is that the retardation in the display plane of the liquid crystal layer 51 is reduced using a compensating plate, which is then combined with a circular polarizer to create a lateral-field-driven semi-transmissive liquid crystal display device. However, excellent performance in terms of contrast ratio and viewing angle can be obtained by cancelling out the retardation as completely as possible.

Furthermore, a configuration is adopted in the present embodiment wherein the thickness of the liquid crystal layer 51 in the reflective display region 47a is half the thickness of the liquid crystal layer 51 in the transmissive display region 47b, the upper liquid crystal layer compensating plate 52a cancels out and renders isotropic the retardation in the display plane of the liquid crystal layer 51 in the reflective display region 47a, and the lower liquid crystal layer compensating plate 52b together with the upper liquid crystal layer compensating plate 52a cancels out and renders isotropic the retardation in the display plane of the liquid crystal layer 51 in the transmissive display region 47b. However, this configuration is not limiting, and difference thickness conditions can be applied. It is important that the upper liquid crystal layer compensating plate 52a cancel out the retardation in the display plane of the liquid crystal layer 51 in the reflective display region 47a, and that the lower liquid crystal layer compensating plate 52b together with the upper liquid crystal layer compensating plate 52a cancel out the refractive index anisotropy in the display plane of the liquid crystal layer 51 in the transmissive display region 47b. However, making the liquid crystal layer 51 in the reflective display region 47a half as thick as the liquid crystal layer 51 in the transmissive display region 47b as in the present embodiment enables the same compensating plate to be used for the upper liquid crystal layer compensating plate 52a and the lower liquid crystal layer compensating plate 52b, and the cost can therefore be reduced.

In order to prevent contrast reduction in the transmissive display, there is preferably a minimal difference between the in-plane retardation of the liquid crystal layer and the total value of the in-plane retardations of the upper liquid crystal layer compensating plate 52a and the lower liquid crystal layer compensating plate 52b in each wavelength band of visible light. The reason for this is the same as for compensating for the wavelength dependency by setting a 90 degree angle between the slow axes of the in-plane retardation plates. However, since the wavelength dependency of in-plane birefringence of the liquid crystal increases in monotone fashion with respect to an increase in wavelength, a configuration is preferably adopted so that the wavelength dependency of in-plane birefringence in the liquid crystal layer compensating plates increases in monotone fashion with respect to an increase in wavelength.

The upper liquid crystal layer compensating plate 52a and the lower liquid crystal layer compensating plate 52b were provided separately in the present embodiment, but these components may also be provided as a single unit.

The longitudinal direction of the pixel electrodes 49a and the common electrodes 49b was described as being rotated +15 degrees from the X-axis in the present embodiment, but this configuration is not limiting. The longitudinal direction of the pixel electrodes 49a and the common electrodes 49b may be tilted at another angle with respect to the X-axis direction, or the tilt angle may have a different value according to coordinates on the X-axis to create a multi-domain configuration. A multi-domain configuration enables improved viewing angle characteristics particularly when a voltage is applied.

The reflecting plate in the liquid crystal display device of the present embodiment was described as functioning merely as a mirror, but minute surface irregularities may also be provided to the reflecting plate. The reflection characteristics with respect to external light can thereby be controlled.

The liquid crystal layer was also described as having different thicknesses in the reflective display region and the transmissive display region in the liquid crystal display device of the present embodiment, but this configuration enables contrast ratio to be adjusted in the reflective display and the transmissive display.

Furthermore, an FFS (Fringe Field Switching) scheme, an AFFS (Advanced Fringe Field Switching) scheme, or other scheme in the same form with a slightly different structure/arrangement of electrodes may be appropriately used in the liquid crystal display device of the present embodiment. The common electrodes or the pixel electrodes may also serve as reflecting plates.

The liquid crystal molecules were described as having positive dielectric anisotropy in the liquid crystal display device of the present embodiment, but this configuration is not limiting, and liquid crystal molecules having negative dielectric anisotropy may also be used. However, since liquid crystal molecules having negative dielectric anisotropy align in the direction perpendicular to the field direction when a voltage is applied, the initial orientation direction must be set substantially parallel to the field direction. Specifically, the initial orientation direction must be set to the +Y direction that is rotated 90 degrees in the XY plane from the direction of the previously described present embodiment. The positions of the upper liquid crystal layer compensating plate 52a and the lower liquid crystal layer compensating plate 52b must also be accordingly rotated 90 degrees in the XY plane.

The present embodiment will next be described in further detail by comparing typical structure examples and comparative examples of the present embodiment. Table 1 shows the composition of the transmissive display region of the liquid crystal display device according to Typical Structure Example 1. The values of Re and Rth in Table 1 are values for a wavelength of 550 nm. Table 2 shows the refractive indices of the λ/4 plate and the λ/2 plate for which Nz=1.

As shown in FIG. 4A, the alignment angle 13a of the retardation plate is the angle formed by the X-axis and the slow axis 11 of the retardation plate. The counterclockwise direction is defined as positive. In the same manner, the alignment angle 13b of the polarizer as shown in FIG. 4B is the angle formed by the X-axis and the absorption axis 12 of the polarizer.

Higher contrast ratio is required in the transmissive display than in the reflective display. The difference in the alignment angles of the λ/2 plate 3 in which Rth<0 and the λ/2 plate 5 in which Rth>0 is therefore set to 90 degrees so that the plates compensate for the wavelength dispersion characteristics of the in-plane retardations of each other. At this time, since the retardations at each wavelength of the λ/2 plate 3 in which Rth<0 and the λ/2 plate 5 in which Rth>0 are substantially the same, the wavelength dispersion characteristics of the in-plane retardations can be compensated for. The difference of the alignment angles of the λ/4 plate 4 in which Rth>0 and the λ/4 plate 4 in which Rth<0 is set to 90 degrees in the same manner.

Other parameters that are necessary for evaluating the viewing angle characteristics will next be described. The refractive index anisotropy an of the liquid crystal layer 9a of the transmissive display region was 0.07125 (wherein the wavelength is 550 nm), the thickness was 4.0 μm, and the wavelength dependency was such that the refractive index anisotropy increased the shorter the wavelength, the same as in common liquid crystals. In horizontally oriented liquid crystals, Nz=1.0. The refractive indices of the λ/2 plate 3 in which Rth<0 and the λ/2 plate 5 in which Rth>0 were based on the refractive index of the λ/2 plate in Table 2 in which Nz=1; nx and ny were fixed at the values thereof when N=1, and the nz for each Nz coefficient was calculated using the abovementioned Equation 5 and used, The refractive indices for wavelengths other than 400, 500, and 600 nm that are not shown in Table 2 were in accordance with the Cauchy formula. The refractive indices of the λ/4 plate 4 in which Rth>0 and the λ/4 plate 6 in which Rth<0 were also calculated in the same manner.

In the liquid crystal layer compensating plates 7, 8 of the horizontally oriented liquid crystals, nx and ny were fixed at the values thereof when Nz=1, and the nz for each Nz coefficient was calculated using the abovementioned Equation 5 and used based on the change in the thickness d of the λ/2 plate in which Nz=1 in Table 2, and the refractive index of the λ/2 plate in which Nz=1 in Table 2. The refractive indices for wavelengths other than 400, 500, and 600 nm were in accordance with the Cauchy formula.

TABLE 1

|  | Nz | Re (nm) | Rth (nm) | alignment angle (degrees) |
|---|---|---|---|---|
| polarizer 2 | — | — | — | 90.0 |
| λ/2 plate 5 in which Rth > 0 | 1.0 | 275.0 | 137.5 | 100.0 |
| λ/4 plate 6 in which Rth < 0 | 0.0 | 138.0 | −69.0 | 155.0 |
| liquid crystal layer compensating plate 8 | 0.0 | 142.5 | −71.3 | 90.0 |
| liquid crystal layer 9a | 1.0 | 285.0 | 142.5 | 0.0 |
| liquid crystal layer compensating plate 7 | 0.0 | 142.5 | −71.3 | 90.0 |
| λ/4 plate 4 in which Rth > 0 | 1.0 | 138.0 | 69.0 | 65.0 |
| λ/2 plate 3 in which Rth < 0 | 0.0 | 275.0 | −137.5 | 10.0 |
| polarizer 1 | — | — | — | 0.0 |

TABLE 2

| retardation plate | wavelength (nm) | nx | ny | nz |
|---|---|---|---|---|
| λ/4 plate in which Nz = 1 | 400 | 1.5870 | 1.5842 | 1.5842 |
|  | 500 | 1.5867 | 1.5842 | 1.5842 |
|  | 600 | 1.5865 | 1.5842 | 1.5842 |
| λ/4 plate in which Nz = 1 | 400 | 1.5887 | 1.5835 | 1.5835 |
|  | 500 | 1.5882 | 1.5835 | 1.5835 |
|  | 600 | 1.5879 | 1.5835 | 1.5835 |

FIG. 9 is an equal contrast ratio diagram showing the results of evaluating the viewing angle characteristics in the transmissive display region of the liquid crystal display device according to Typical Structure Example 1. In FIG. 9, the liquid crystal drive voltage was varied to obtain the luminance of the maximum white state, and an equal contrast ratio diagram of the viewing angle characteristics was then calculated by dividing the white-state luminance by the luminance of the black state that occurs in the initial state of the liquid crystals. The contrast ratio is displayed from values of 3 to 1000, and a whiter color indicates a higher contrast ratio.

Equal contrast ratio curves at contrast ratios of 300, 200, 100, 50, and 10 are also shown. The X-axis, the Y-axis, and the Z-axis shown are the same as defined by the coordinates in FIG. 3. The point at the center of the circle in the equal contrast ratio diagram indicates the contrast ratio when the liquid crystal display device is viewed from the Z-axis. The four concentric circles shown in the diagram indicate the contrast ratio at angles (the tilt angles are referred to as polar angles) of 20, 40, 60, and 80 degrees from the Z-axis.

Table 3 shows the composition of the reflective display region of the liquid crystal display device according to Typical Structure Example 1. The values of Re and Rth in Table 3 are values for a wavelength of 550 nm. The refractive indices used in each composition were the same as those of the transmissive display region of the liquid crystal display device according to Typical Structure Example 1. The thickness of the liquid crystal layer 9b of the reflective display region was 2.0 µm, and the reflecting plate 10 was treated as having mirror reflection characteristics.

TABLE 3

|  | Nz | Re (nm) | Rth (nm) | alignment angle (degrees) |
|---|---|---|---|---|
| polarizer 2 | — | — | — | 90.0 |
| λ/2 plate 5 in which Rth > 0 | 1.0 | 275.0 | 137.5 | 100.0 |
| λ/4 plate 6 in which Rth < 0 | 0.0 | 138.0 | −69.0 | 155.0 |
| liquid crystal layer compensating plate 8 | 0.0 | 142.5 | −71.3 | 90.0 |
| liquid crystal layer 9b | 1.0 | 142.5 | 71.3 | 0.0 |

FIG. 10 is an equal contrast ratio diagram showing the results of evaluating the viewing angle characteristics in the reflective display region of the liquid crystal display device according to Typical Structure Example 1. The contrast ratio is displayed from values of 3 to 1000, and a whiter color indicates a higher contrast ratio, the same as in FIG. 9. Equal contrast ratio curves at contrast ratios of 300, 200, 100, 50, and 10 are also shown. The X-axis, the Y-axis, and the Z-axis shown are the same as defined by the coordinates in FIG. 3.

Figure 34:
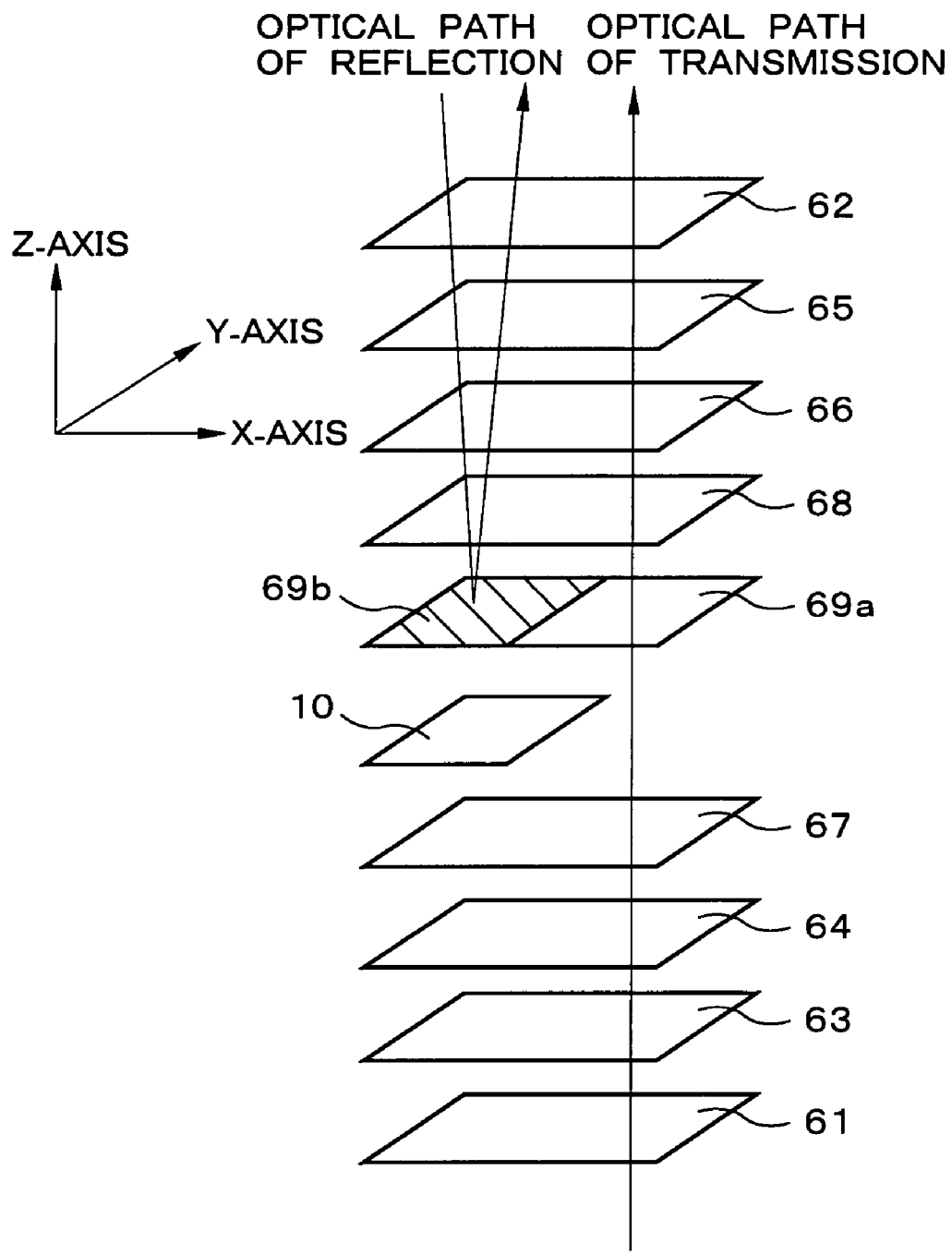
FIG. 34 is a perspective view showing the structure of the liquid crystal display device according to Comparative Structure Example 1.

Comparative examples will next be described. Comparative Structure Example 1 will first be described. FIG. 34 is a perspective view showing the structure of the liquid crystal display device according to Comparative Structure Example 1. As shown in FIG. 34, Comparative Structure Example 1 differs from Typical Structure Example 1 in that the circular polarizer on the backlight side is composed of a polarizer 61, a λ/2 plate 63 in which Rth>0, and a λ/4 plate 64 in which Rth>0, and the circular polarizer on the display side is composed of a polarizer 62, a λ/2 plate 65 in which Rth>0, and a λ/4 plate 66 in which Rth>0. Specifically, the retardations in the thickness direction of the in-plane retardation plates are all positive. Other aspects of the structure are the same as in Typical Structure Example 1.

Figure 11:
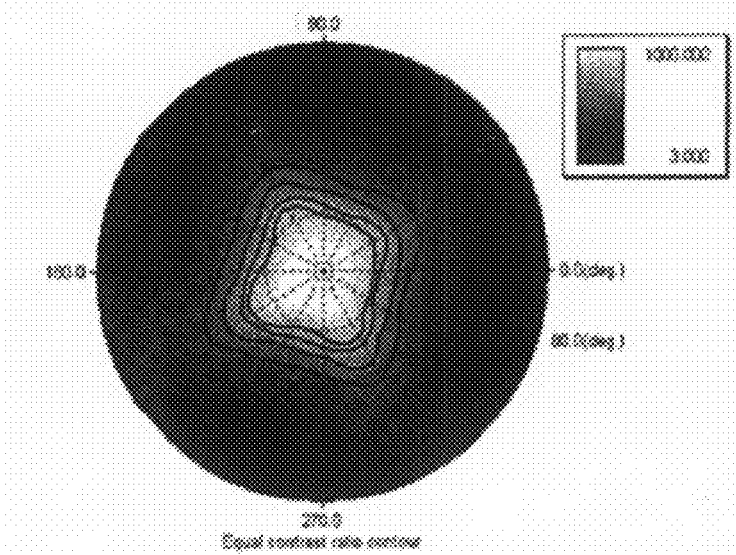
FIG. 11 is an equal contrast ratio diagram showing the results of evaluating the viewing angle characteristics in the transmissive display region of the liquid crystal display device according to Comparative Structure Example 1.
Figure 12:
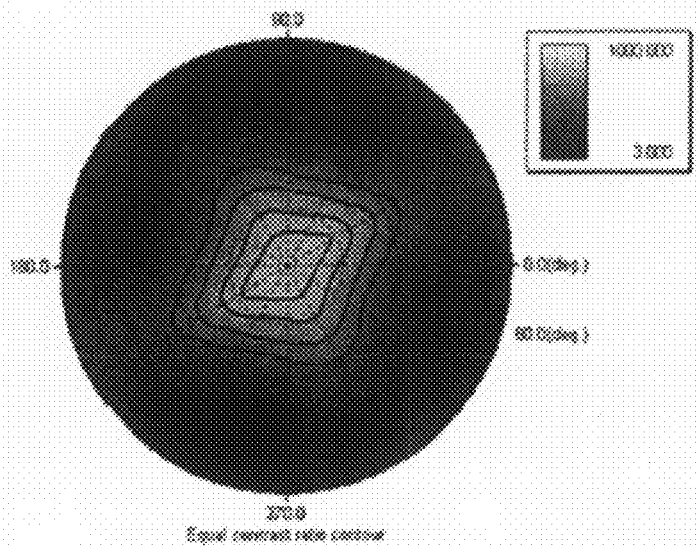
FIG. 12 is an equal contrast ratio diagram showing the results of evaluating the viewing angle characteristics in the reflective display region of the liquid crystal display device according to Comparative Structure Example 1.

Tables 4 and 5 show the compositions (values for a wavelength of 550 nm) of the transmissive display region and the reflective display region, respectively, of the liquid crystal display device according to Comparative Structure Example 1. FIGS. 11 and 12 are equal contrast ratio diagrams showing the results of evaluating the viewing angle characteristics in the transmissive display region and the reflective display region, respectively, of the liquid crystal display device according to Comparative Structure Example 1.

TABLE 4

|  | Nz | Re (nm) | Rth (nm) | alignment angle (degrees) |
|---|---|---|---|---|
| polarizer 62 | — | — | — | 90.0 |
| λ/2 plate 65 in which Rth > 0; | 1.0 | 275.0 | 137.5 | 100.0 |
| λ/4 plate 66 in which Rth > 0; | 1.0 | 138.0 | 69.0 | 155.0 |
| Liquid crystal Layer compensating plate 68 | 0.0 | 142.5 | −71.3 | 90.0 |
| liquid crystal layer 69a | 1.0 | 285.0 | 142.5 | 0.0 |
| liquid crystal layer compensating plate 67 | 0.0 | 142.5 | −71.3 | 90.0 |
| λ/4 plate 64 in which Rth > 0 | 1.0 | 138.0 | 69.0 | 65.0 |
| λ/2 plate 63 in which Rth > 0 | 1.0 | 275.0 | −137.5 | 10.0 |
| polarizer 61 | — | — | — | 0.0 |

TABLE 5

|  | Nz | Re (nm) | Rth (nm) | alignment angle (degrees) |
|---|---|---|---|---|
| polarizer 62 | — | — | — | 90.0 |
| λ/2 plate 65 in which Rth > 0 | 1.0 | 275.0 | 137.5 | 100.0 |
| λ/4 plate 66 in which Rth > 0 | 1.0 | 138.0 | 69.0 | 155.0 |
| liquid crystal layer compensating plate 68 | 0.0 | 142.5 | −71.3 | 90.0 |
| liquid crystal layer 69b | 1.0 | 142.5 | 71.3 | 0.0 |

Figure 35:
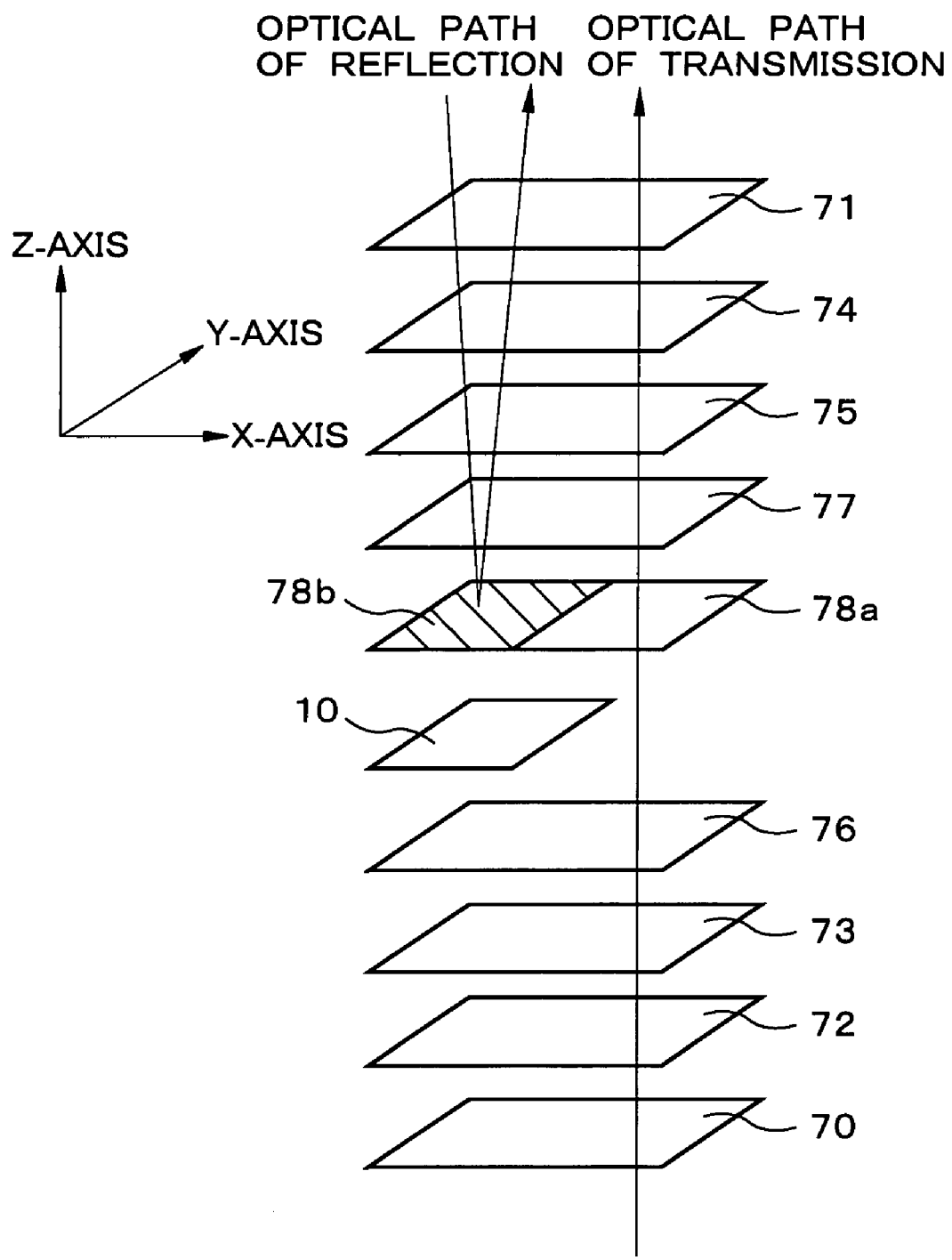
FIG. 35 is a perspective view showing the structure of the liquid crystal display device according to Comparative Structure Example 2.

Comparative Structure Example 2 will next be described. FIG. 35 is a perspective view showing the structure of the liquid crystal display device according to Comparative Structure Example 2. As shown in FIG. 35, Comparative Structure Example 2 differs from Typical Structure Example 1 in that the circular polarizer on the backlight side is composed of a polarizer 70, a λ/2 plate 72 in which Rth<0, and a λ/4 plate 73 in which Rth>0, and the circular polarizer on the display side is composed of a polarizer 71, a λ/2 plate 74 in which Rth<0, and a λ/4 plate 75 in which Rth>0. The total of the retardations in the thickness direction for the four in-plane retardation plates is small, being 1.0 nm, but since the reference symbol of the Rth is the same between the λ/2 plate 72 in which Rth<0 and the λ/2 plate 74 in which Rth<0, and between the λ/4 plate 73 in which Rth>0 and the λ/4 plate 75 in which Rth>0, the Rth does not decrease. Other aspects of the structure are the same as in Typical Structure Example 1.

Tables 6 and 7 show the compositions (values for a wavelength of 550 nm) of the transmissive display region and the reflective display region, respectively, of the liquid crystal display device according to Comparative Structure Example 2. FIGS. 13 and 14 are equal contrast ratio diagrams showing the results of evaluating the viewing angle characteristics in the transmissive display region and the reflective display region, respectively, of the liquid crystal display device according to Comparative Structure Example 2.

TABLE 6

| | Nz | Re (nm) | Rth (nm) | alignment angle (degrees) |
|---|---|---|---|---|
| polarizer 71 | — | — | — | 90.0 |
| λ/2 plate 74 in which Rth < 0 | 0.0 | 275.0 | −137.5 | 100.0 |
| λ/4 plate 75 in which Rth > 0 | 1.5 | 138.0 | 138.0 | 155.0 |
| liquid crystal layer compensating plate 77 | 0.0 | 142.5 | −71.3 | 90.0 |
| liquid crystal layer 78a | 1.0 | 285.0 | 142.5 | 0.0 |
| liquid crystal layer compensating plate 76 | 0.0 | 142.5 | −71.3 | 90.0 |
| λ/4 plate 73 in which Rth > 0 | 1.5 | 138.0 | 138.0 | 65.0 |
| λ/2 plate 72 in which Rth < 0 | 0.0 | 275.0 | −137.5 | 10.0 |
| polarizer 70 | — | — | — | 0.0 |

TABLE 7

| | Nz | Re (nm) | Rth (nm) | alignment angle (degrees) |
|---|---|---|---|---|
| polarizer 71 | — | — | — | 90.0 |
| λ/2 plate 74 in which Rth < 0 | 0.0 | 275.0 | −137.5 | 100.0 |
| λ/4 plate 75 in which Rth > 0 | 1.5 | 138.0 | 138.0 | 155.0 |
| liquid crystal layer compensating plate 77 | 0.0 | 142.5 | −71.3 | 90.0 |
| liquid crystal layer 78b | 1.0 | 142.5 | 71.3 | 0.0 |

Following is a comparison of the viewing angle characteristics in Typical Structure Example 1, Comparative Structure Example 1, and Comparative Structure Example 2 described above. As shown in FIG. 9, in the viewing angle characteristics of the transmissive display region in Typical Structure Example 1, the region in which the contrast ratio is 300 or higher is wider, and the viewing angle characteristics are enhanced in relation to Comparative Structure Example 1 (FIG. 11). These are effects of reducing the absolute value of the sum of the retardation in the thickness direction between the λ/2 plate 3 in which Rth<0 and the λ/2 plate 5 in which Rth>0, and between the λ/4 plate 4 in which Rth>0 and the λ/4 plate 6 in which Rth<0. Furthermore, as shown in FIG. 10, the viewing angle characteristics of the reflective display region in Typical Structure Example 1 are enhanced overall in relation to Comparative Structure Example 1 (FIG. 12). This is an effect of reducing the retardation in the thickness direction between the λ/2 plate 5 in which Rth>0 and the λ/4 plate 6 in which Rth<0.

As shown in FIG. 13, the regions of the equal contrast ratio curves are smaller in Comparative Structure Example 2 than in Comparative Structure Example 1 (FIG. 11), and the viewing angle characteristics of the transmissive display region are poor. As shown in FIG. 14, the viewing angle characteristics of the reflective display region are poor overall in relation to Comparative Structure Example 1 (FIG. 12)

As is apparent from Comparative Structure Example 2, even when the circular polarizer is composed of in-plane retardation plates having a negative retardation in the thickness direction, the improvement gained by using an in-plane retardation plate in which Rth<0 is minimal when the absolute value of the sum of the Rth is not reduced between the pair of in-plane retardation plates, such as between the λ/2 plate of the circular polarizer on the backlight side and the λ/2 plate of the circular polarizer on the display side.

Therefore, the effect of reducing the absolute value of the sum of the Rth between the λ/2 plate 3 in which Rth<0 and the λ/2 plate 5 in which Rth>0, and between the λ/4 plate 4 in which Rth>0 and the λ/4 plate 6 in which Rth<0 as in Typical Structure Example 1 makes it possible to obtain higher contrast ratio in both the reflective display region and the viewing angle characteristics of the transmissive display region of the liquid crystal display device.

Figure 36:
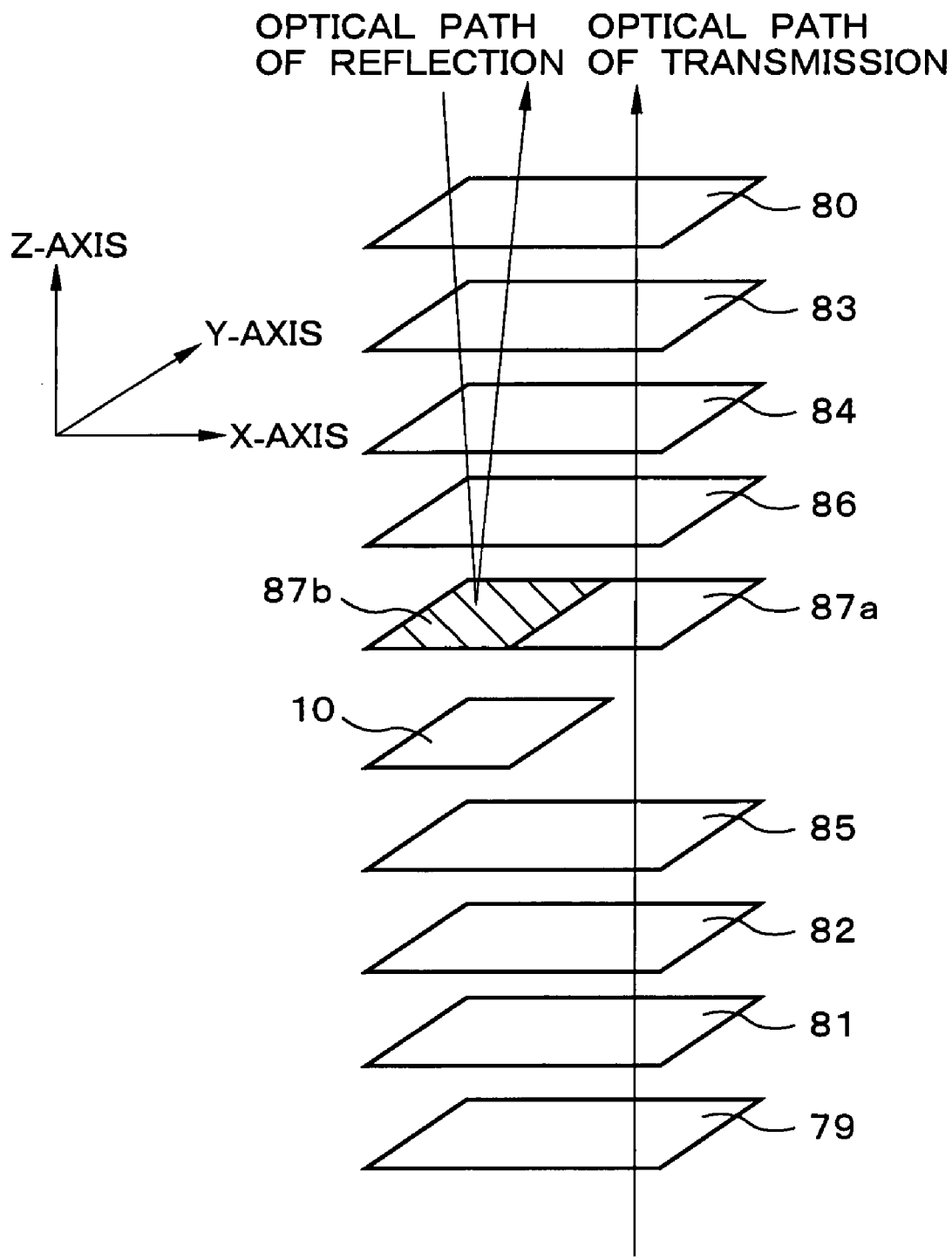
FIG. 36 is a perspective view showing the structure of the liquid crystal display device according to Typical Structure Examples 2 through 9.

An example in which the thickness-direction retardations of the in-plane retardation plates are varied with respect to Typical Structure Example 1 will next be described. FIG. 36 is a perspective view showing the structure of the liquid crystal display device according to Typical Structure Examples 2 through 9. As shown in FIG. 36, the transmissive display region in Typical Structure Examples 2 through 9 is composed of a polarizer 80, a λ/2 plate 83, a λ/4 plate 84, a liquid crystal compensating plate 86, a liquid crystal layer 87a, a liquid crystal layer compensating plate 85, a λ/4 plate 82, a λ/2 plate 81, and a polarizer 79 layered in sequence as viewed from the display side. Tables 8 through 11 show the specific compositions (values for a wavelength of 550 nm) of Typical Structure Examples 2 through 9.

The alignment angles and the retardations Re in the in-plane direction are the same for Typical Structure Examples 2 through 9. The liquid crystal layer compensation plates 85, 86, and the liquid crystal layer 87a are also the same for Typical Structure Examples 2 through 9. Other structural aspects are the same as in Typical Structure Example 1.

TABLE 8

| | common values | | Typical Structure Example 2 | | Typical Structure Example 3 | |
|---|---|---|---|---|---|---|
| composition | Re (nm) | alignment angle (degrees) | Nz | Rth (nm) | Nz | Rth (nm) |
| polarizer 80 | — | 90 | — | — | — | — |
| λ/2 plate 83 | 275.0 | 100.0 | 1.5 | 275.0 | 1.0 | 137.5 |
| λ/4 plate 84 | 138.0 | 155.0 | −0.5 | −138.0 | 1.0 | 69.0 |
| liquid crystal layer compensating plate 86 | 142.5 | 90.0 | 0.0 | −71.3 | 0.0 | −71.3 |
| liquid crystal layer 87a | 285.0 | 0.0 | 1.0 | 142.5 | 1.0 | 142.5 |
| liquid crystal layer compensating plate 85 | 142.5 | 90.0 | 0.0 | −71.3 | 0.0 | −71.3 |
| λ/4 plate 82 | 138.0 | 65.0 | 1.5 | 138.0 | 0..0 | −69.0 |
| λ/2 plate 81 | 275.0 | 10.0 | −0.5 | −275.0 | 0.0 | −137.5 |
| polarizer 79 | — | 0.0 | — | — | — | — |

TABLE 9

| | common values | | Typical Structure Example 4 | | Typical Structure Example 5 | |
|---|---|---|---|---|---|---|
| composition | Re (nm) | alignment angle (degrees) | Nz | Rth (nm) | Nz | Rth (nm) |
| polarizer 80 | — | 90 | — | — | — | — |
| λ/2 plate 83 | 275.0 | 100.0 | 0.0 | −137.5 | 0.0 | −137.5 |

TABLE 9-continued

| composition | common values | | Typical Structure Example 4 | | Typical Structure Example 5 | |
|---|---|---|---|---|---|---|
| | Re (nm) | alignment angle (degrees) | Nz | Rth (nm) | Nz | Rth (nm) |
| λ/4 plate 84 | 138.0 | 155.0 | 0.0 | −69.0 | 1.0 | 69.0 |
| liquid crystal layer compensating plate 86 | 142.5 | 90.0 | 0.0 | −71.3 | 0.0 | −71.3 |
| liquid crystal layer 87a | 285.0 | 0.0 | 1.0 | 142.5 | 1.0 | 142.5 |
| liquid crystal layer compensating plate 85 | 142.5 | 90.0 | 0.0 | −71.3 | 0.0 | −71.3 |
| λ/4 plate 82 | 138.0 | 65.0 | 1.0 | 69.0 | 0.0 | −69.0 |
| λ/2 plate 81 | 275.0 | 10.0 | 1.0 | 137.5 | 1.0 | 137.5 |
| polarizer 79 | — | 0.0 | — | — | — | — |

TABLE 10

| composition | common values | | Typical Structure Example 6 | | Typical Structure Example 7 | |
|---|---|---|---|---|---|---|
| | Re (nm) | alignment angle (degrees) | Nz | Rth (nm) | Nz | Rth (nm) |
| polarizer 80 | — | 90 | — | — | — | — |
| λ/2 plate 83 | 275.0 | 100.0 | 0.0 | −137.5 | 1.0 | 137.5 |
| λ/4 plate 84 | 138.0 | 155.0 | 1.5 | 138.0 | −0.5 | −138.0 |
| liquid crystal layer compensating plate 86 | 142.5 | 90.0 | 0.0 | −71.3 | 0.0 | −71.3 |
| liquid crystal layer 87a | 285.0 | 0.0 | 1.0 | 142.5 | 1.0 | 142.5 |
| liquid crystal layer compensating plate 85 | 142.5 | 90.0 | 0.0 | −71.3 | 0.0 | −71.3 |
| λ/4 plate 82 | 138.0 | 65.0 | −0.5 | −138.0 | 1.5 | 138.0 |
| λ/2 plate 81 | 275.0 | 10.0 | 1.0 | 137.5 | 0.0 | −137.5 |
| polarizer 79 | — | 0.0 | — | — | — | — |

TABLE 11

| composition | common values | | Typical Structure Example 8 | | Typical Structure Example 9 | |
|---|---|---|---|---|---|---|
| | Re (nm) | alignment angle (degrees) | Nz | Rth (nm) | Nz | Rth (nm) |
| polarizer 80 | — | 90 | — | — | — | — |
| λ/2 plate 83 | 275.0 | 100.0 | −0.5 | −275.0 | 1.0 | 137.5 |
| λ/4 plate 84 | 138.0 | 155.0 | 2.0 | 207.0 | −0.5 | −137.5 |
| liquid crystal layer compensating plate 86 | 142.5 | 90.0 | 0.0 | −71.3 | 0.0 | −71.3 |
| liquid crystal layer 87a | 285.0 | 0.0 | 1.0 | 142.5 | 1.0 | 142.5 |
| liquid crystal layer compensating plate 85 | 142.5 | 90.0 | 0.0 | −71.3 | 0.0 | −71.3 |
| λ/4 plate 82 | 138.0 | 65.0 | −1.0 | −207.0 | 1.5 | 137.5 |
| λ/2 plate 81 | 275.0 | 10.0 | 1.5 | 275.0 | 0.0 | 137.5 |
| polarizer 79 | — | 0.0 | — | — | — | — |

The viewing angle characteristics of the transmissive display are also enhanced in Typical Structure Examples 2 through 9 in the same manner as in Typical Structure Example 1. In Typical Structure Examples 2 through 7, the absolute value of Rth of the λ/2 plate 81 and the λ/4 plate 82 is smaller than in Typical Structure Example 8, and the light incident on the liquid crystal layer 87a does not significantly deviate from circularly polarized light when viewed from an angle. The viewing angle characteristics of the transmissive display are therefore enhanced with respect to Typical Structure Example 8. In comparison to Typical Structure Example 9, the absolute value of Rth is reduced not only between the λ/4 plate 82 and the λ/4 plate 84, but also between the λ/2 plate 81 and the λ/2 plate 83 in Typical Structure Examples 2 through 7, and the viewing angle characteristics of the transmissive display are therefore further enhanced.

The liquid crystal display device is described as a semi-transmissive liquid crystal display device in all of the embodiments and typical structure examples of the present invention, but the present invention can also be suitably applied to transmissive liquid crystal display devices and reflective liquid crystal display devices by substituting the structure of the transmissive display part for the structure of a transmissive liquid crystal display device, and substituting the structure of the reflective display part for the structure of a reflective liquid crystal display device.

Figure 37:
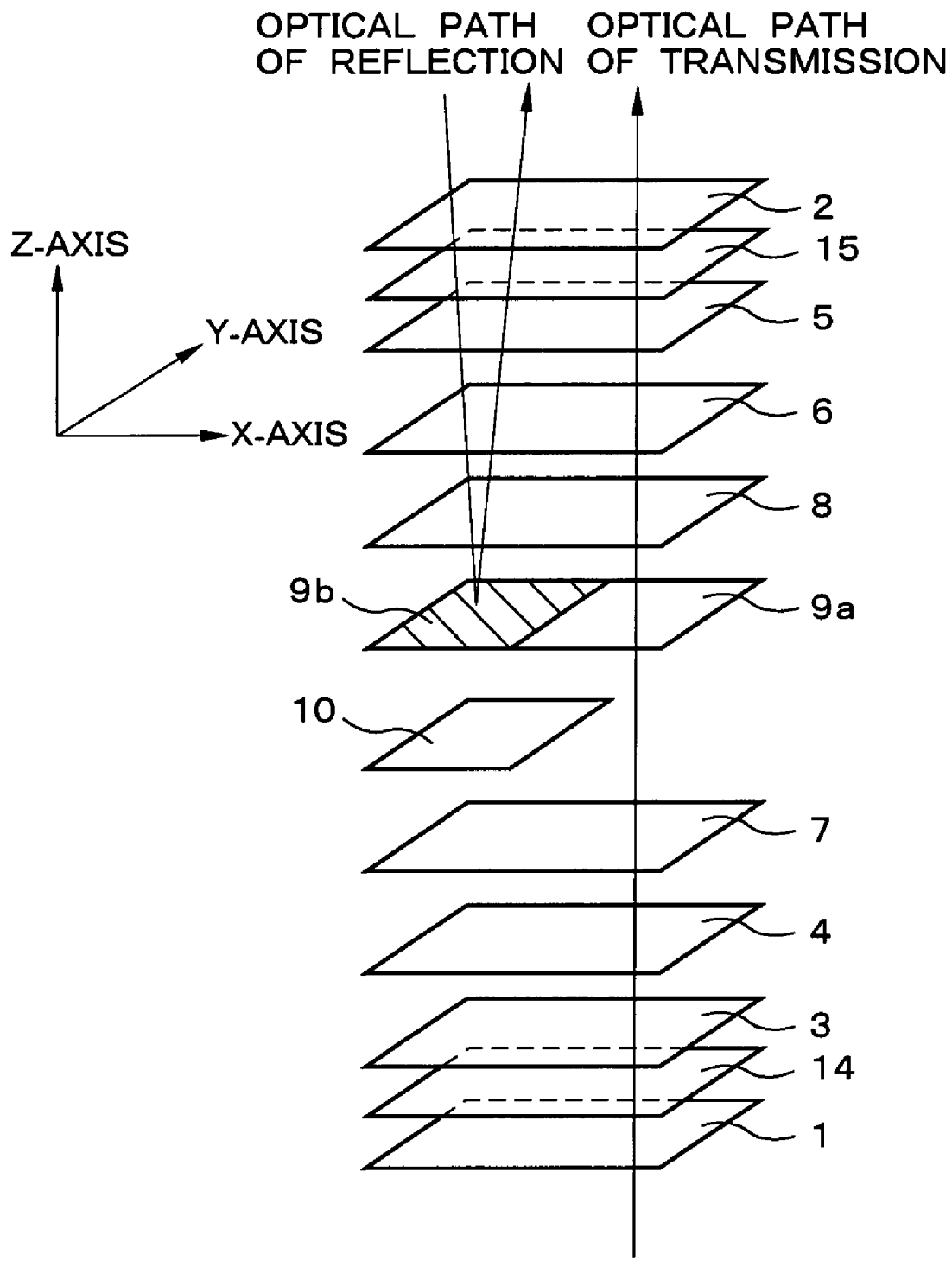
FIG. 37 is a diagram showing a schematic perspective view of the structure of the liquid crystal display device according to Embodiment 2, and a diagram showing the structure of the circular polarizer of the present invention.

The liquid crystal display device according to Embodiment 2 of the present invention will next be described. The present embodiment is also an embodiment of the structure of the circular polarizer. FIG. 37 is a diagram showing a schematic perspective view of the structure of the liquid crystal display device according to Embodiment 2, and a diagram showing the structure of the circular polarizer of the present invention. The present embodiment differs from Embodiment 1 in that a polarizer compensating plate as another in-plane retardation plate is provided between the polarizer and the in-plane retardation plate, and the polarizer compensating plate is positioned so that the transmission axis of the polarizer and the slow axis of the polarizer compensating plate are parallel to each other. Specifically, as shown in FIG. 37, a polarizer compensating plate 15 is provided between the polarizer 2 and the λ/2 plate 5 in which Rth>0, and a polarizer compensating plate 14 is provided between the polarizer 1 and the λ/2 plate 3 in which Rth<0. Other structural aspects are the same as in Embodiment 1. By such a configuration, the viewing angle characteristics of the polarizers are enhanced as well as the viewing angle characteristics of the circular polarizer, and the viewing angle characteristics of the transmissive display region are even further enhanced. Other operations and effects are the same as in Embodiment 1.

Figure 15:
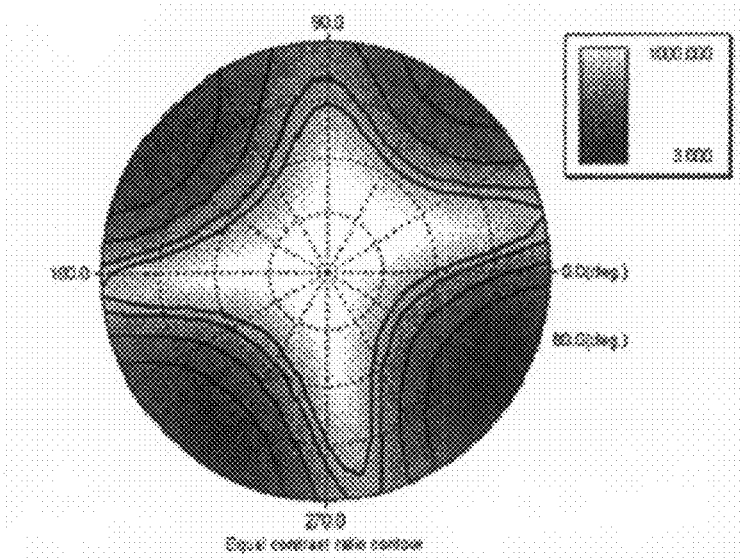
FIG. 15 is an equal contrast ratio diagram showing the results of evaluating the viewing angle characteristics in the transmissive display region of the liquid crystal display device according to Typical Structure Example 10.
Figure 16:
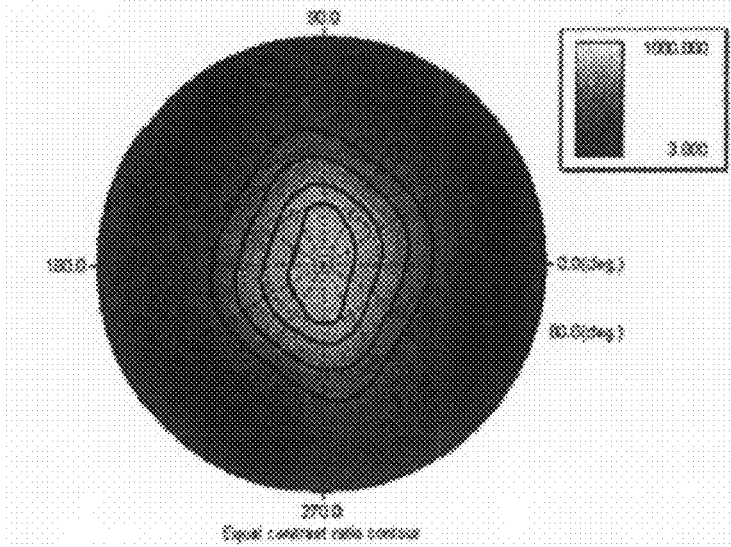
FIG. 16 is an equal contrast ratio diagram showing the results of evaluating the viewing angle characteristics in the reflective display region of the liquid crystal display device according to Typical Structure Example 10.

The present embodiment will next be described in further detail using Typical Structure Example 10 of the present embodiment. Tables 12 and 13 show the compositions (values for a wavelength of 550 nm) of the transmissive display region and the reflective display region, respectively, of the liquid crystal display device according to Typical Structure Example 10. FIGS. 15 and 16 are equal contrast ratio diagrams showing the results of evaluating the viewing angle characteristics in the transmissive display region and the reflective display region, respectively, of the liquid crystal display device according to Typical Structure Example 10. The refractive indices used for the polarizer compensating layers 14, 15 were calculated by varying the thickness d of the λ/2 plate in which Nz=1 in Table 2. The refractive indices for wavelengths other than 400, 500, and 600 nm were in accordance with the Cauchy formula.

TABLE 12

|  | Nz | Re (nm) | Rth (nm) | alignment angle (degrees) |
|---|---|---|---|---|
| polarizer 2 | — | — | — | 90.0 |
| polarizer compensating plate 15 | 1.0 | 100.0 | 50.0 | 90.0 |
| λ/2 plate 5 in which Rth > 0 | 1.0 | 275.0 | 137.5 | 100.0 |
| λ/4 plate 6 in which Rth < 0 | 0..0 | 138.0 | −69.0 | 155.0 |
| liquid crystal layer compensating plate 8 | 0.0 | 142.5 | −71.3 | 90.0 |
| liquid crystal layer 9a | 1.0 | 285.0 | 142.5 | 0.0 |
| liquid crystal layer compensating plate 7 | 0.0 | 142.5 | −71.3 | 90.0 |
| λ/4 plate 4 in which Rth > 0 | 1.0 | 138.0 | 69.0 | 65.0 |
| λ/2 plate 3 in which Rth < 0 | 0.0 | 275.0 | −137.5 | 10.0 |
| polarizer compensating plate 14 | 1.0 | 100.0 | 50.0 | 0.0 |
| polarizer 1 | — | — | — | 0.0 |

TABLE 13

|  | Nz | Re (nm) | Rth (nm) | alignment angle (degrees) |
|---|---|---|---|---|
| polarizer 2 | — | — | — | 90.0 |
| polarizer compensating plate 15 | 1.0 | 100.0 | 50.0 | 90.0 |
| λ/2 plate 5 in which Rth > 0 | 1.0 | 275.0 | 137.5 | 100.0 |
| λ/4 plate 6 in which Rth < 0 | 0.0 | 138.0 | −69.0 | 155.0 |
| liquid crystal layer compensating plate 8 | 0.0 | 142.5 | −71.3 | 90.0 |
| liquid crystal layer 9b | 1.0 | 142.5 | 71.3 | 0.0 |

As shown in FIG. 15, in the viewing angle characteristics of the transmissive display region in Typical Structure Example 10, the region in which the contrast ratio is 300 or higher is wider, and the viewing angle characteristics are enhanced in relation to Comparative Structure Example 1 (FIG. 11). Furthermore, in the viewing angle characteristics of the transmissive display region in Typical Structure Example 10, the region in which the contrast ratio is 10 or higher is wider, and the viewing angle characteristics are enhanced in relation to Typical Structure Example 1 (FIG. 9). As shown in FIG. 16, the viewing angle characteristics in the reflective display region of Typical Structure Example 10 are enhanced overall in relation to Comparative Structure Example 1 (FIG. 12). The viewing angle characteristics in the reflective display region of Typical Structure Example 10 are about the same as in Typical Structure Example 1 (FIG. 10).

In the present embodiment, the polarizer compensating plates 14, 15 were used in the circular polarizers on both the backlight side and the display side, but this configuration is not limiting, and a polarizer compensating plate may be used on only one side. Polarizer compensating plates in which Nz=1.0 were also used in the present embodiment, but a polarizer compensating plate having a difference Nz coefficient may also be used.

The polarizer compensating plates 14 and 15 both had the same characteristics in the present embodiment, but the polarizer compensating plates may also have different characteristics. The slow axes of a polarizer compensating plates, and the absorption axes of the polarizers were also set so as to be parallel to each other in the present embodiment, but these axes may also be set perpendicular to each other. A polarizer compensating plate may also be applied to other embodiments to further enhance the viewing angle characteristics.

Figure 38:
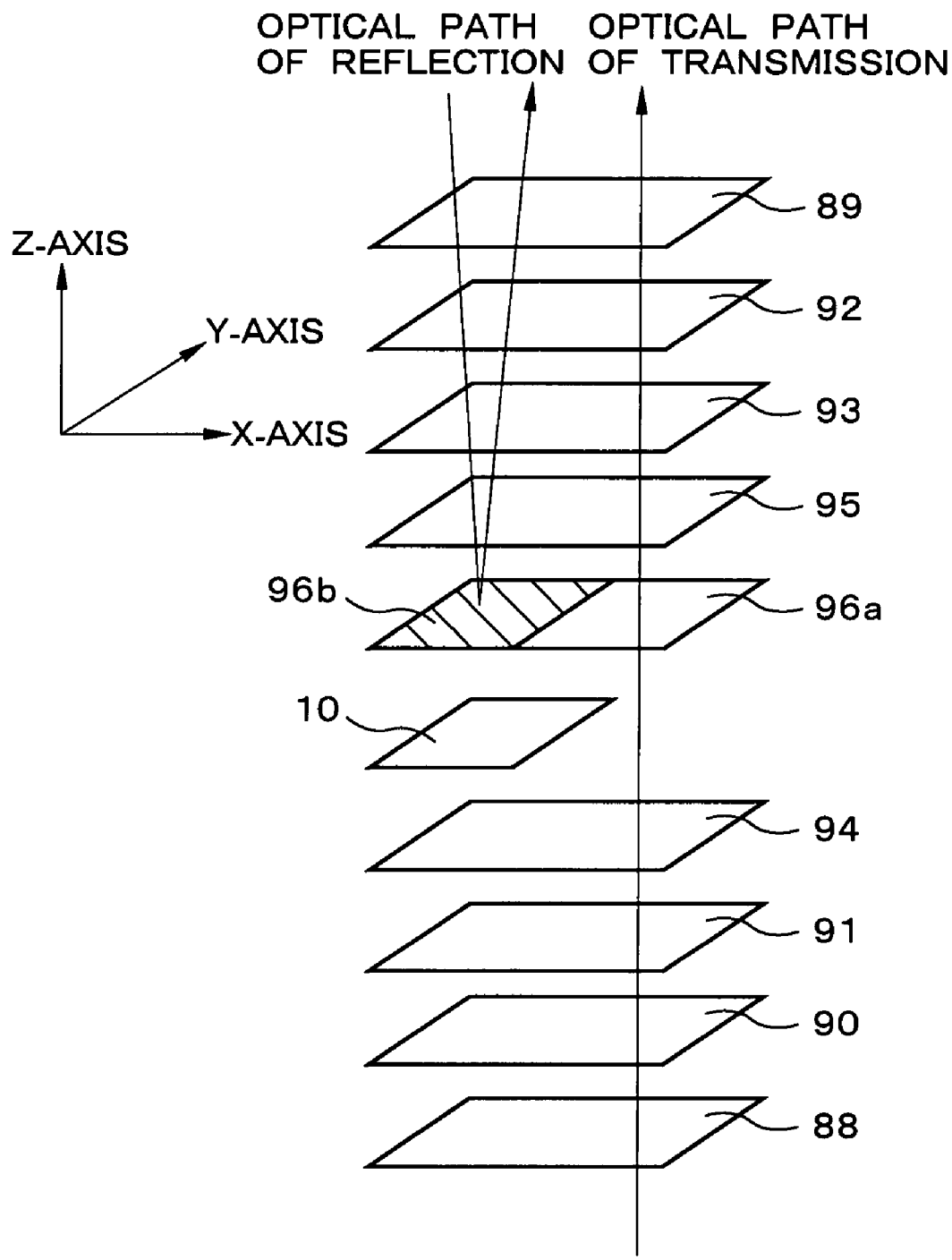
FIG. 38 is a diagram showing a schematic perspective view of the structure of the liquid crystal display device according to Embodiment 3, and a diagram showing the structure of the circular polarizer of the present invention.

The liquid crystal display device according to Embodiment 3 of the present invention will next be described. The present embodiment is also an embodiment of the structure of the circular polarizer. FIG. 38 is a diagram showing a schematic perspective view of the structure of the liquid crystal display device according to Embodiment 3, and a diagram showing the structure of the circular polarizer of the present invention. As shown in FIG. 38, the present embodiment differs from Embodiment 1 in that the circular polarizer on the backlight side is composed of a polarizer 88, a λ/2 plate 90 in which Rth=0, and a λ/4 plate 91 in which Rth=0; and the circular polarizer on the display side is composed of a polarizer 89, a λ/2 plate 92 in which Rth=0, and a λ/4 plate 93 in which Rth=0. Other structural aspects are the same as in Embodiment 1. By such a configuration, the viewing angle characteristics in the transmissive display are enhanced by setting the Rth of each in-plane retardation plate constituting the circular polarizers to zero or substantially to zero. Other operations and effects are the same as in Embodiment 1.

Figure 17:
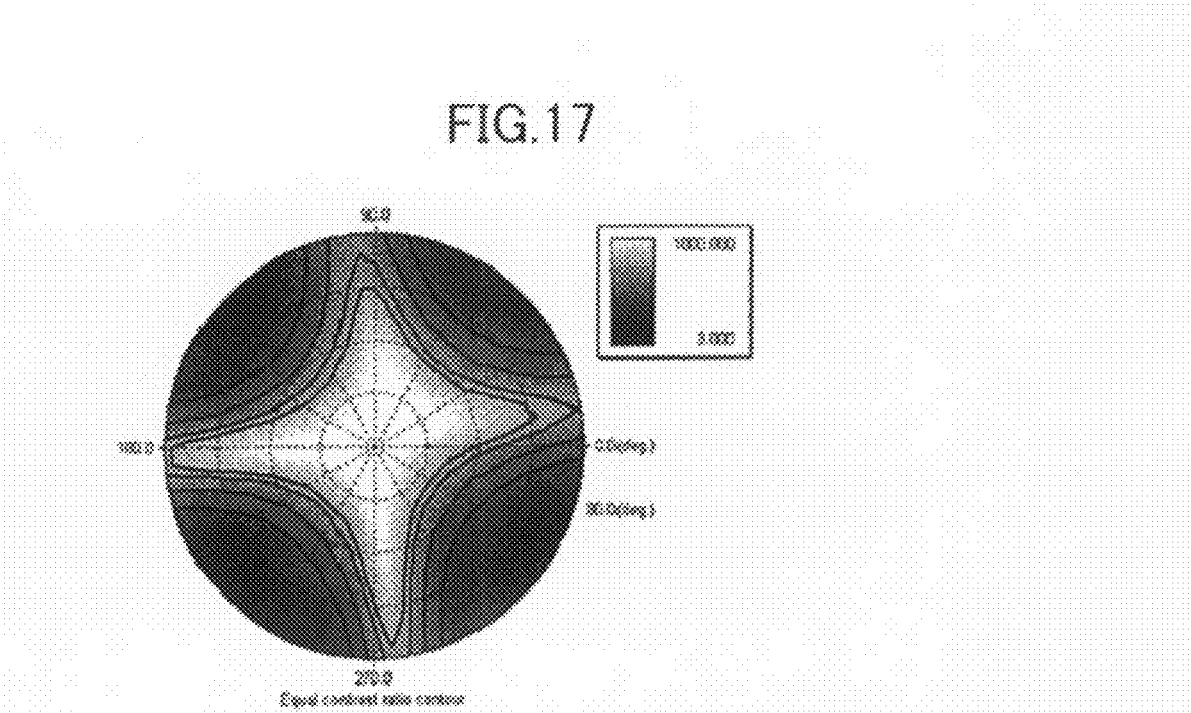
FIG. 17 is an equal contrast ratio diagram showing the results of evaluating the viewing angle characteristics in the transmissive display region of the liquid crystal display device according to Typical Structure Example 11.
Figure 18:
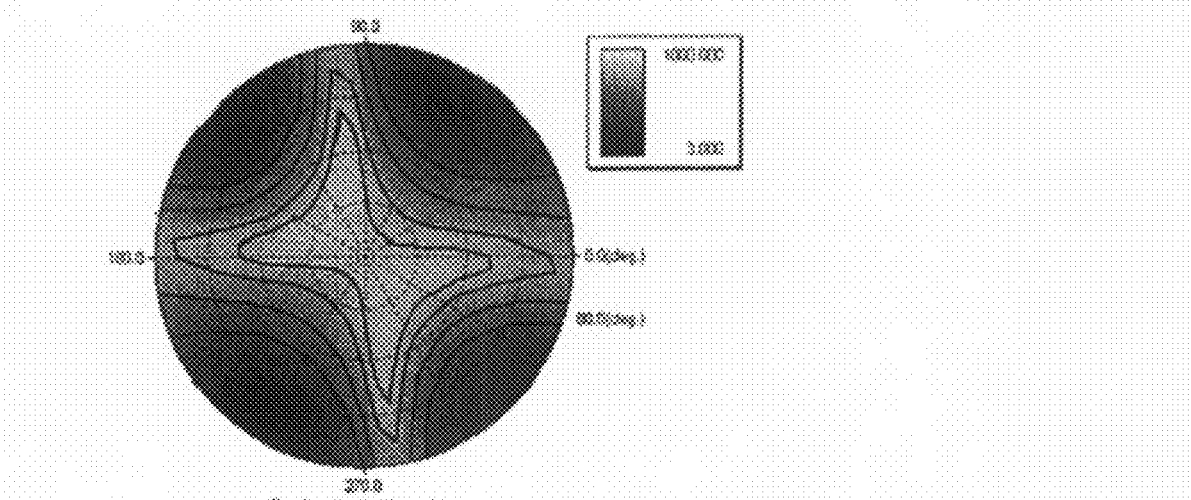
FIG. 18 is an equal contrast ratio diagram showing the results of evaluating the viewing angle characteristics in the reflective display region of the liquid crystal display device according to Typical Structure Example 11.

The present embodiment will next be described in further detail using Typical Structure Example 11 of the present embodiment. Tables 14 and 15 show the compositions (values for a wavelength of 550 nm) of the transmissive display region and the reflective display region, respectively, of the liquid crystal display device according to Typical Structure Example 11. FIGS. 17 and 18 are equal contrast ratio diagrams showing the results of evaluating the viewing angle characteristics in the transmissive display region and the reflective display region, respectively, of the liquid crystal display device according to Typical Structure Example 11.

TABLE 14

|  | Nz | Re (nm) | Rth (nm) | alignment angle (degrees) |
|---|---|---|---|---|
| polarizer 89 | — | — | — | 90.0 |
| λ/2 plate 92 in which Rth = 0 | 0.5 | 275.0 | 0.0 | 100.0 |
| λ/4 plate 93 in which Rth = 0 | 0.5 | 138.0 | 0.0 | 155.0 |
| liquid crystal layer compensating plate 95 | 0.0 | 142.5 | −71.3 | 90.0 |
| liquid crystal layer 96a | 1.0 | 285.0 | 142.5 | 0.0 |
| liquid crystal layer compensating plate 94 | 0.0 | 142.5 | −71.3 | 90.0 |
| λ/4 plate 91 | 0.5 | 138.0 | 0.0 | 65.0 |

TABLE 14-continued

|  | Nz | Re (nm) | Rth (nm) | alignment angle (degrees) |
|---|---|---|---|---|
| in which Rth = 0 |  |  |  |  |
| λ/2 plate 90 | 0.5 | 275.0 | 0.0 | 10.0 |
| in which Rth = 0 |  |  |  |  |
| polarizer 88 | — | — | — | 0.0 |

TABLE 15

|  | Nz | Re (nm) | Rth (nm) | alignment angle (degrees) |
|---|---|---|---|---|
| polarizer 89 | — | — | — | 90.0 |
| λ/2 plate 92 | 0.5 | 275.0 | 0.0 | 100.0 |
| in which Rth = 0 |  |  |  |  |
| λ/4 plate 93 | 0.5 | 138.0 | 0.0 | 155.0 |
| in which Rth = 0 |  |  |  |  |
| liquid crystal layer compensating plate 95 | 0.0 | 142.5 | −71.3 | 90.0 |
| liquid crystal layer 96b | 1.0 | 142.5 | 71.3 | 0.0 |

As shown in FIG. 17, in the viewing angle characteristics of the transmissive display region in Typical Structure Example 11, the region in which the contrast ratio is 300 or higher is wider, and the viewing angle characteristics are enhanced in relation to Comparative Structure Example 1 (FIG. 11). Furthermore, as shown in FIG. 18, the viewing angle characteristics in the reflective display region of Typical Structure Example 11 are enhanced overall in relation to Comparative Structure Example 1 (FIG. 12). The viewing angle characteristics in the reflective display region are enhanced overall, but the shapes of the equal contrast ratio curves are different from those of Typical Structure Example 1 (FIG. 10).

Figure 39:
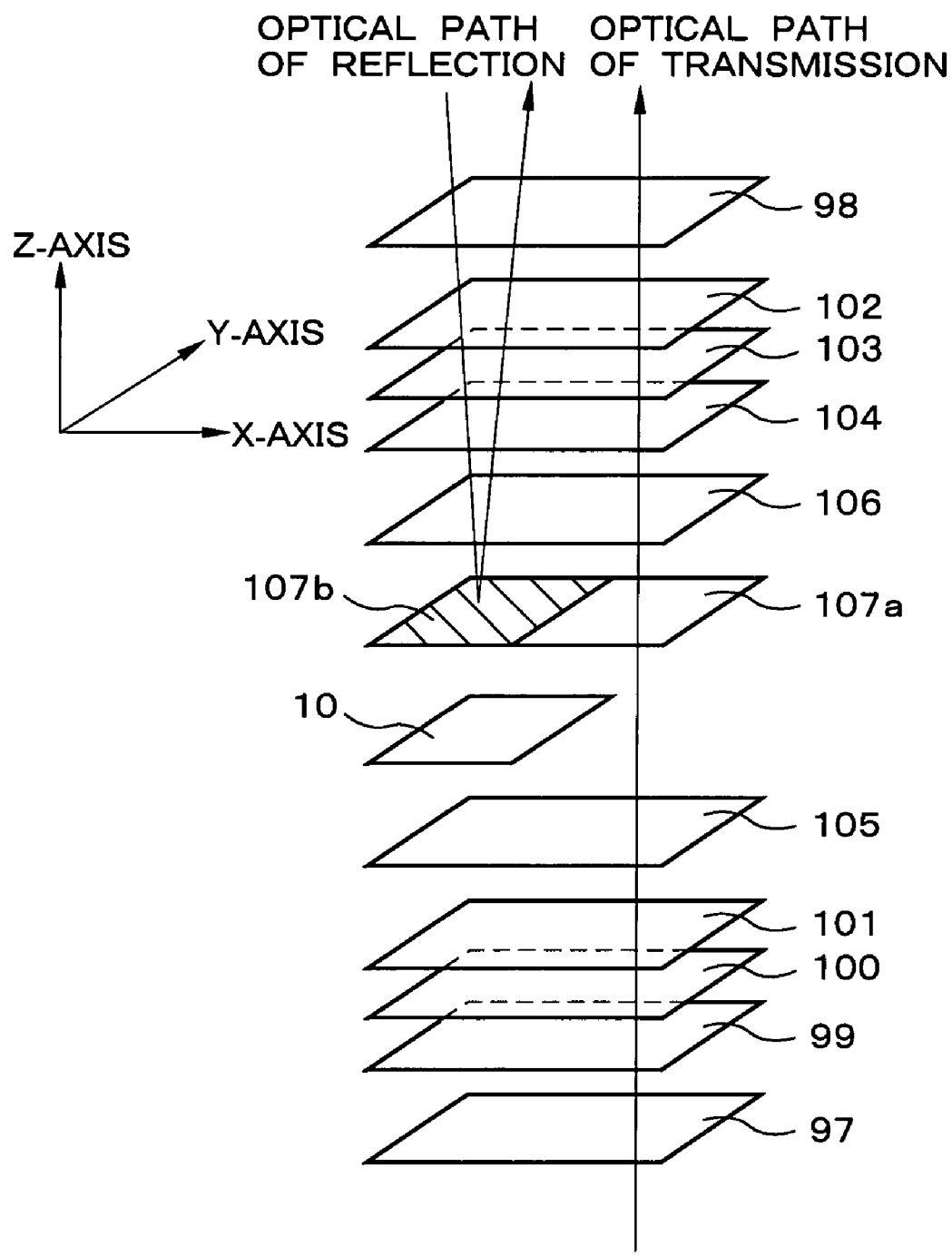
FIG. 39 is a diagram showing a schematic perspective view of the structure of the liquid crystal display device according to Embodiment 4, and a diagram showing the structure of the circular polarizer of the present invention.

The liquid crystal display device according to Embodiment 4 of the present invention will next be described. The present embodiment is also an embodiment of the structure of the circular polarizer. FIG. 39 is a diagram showing a schematic perspective view of the structure of the liquid crystal display device according to Embodiment 4, and a diagram showing the structure of the circular polarizer of the present invention. As shown in FIG. 39, the present embodiment differs from Embodiment 1 in that the circular polarizer on the backlight side is composed of a polarizer 97, a λ/2 plate 99 in which Rth<0, a λ/2 plate 100 in which Rth>0, and a λ/4 plate 101 in which Rth<0; and the circular polarizer on the display side is composed of a polarizer 98, a λ/2 plate 102 in which Rth>0, a λ/2 plate 103 in which Rth<0, and a λ/4 plate 104 in which Rth>0. Specifically, Embodiment 1 was a broadband circular polarizer in which Two retardation plates were used, Embodiment 4 is a broadband circular polarizer in which three retardation plates are used. The broadband characteristics of the broadband circular polarizer are enhanced by increasing the number of retardation plates. The transmissive viewing angle characteristics are enhanced by reducing the absolute value of the sum of Rth between the λ/2 plate 99 in which Rth<0 and the λ/2 plate 102 in which Rth>0, between the λ/2 plate 100 in which Rth>0 and the λ/2 103 in which Rth<0, and between the λ/4 plate 101 in which Rth<0 and the λ/4 plate 104 in which Rth>0. Other structural aspects are the same as in Embodiment 1. Other operations and effects are also the same as in Embodiment 1.

Figure 19:
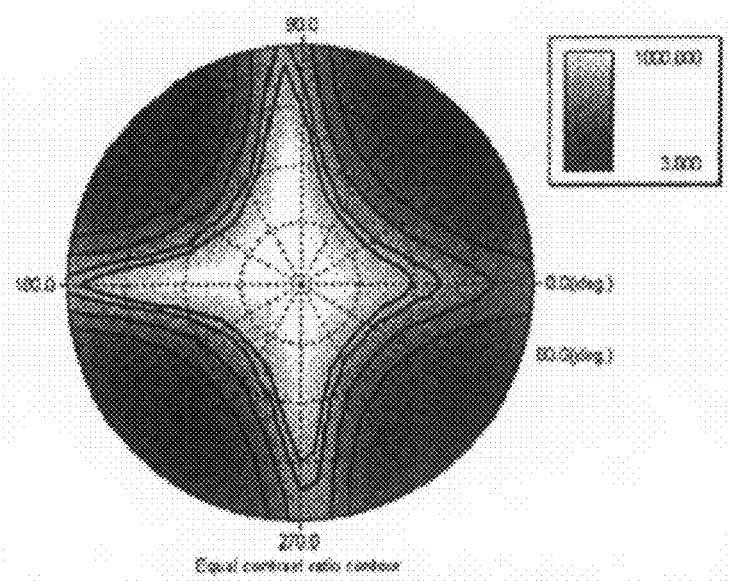
FIG. 19 is an equal contrast ratio diagram showing the results of evaluating the viewing angle characteristics in the transmissive display region of the liquid crystal display device according to Typical Structure Example 12.
Figure 20:
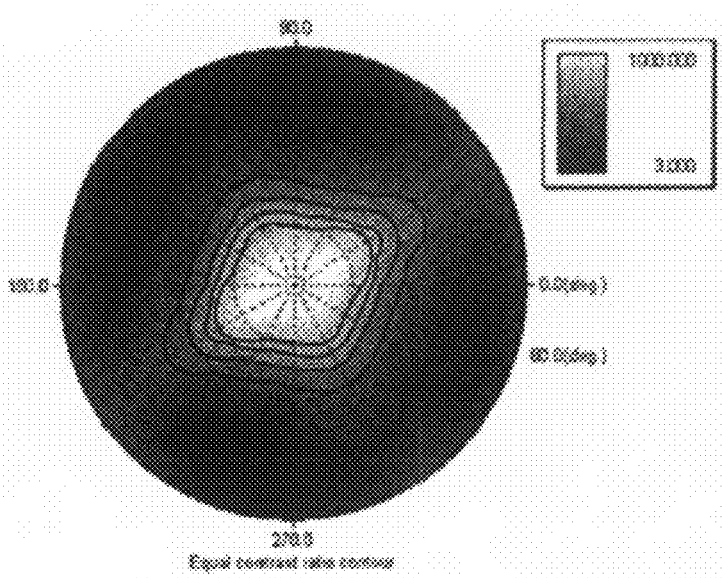
FIG. 20 is an equal contrast ratio diagram showing the results of evaluating the viewing angle characteristics in the reflective display region of the liquid crystal display device according to Typical Structure Example 12.

The present embodiment will next be described in further detail by comparing a typical structure example of the present embodiment with a comparative example. Tables 16 and 17 show the compositions (values for a wavelength of 550 nm) of the transmissive display region and the reflective display region, respectively, of the liquid crystal display device according to Typical Structure Example 12. FIGS. 19 and 20 are equal contrast ratio diagrams showing the results of evaluating the viewing angle characteristics in the transmissive display region and the reflective display region, respectively, of the liquid crystal display device according to Typical Structure Example 12.

TABLE 16

|  | Nz | Re (nm) | Rth (nm) | alignment angle (degrees) |
|---|---|---|---|---|
| polarizer 98 | — | — | — | 90.0 |
| λ/2 plate 102 | 1.0 | 275.0 | 137.5 | 96.9 |
| in which Rth > 0 |  |  |  |  |
| λ/2 plate 103 | 0.0 | 275.0 | −137.5 | 124.5 |
| in which Rth < 0 |  |  |  |  |
| λ/4 plate 104 | 1.0 | 138.0 | 69.0 | 190.4 |
| in which Rth > 0 |  |  |  |  |
| liquid crystal layer compensating plate 106 | 0.0 | 142.5 | −71.3 | 90.0 |
| liquid crystal layer 107a | 1.0 | 285.0 | 142.5 | 0.0 |
| liquid crystal layer compensating plate 105 | 0.0 | 142.5 | −71.3 | 90.0 |
| λ/4 plate 101 | 0.0 | 138.0 | −69.0 | 100.4 |
| in which Rth < 0 |  |  |  |  |
| λ/2 plate 100 | 1.0 | 275.0 | 137.5 | 34.5 |
| in which Rth > 0 |  |  |  |  |
| λ/2 plate 99 | 0.0 | 275.0 | −137.5 | 6.9 |
| in which Rth < 0 |  |  |  |  |
| polarizer 97 | — | — | — | 0.0 |

TABLE 17

|  | Nz | Re (nm) | Rth (nm) | alignment angle (degrees) |
|---|---|---|---|---|
| polarizer 98 | — | — | — | 90.0 |
| λ/2 plate 102 | 1.0 | 275.0 | 137.5 | 96.9 |
| in which Rth > 0 |  |  |  |  |
| λ/2 plate 103 | 0.0 | 275.0 | −137.5 | 124.5 |
| in which Rth < 0 |  |  |  |  |
| λ/4 plate 104 | 1.0 | 138.0 | 69.0 | 190.4 |
| in which Rth > 0 |  |  |  |  |
| liquid crystal layer compensating plate 106 | 0.0 | 142.5 | −71.3 | 90.0 |
| liquid crystal layer 107b | 1.0 | 142.5 | 71.3 | 0.0 |

Figure 21:
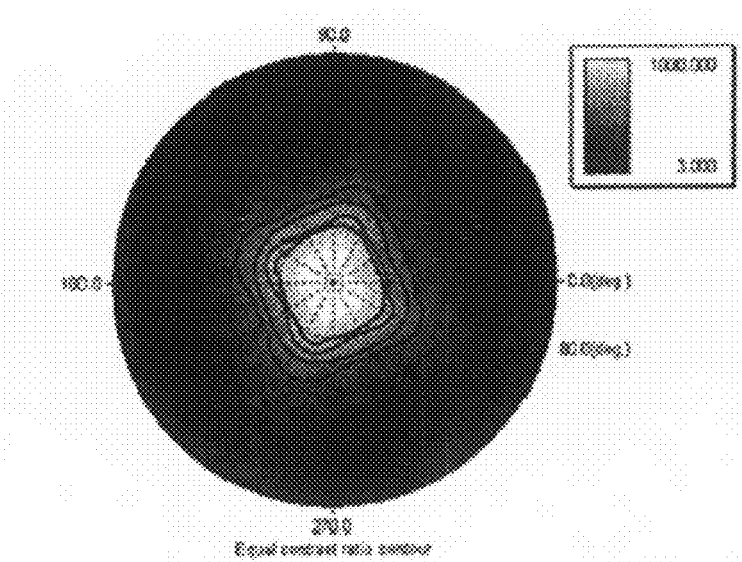
FIG. 21 is an equal contrast ratio diagram showing the results of evaluating the viewing angle characteristics in the transmissive display region of the liquid crystal display device according to Comparative Structure Example 3.
Figure 22:
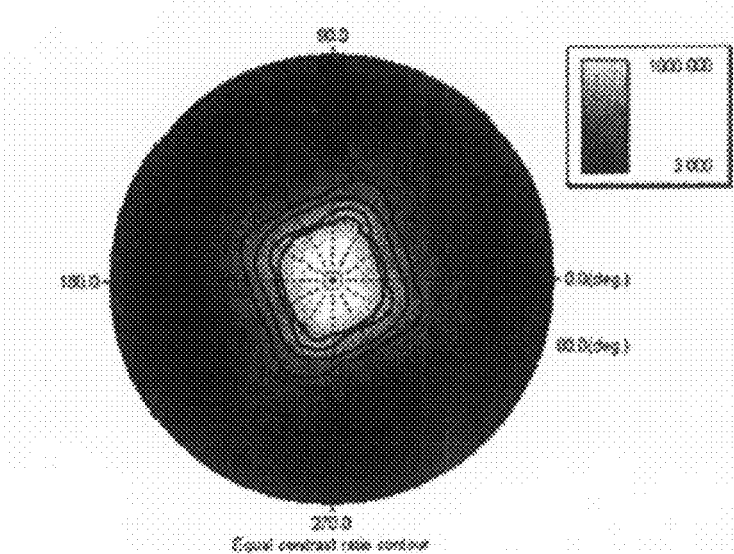
FIG. 22 is an equal contrast ratio diagram showing the results of evaluating the viewing angle characteristics in the reflective display region of the liquid crystal display device according to Comparative Structure Example 3.
Figure 40:
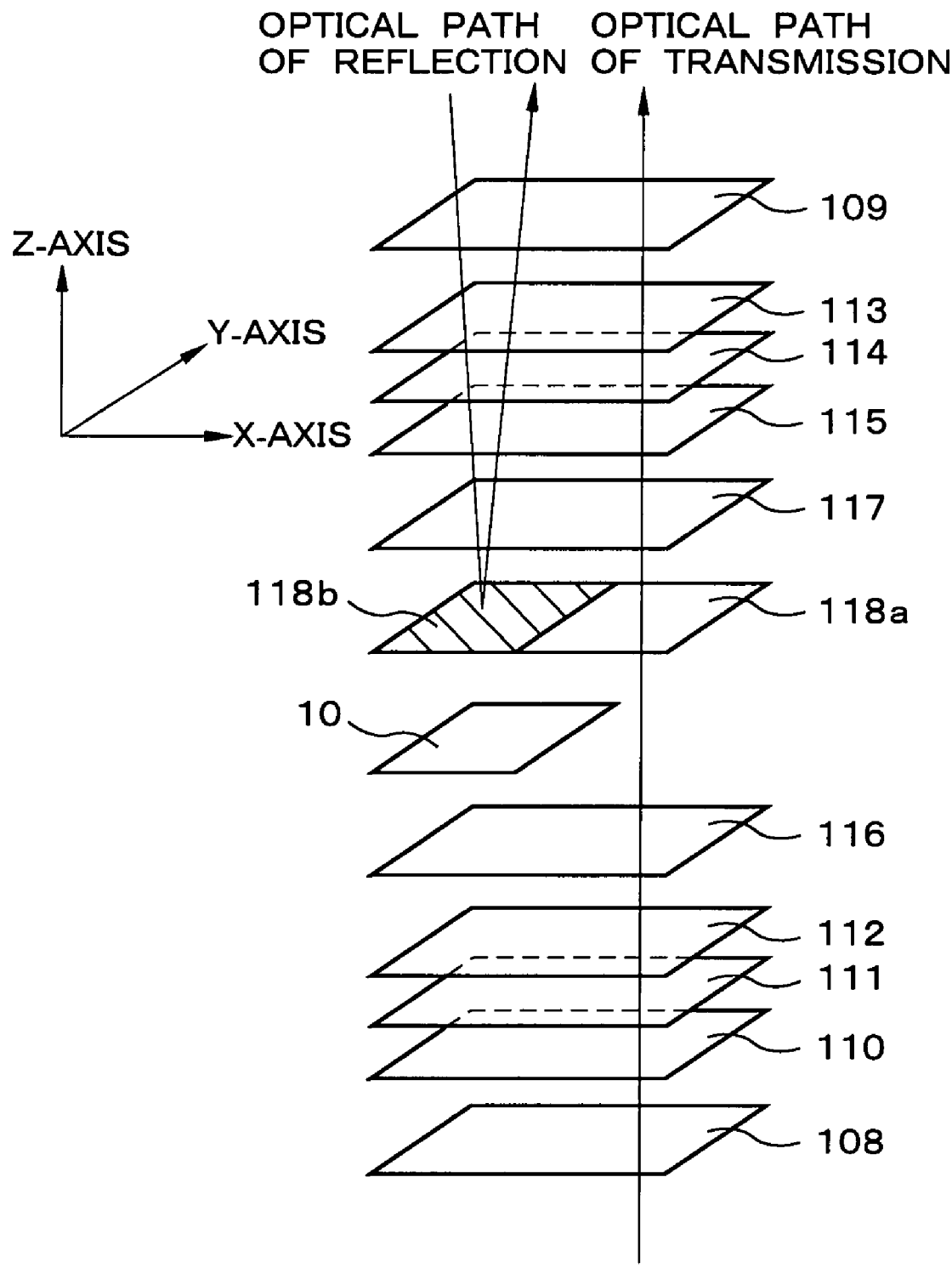
FIG. 40 is a diagram showing a schematic perspective view of the structure of the liquid crystal display device according to Comparative Structure Example 3, and a diagram showing the structure of the circular polarizer of the present invention.

A comparative example will next be described. FIG. 40 is a diagram showing a schematic perspective view of the structure of the liquid crystal display device according to Comparative Structure Example 3, and a diagram showing the structure of the circular polarizer of the present invention. As shown in FIG. 40, Comparative Structure Example 3 differs from Embodiment 4 in that all of the in-plane retardation plates have an Rth greater than zero. Tables 18 and 19 show the compositions (values for a wavelength of 550 nm) of the transmissive display region and the reflective display region, respectively, of the liquid crystal display device according to Comparative Structure Example 3. FIGS. 21 and 22 are equal contrast ratio diagrams showing the results of evaluating the viewing angle characteristics in the transmissive display region and the reflective display region, respectively, of the liquid crystal display device according to Comparative Structure Example 3.

TABLE 18

| | Nz | Re (nm) | Rth (nm) | alignment angle (degrees) |
|---|---|---|---|---|
| polarizer 109 | | — | — | 90.0 |
| λ/2 plate 113 in which Rth > 0 | 1.0 | 275.5 | 137.5 | 96.9 |
| λ/2 plate 114 in which Rth > 0 | 1.0 | 275.5 | 137.5 | 124.5 |
| λ/4 plate 115 in which Rth > 0 | 1.0 | 138.0 | 69.0 | 190.4 |
| liquid crystal layer compensating plate 117 | 0.0 | 142.5 | −71.3 | 90.0 |
| liquid crystal layer 118a | 1.0 | 285.5 | 142.5 | 0.0 |
| liquid crystal layer compensating plate 116 | 0.0 | 142.5 | −71.3 | 90.0 |
| λ/4 plate 112 in which Rth > 0 | 1.0 | 138.0 | 69.0 | 100.4 |
| λ/2 plate 111 in which Rth > 0 | 1.0 | 275.0 | 137.5 | 34.5 |
| λ/2 plate 110 in which Rth < 0 | 1.0 | 275.0 | 137.5 | 6.9 |
| polarizer 108 | | — | — | 0.0 |

TABLE 19

| | Nz | Re (nm) | Rth (nm) | alignment angle (degrees) |
|---|---|---|---|---|
| polarizer 109 | — | — | — | 90.0 |
| λ/2 plate 113 in which Rth > 0 | 1.0 | 275.0 | 137.5 | 96.9 |
| λ/2 plate 114 in which Rth > 0 | 1.0 | 275.0 | 137.5 | 124.5 |
| λ/4 plate 115 in which Rth > 0 | 1.0 | 138.0 | 69.0 | 190.4 |
| liquid crystal layer compensating plate 117 | 0.0 | 142.5 | −71.3 | 90.0 |
| liquid crystal layer 118b | 1.0 | 142.5 | 71.3 | 0.0 |

As shown in FIG. 19, the viewing angle characteristics in the transmissive display region of Typical Structure Example 12 are enhanced in comparison to Comparative Structure Example 3 (FIG. 21). Furthermore, as shown in FIG. 20, the viewing angle characteristics in the reflective display region of Typical Structure Example 12 are slightly enhanced in comparison to Comparative Structure Example 3 (FIG. 21).

Figure 41:
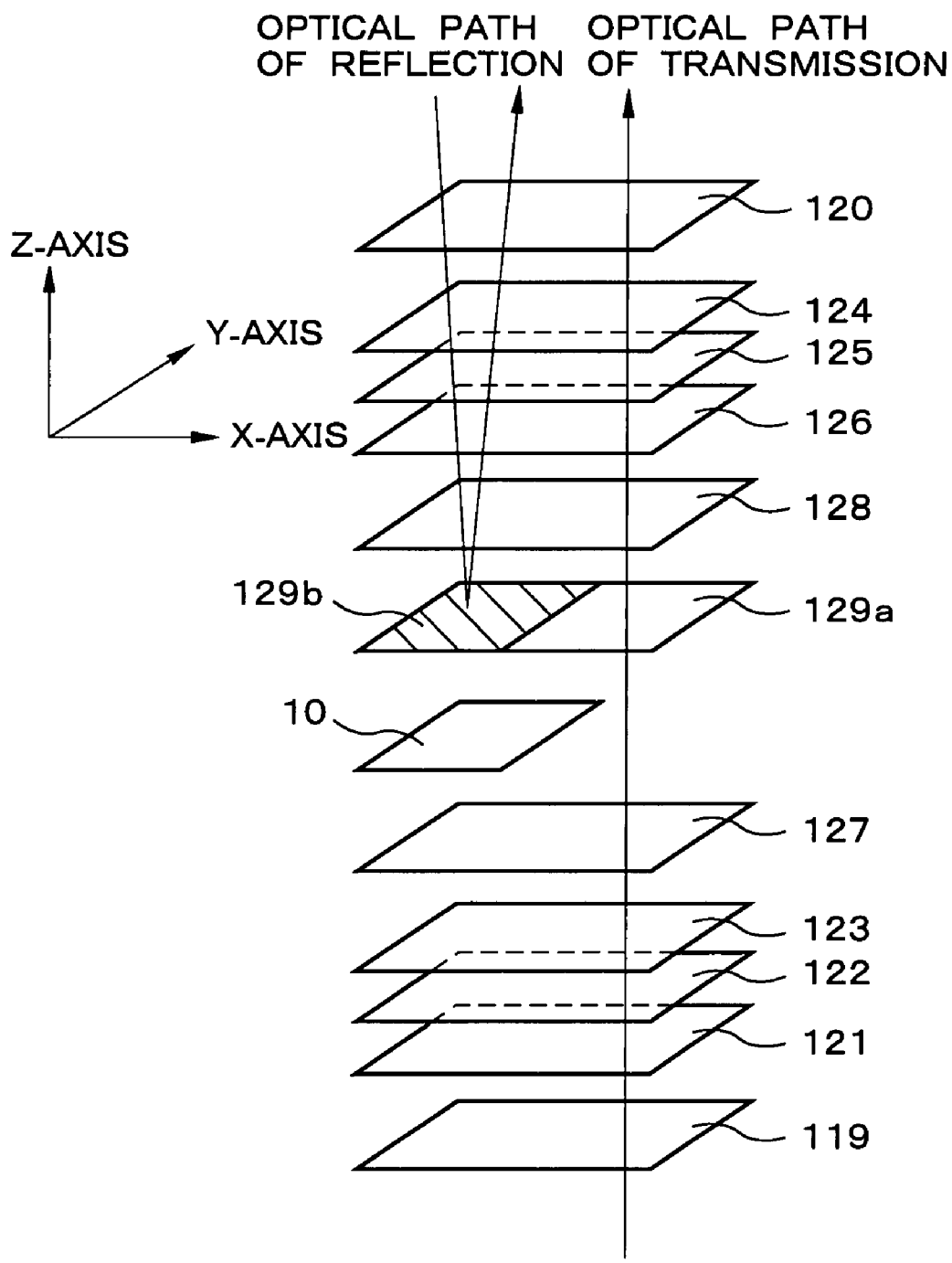
FIG. 41 is a perspective view showing the structure of the liquid crystal display device according to Typical Structure Examples 13 and 14.

An example in which the thickness-direction retardations of the in-plane retardation plates are varied with respect to Typical Structure Example 12 will next be described. FIG. 41 is a perspective view showing the structure of the liquid crystal display device according to Typical Structure Examples 13 and 14. As shown in FIG. 41, the transmissive display region in Typical Structure Examples 13 and 14 is composed of a polarizer 119, a λ/2 plate 121, a λ/2 plate 122, a λ/4 plate 123, a liquid crystal compensating plate 127, a liquid crystal layer 129a, a liquid crystal layer compensating plate 128, a λ/4 plate 126, a λ/2 plate 125, a λ/2 plate 124, and a polarizer 120 layered in sequence as viewed from the display side. Table 20 shows the specific composition of Typical Structure Examples 13 and 14.

The alignment angles and the retardations Re in the in-plane direction are the same for Typical Structure Examples 13 and 14. The liquid crystal layer compensation plates 127, 128, and the liquid crystal layer 129a are also the same for Typical Structure Examples 13 and 14.

TABLE 20

| | common values | | Typical Structure Example 13 | | Typical Structure Example 14 | |
|---|---|---|---|---|---|---|
| composition | Re (nm) | alignment angle (degrees) | Nz | Rth (nm) | Nz | Rth (nm) |
| polarizer 120 | — | 90 | — | — | — | — |
| λ/2 plate 124 | 275.0 | 96.9 | 1.0 | 137.5 | 0.0 | −137.5 |
| λ/2 plate 125 | 275.0 | 124.5 | 1.0 | 137.5 | 1.0 | 137.5 |
| λ/4 plate 126 | 138.0 | 190.4 | 1.0 | 69.0 | 0.0 | −69.0 |
| liquid crystal layer compensating plate 128 | 142.5 | 90.0 | 0.0 | −71.3 | 0.0 | −71.3 |
| liquid crystal layer 129a | 285.0 | 0.0 | 1.0 | 142.5 | 1.0 | 142.5 |
| liquid crystal layer compensating plate 127 | 142.5 | 90.0 | 0.0 | −71.3 | 0.0 | −71.3 |
| λ/4 plate 123 | 138.0 | 100.4 | 0.0 | −69.0 | 1.0 | 69.0 |
| λ/2 plate 122 | 275.0 | 34.5 | 0.0 | −137.5 | 0.0 | −137.5 |
| λ/2 plate 121 | 275.0 | 6.9 | 0.0 | −137.5 | 1.0 | 137.5 |
| polarizer 119 | — | 0.0 | — | — | — | — |

According to such a configuration, the viewing angle characteristics of the transmissive display are also enhanced in Typical Structure Examples 13 and 14 in the same manner as in Typical Structure Example 12.

Figure 23:
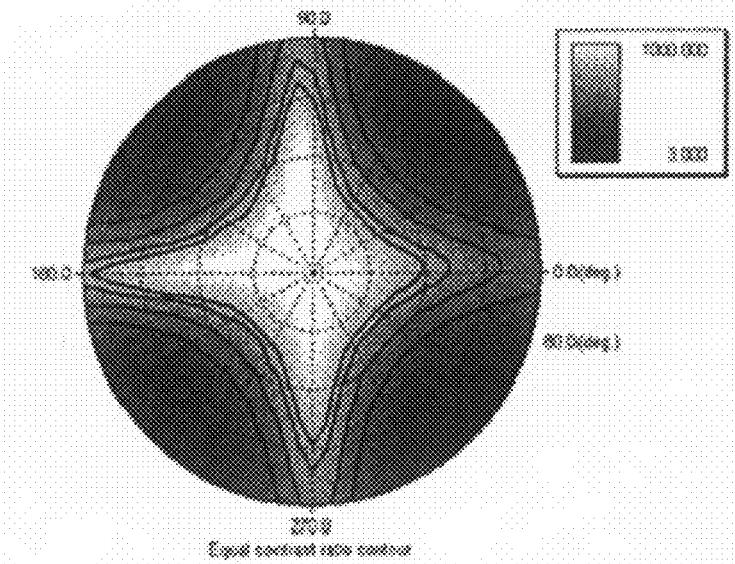
FIG. 23 is an equal contrast ratio diagram showing the results of evaluating the viewing angle characteristics in the transmissive display region of the liquid crystal display device according to Typical Structure Example 15.
Figure 24:
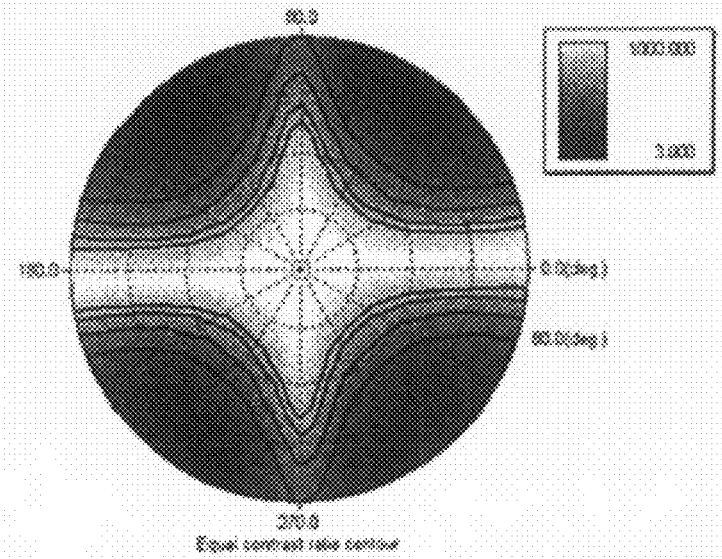
FIG. 24 is an equal contrast ratio diagram showing the results of evaluating the viewing angle characteristics in the reflective display region of the liquid crystal display device according to Typical Structure Example 15.
Figure 42:
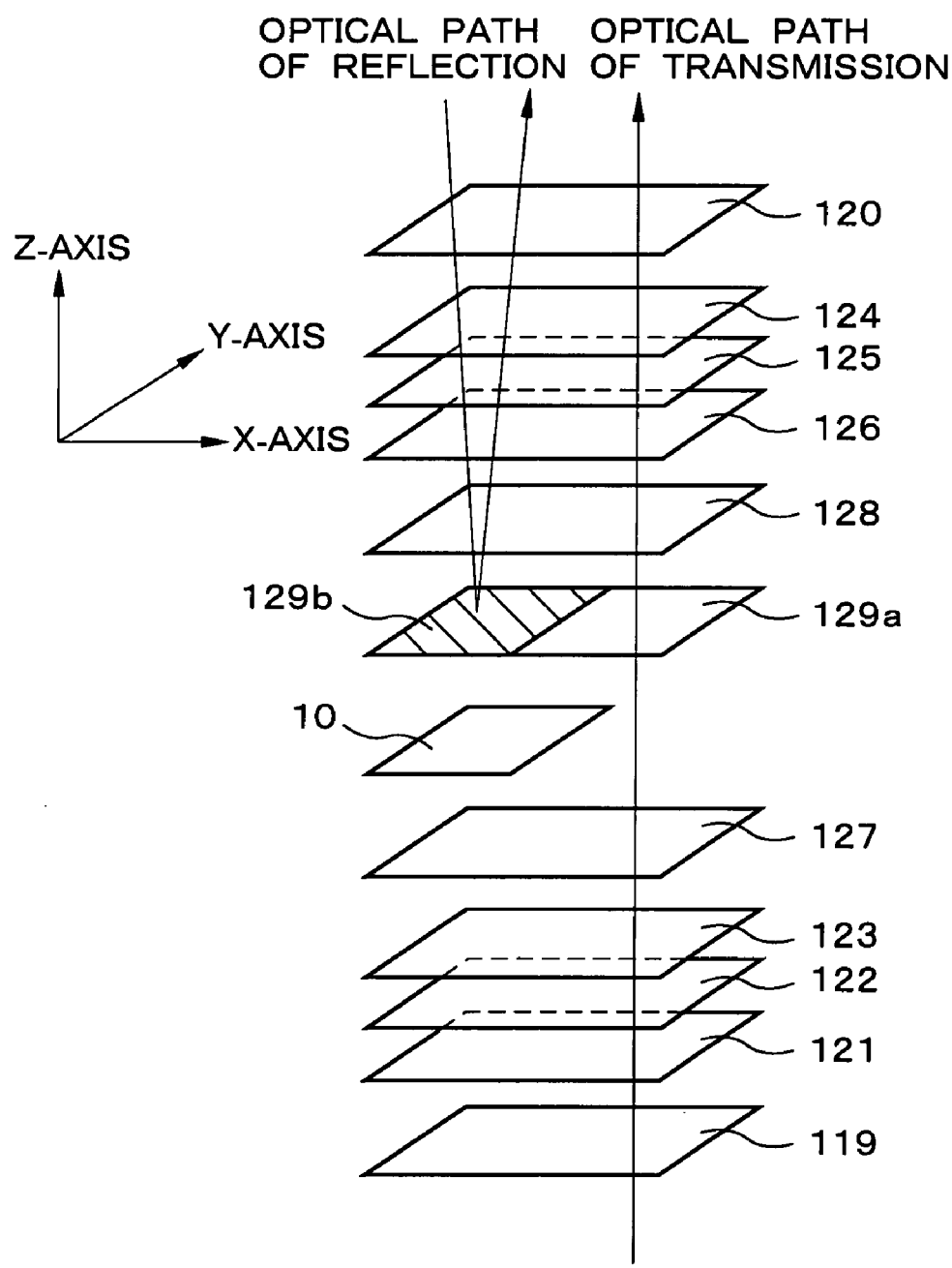
FIG. 42 is a perspective view showing the structure of the liquid crystal display device according to Typical Structure Example 15.

The liquid crystal display device according to Embodiment 5 of the present invention will next be described. The present embodiment is also an embodiment of the structure of the circular polarizer. Embodiment 5 of the present invention differs from Embodiment 4 in that all of the in-plane retardation plates have an Rth substantially equal to zero. Other structural aspects are the same as in Embodiment 4. The viewing angle characteristics are enhanced by such a configuration. The present embodiment will next be described in further detail using Typical Structure Example 15 of the present embodiment. FIG. 42 is a perspective view showing the structure of the liquid crystal display device according to Typical Structure Example 15, wherein the Rth of the λ/2 plates and the λ/4 plates as the in-plane retardation plates are all zero. Tables 21 and 22 show the compositions (values for a wavelength of 550 nm) of the transmissive display region and the reflective display region, respectively, of the liquid crystal display device according to Typical Structure Example 15. FIGS. 23 and 24 are equal contrast ratio diagrams showing the results of evaluating the viewing angle characteristics in the transmissive display region and the reflective display region, respectively, of the liquid crystal display device according to Typical Structure Example 15.

TABLE 21

| | Nz | Re (nm) | Rth (nm) | alignment angle (degrees) |
|---|---|---|---|---|
| polarizer 120 | | — | — | 90.0 |
| λ/2 plate 124 in which Rth = 0 | 0.5 | 275.5 | 0.0 | 96.9 |
| λ/2 plate 125 in which Rth = 0 | 0.5 | 275.5 | 0.0 | 124.5 |
| λ/4 plate 126 in which Rth = 0 | 0.5 | 138.0 | 0.0 | 190.4 |
| liquid crystal layer compensating plate 128 | 0.0 | 142.5 | −71.3 | 90.0 |

TABLE 21-continued

| | Nz | Re (nm) | Rth (nm) | alignment angle (degrees) |
|---|---|---|---|---|
| liquid crystal layer 129a | 1.0 | 285.5 | 142.5 | 0.0 |
| liquid crystal layer compensating plate 127 | 0.0 | 142.5 | −71.3 | 90.0 |
| λ/4 plate 123 in which Rth = 0 | 0.5 | 138.0 | 0.0 | 10.4 |
| λ/2 plate 122 in which Rth = 0 | 0.5 | 275.0 | 0.0 | 34.5 |
| λ/2 plate 121 in which Rth = 0 | 0.5 | 275.0 | 0.0 | 6.9 |
| polarizer 119 | — | — | — | 0.0 |

TABLE 22

| | Nz | Re (nm) | Rth (nm) | alignment angle (degrees) |
|---|---|---|---|---|
| polarizer 120 | — | — | — | 90.0 |
| λ/2 plate 124 in which Rth = 0 | 0.5 | 275.0 | 0.0 | 96.9 |
| λ/2 plate 125 in which Rth = 0 | 0.5 | 275.0 | 0.0 | 124.5 |
| λ/4 plate 126 in which Rth = 0 | 0.5 | 138.0 | 0.0 | 190.4 |
| liquid crystal layer compensating plate 128 | 0.0 | 142.5 | −71.3 | 90.0 |
| liquid crystal layer 129b | 1.0 | 142.5 | 71.3 | 0.0 |

As shown in FIG. 23, the viewing angle characteristics in the transmissive display region of Typical Structure Example 15 are enhanced in comparison to Comparative Structure Example 3 (FIG. 21). Furthermore, as shown in FIG. 24, the viewing angle characteristics in the reflective display region of Typical Structure Example 15 are enhanced overall in comparison to Comparative Structure Example 3 (FIG. 22).

Figure 43:
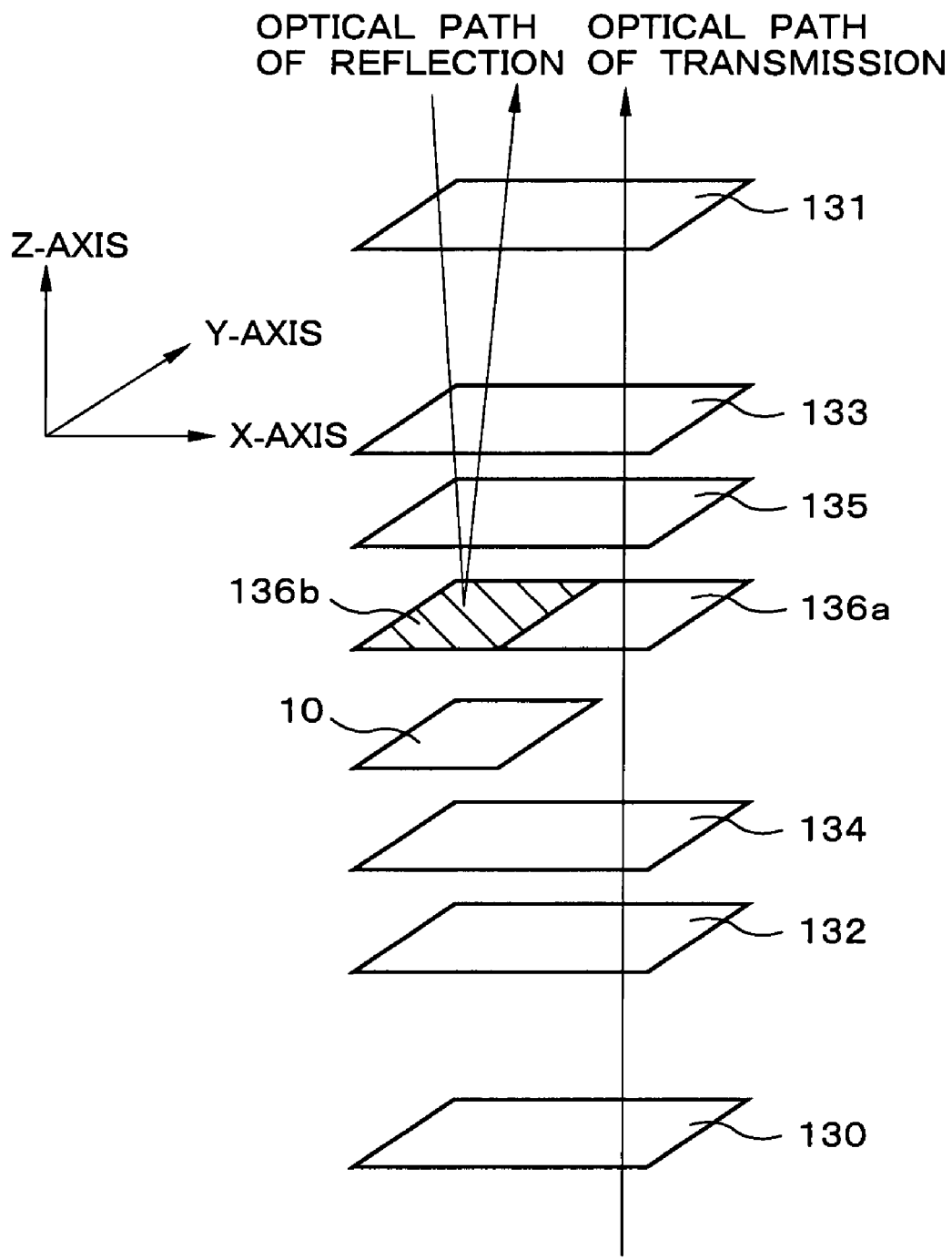
FIG. 43 is a diagram showing a schematic perspective view of the structure of the liquid crystal display device according to Embodiment 6, and a diagram showing the structure of the circular polarizer of the present invention.

The liquid crystal display device according to Embodiment 6 of the present invention will next be described. The present embodiment is also an embodiment of the structure of the circular polarizer. FIG. 43 is a diagram showing a schematic perspective view of the structure of the liquid crystal display device according to Embodiment 6, and a diagram showing the structure of the circular polarizer of the present invention. As shown in FIG. 43, the present embodiment differs from Embodiment 1 in that the circular polarizer on the backlight side is composed of a polarizer 130 and a λ/4 plate 132 in which Rth>0; and the circular polarizer on the display side is composed of a polarizer 131 and a λ/4 plate 133 in which Rth<0. Other aspects of the structure are the same as in Typical Structure Example 1. Embodiment 6 is thus a circular polarizer having a single retardation plate. The transmissive viewing angle characteristics are enhanced in such a structure by reducing the absolute value of the sum of the thickness-direction retardations between the λ/4 plate 132 in which Rth>0, and the λ/4 plate 133 in which Rth<0.

Figure 25:
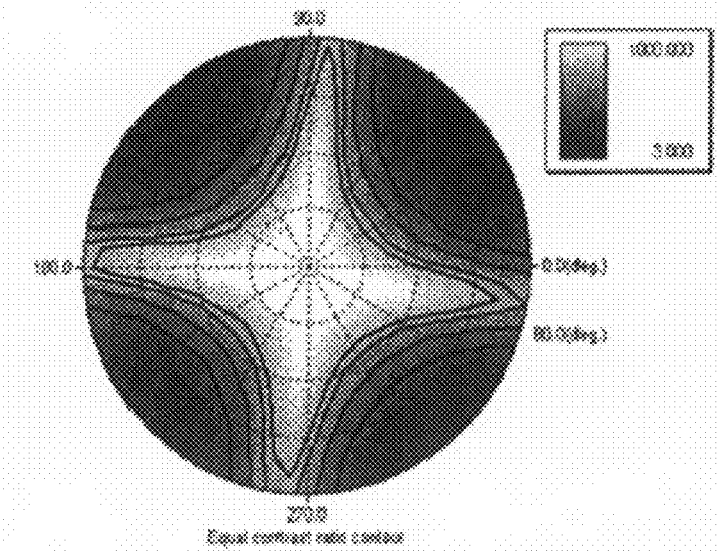
FIG. 25 is an equal contrast ratio diagram showing the results of evaluating the viewing angle characteristics in the transmissive display region of the liquid crystal display device according to Typical Structure Example 16.
Figure 26:
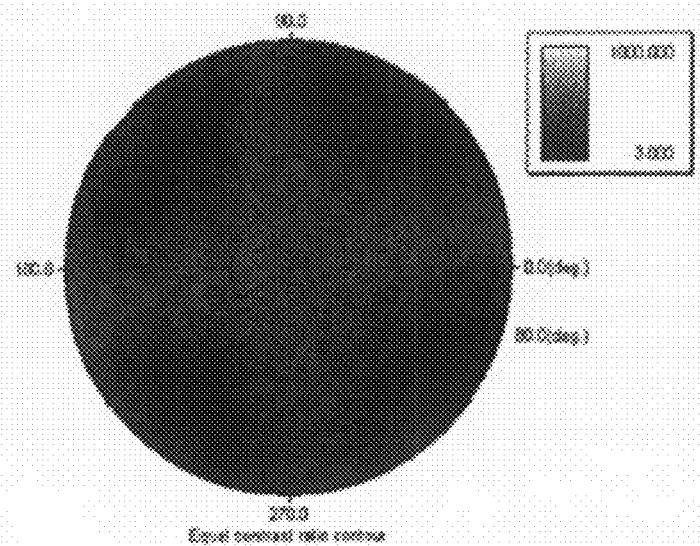
FIG. 26 is an equal contrast ratio diagram showing the results of evaluating the viewing angle characteristics in the reflective display region of the liquid crystal display device according to Typical Structure Example 16.

The present embodiment will next be described in further detail by comparing a typical structure example of the present embodiment with a comparative example. Typical Structure Example 16 of the present embodiment will first be described. Tables 23 and 24 show the compositions (values for a wavelength of 550 nm) of the transmissive display region and the reflective display region, respectively, of the liquid crystal display device according to Typical Structure Example 16. FIGS. 25 and 26 are equal contrast ratio diagrams showing the results of evaluating the viewing angle characteristics in the transmissive display region and the reflective display region, respectively, of the liquid crystal display device according to Typical Structure Example 16.

TABLE 23

| | Nz | Re (nm) | Rth (nm) | alignment angle (degrees) |
|---|---|---|---|---|
| polarizer 131 | — | — | — | 90.0 |
| λ/4 plate 133 in which Rth < 0 | 0.0 | 138.0 | −69.0 | 135.0 |
| liquid crystal layer compensating plate 135 | 0.0 | 142.5 | −71.3 | 90.0 |
| liquid crystal layer 136a | 1.0 | 285.0 | 142.5 | 0.0 |
| liquid crystal layer compensating plate 134 | 0.0 | 142.5 | −71.3 | 90.0 |
| λ/4 plate 132 in which Rth > 0 | 1.0 | 138.0 | 69.0 | 45.0 |
| polarizer 130 | — | — | — | 0.0 |

TABLE 24

| | Nz | Re (nm) | Rth (nm) | alignment angle (degrees) |
|---|---|---|---|---|
| polarizer 131 | — | — | — | 90.0 |
| λ/4 plate 133 in which Rth < 0 | 0.0 | 138.0 | −69.0 | 135.0 |
| liquid crystal layer compensating plate 135 | 0.0 | 142.5 | −71.3 | 90.0 |
| liquid crystal layer 136b | 1.0 | 142.5 | 71.3 | 0.0 |

Figure 44:
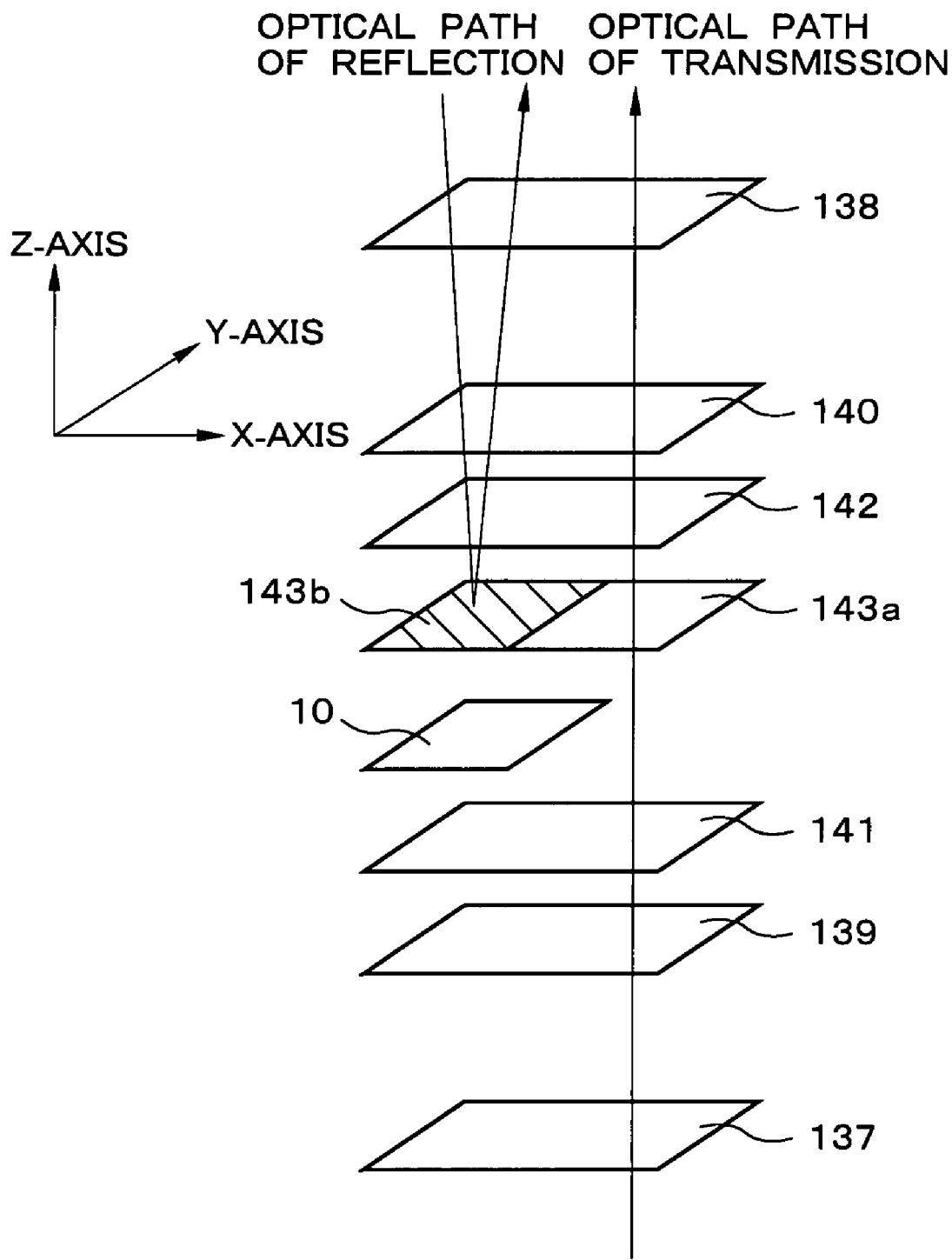
FIG. 44 is a perspective view showing the structure of the liquid crystal display device according to Comparative Structure Example 4.

Comparative Structure Example 4 will next be described. FIG. 44 is a perspective view showing the structure of the liquid crystal display device according to Comparative Structure Example 4. As shown in FIG. 4, the present comparative structure example differs from Embodiment 6 in that a λ/4 plate 140 in which Rth>0 and a λ/4 plate 139 in which Rth>0 are provided on the display side and on the backlight side, the circular polarizers have a single retardation plate, and the in-plane retardation plates that constitute the polarizers all have an Rth greater than zero. Other structural aspects are the same as in Embodiment 6. Tables 25 and 26 show the compositions of the transmissive display region and the reflective display region, respectively, of the liquid crystal display device according to Comparative Structure Example 4. FIGS. 27 and 28 are equal contrast ratio diagrams showing the results of evaluating the viewing angle characteristics in the transmissive display region and the reflective display region, respectively, of the liquid crystal display device according to Comparative Structure Example 4.

TABLE 25

| | Nz | Re (nm) | Rth (nm) | alignment angle (degrees) |
|---|---|---|---|---|
| polarizer 138 | — | — | — | 90.0 |
| λ/4 plate 140 in which Rth > 0 | 1.0 | 138.0 | 69.0 | 135.0 |
| liquid crystal layer compensating plate 142 | 0.0 | 142.5 | −71.3 | 90.0 |

TABLE 25-continued

|  | Nz | Re (nm) | Rth (nm) | alignment angle (degrees) |
|---|---|---|---|---|
| liquid crystal layer 143a | 1.0 | 285.0 | 142.5 | 0.0 |
| liquid crystal layer compensating plate 141 | 0.0 | 142.5 | −71.3 | 90.0 |
| λ/4 plate 139 in which Rth > 0 | 1.0 | 138.0 | 69.0 | 45.0 |
| polarizer 137 | — | — | — | 0.0 |

TABLE 26

|  | Nz | Re (nm) | Rth (nm) | alignment angle (degrees) |
|---|---|---|---|---|
| polarizer 138 | — | — | — | 90.0 |
| λ/4 plate 140 in which Rth > 0 | 1.0 | 138.0 | 69.0 | 135.0 |
| liquid crystal layer compensating plate 142 | 0.0 | 142.5 | −71.3 | 90.0 |
| liquid crystal layer 143b | 1.0 | 142.5 | 71.3 | 0.0 |

As shown in FIG. 25, in the viewing angle characteristics of the transmissive display region in Typical Structure Example 16, the regions in which the contrast ratio is 300, 200, 100, 50, and 10 or higher are wider, and the viewing angle characteristics are enhanced in relation to Comparative Structure Example 4 (FIG. 27).

Figure 45:
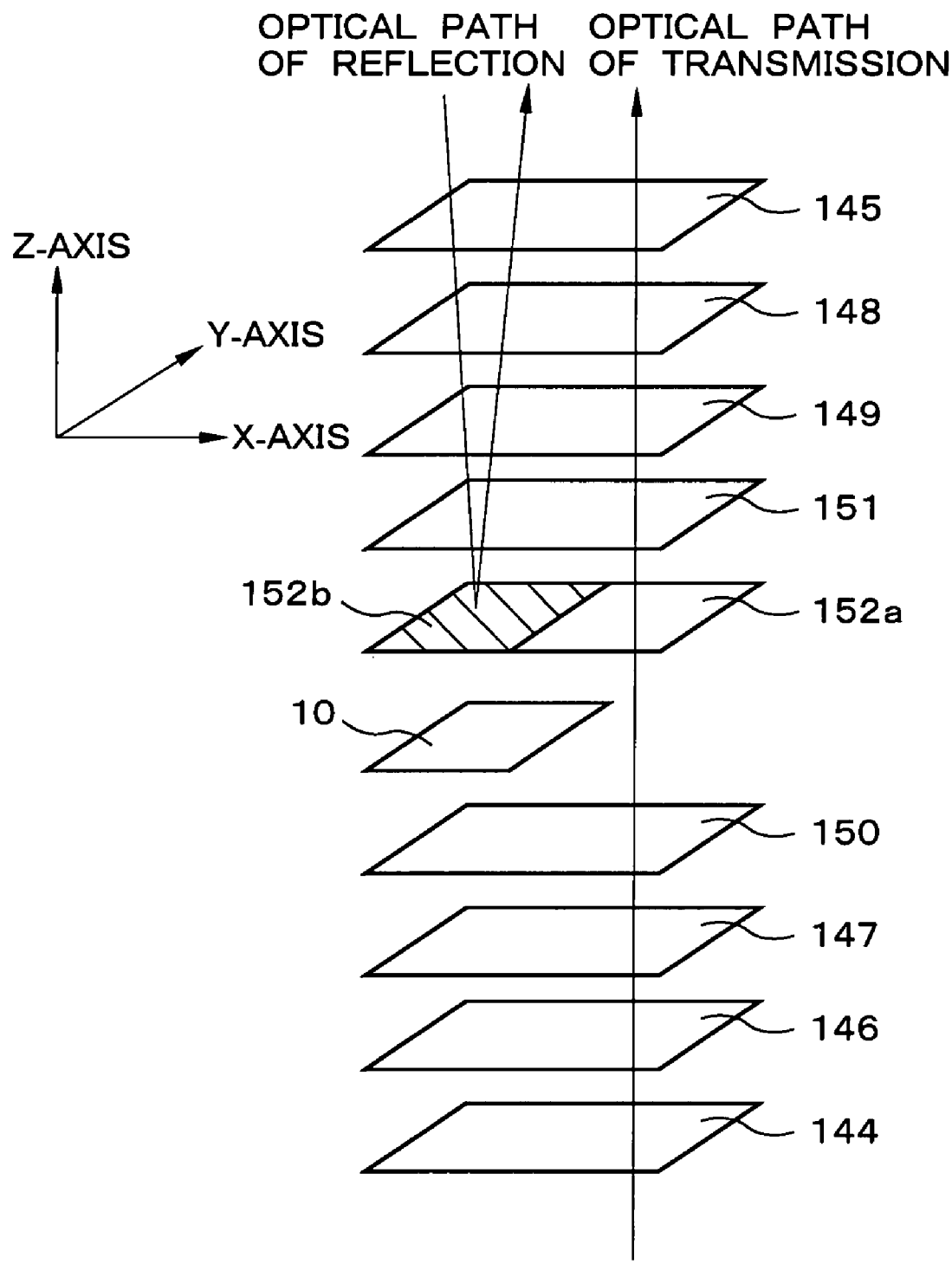
FIG. 45 is a diagram showing a schematic perspective view of the structure of the liquid crystal display device according to Embodiment 7, and a diagram showing the structure of the circular polarizer of the present invention.

The liquid crystal display device according to Embodiment 7 of the present invention will next be described. The present embodiment is also an embodiment of the structure of the circular polarizer. FIG. 45 is a diagram showing a schematic perspective view of the structure of the liquid crystal display device according to Embodiment 7, and a diagram showing the structure of the circular polarizer of the present invention. The present embodiment differs from Embodiment 1 in that vertically aligned liquid crystals are used instead of horizontally aligned liquid crystals that are driven by a lateral field. Other aspects of the structure are the same as in Embodiment 1.

According to the present embodiment, the pairs of in-plane retardation plates constituting the pair of circular polarizers are arranged so as to compensate for the Rth of each other, whereby the viewing angle characteristics of the transmissive display are enhanced in a vertical-alignment liquid crystal display device such as the one described in AsiaDisplay/IDW01, p. 134.

A wide-viewing-angle VA (Vertical Alignment) mode is preferred among modes in which liquid crystals are driven by a vertical field. VA modes include MVA (Multi-domain Vertical Alignment) schemes in which viewing angle dependency is reduced in a multi-domain scheme, as well as PVA (Patterned Vertical Alignment) schemes, ASV (Advanced Super V) schemes, and the like.

The present embodiment will next be described in further detail by comparing a typical structure example of the present embodiment with a comparative example. Typical Structure Example 17 of the present embodiment will first be described. Table 27 shows the composition (values for a wavelength of 550 nm) of the transmissive display region of the liquid crystal display device according to Typical Structure Example 17. Table 28 also shows the composition (values for a wavelength of 550 nm) of the reflective display region of the liquid crystal display device according to Typical Structure Example 17.

The liquid crystals are placed in a four-division vertical alignment mode whereby the liquid crystal molecules lie in directions of 45 degrees, 135 degrees, 225 degrees, and 315 degrees according to the electric field, wherein 0 degrees is the direction of liquid crystal molecules that lie in the X-axis direction The refractive index anisotropy An of the liquid crystal layer 152a was 0.1 (wherein the wavelength is 550 nm), the thickness was 3.5 μm, and the wavelength dependency was such that the refractive index anisotropy increased the shorter the wavelength, the same as in common liquid crystals. In the liquid crystal layer compensating plates 150 and 151 of the vertical alignment mode, nx=ny=1.5000, and nz=1.4986, and the refractive indices thereof were the same for all wavelengths. The thickness of the liquid crystal layer 152b was 1.75 μm.

TABLE 27

|  | Nz | Re (nm) | Rth (nm) | alignment angle (degrees) |
|---|---|---|---|---|
| polarizer 145 | — | — | — | 90.0 |
| λ/2 plate 148 in which Rth > 0 | 1.0 | 275.0 | 137.5 | 100.0 |
| λ/4 plate 149 in which Rth < 0 | 0.0 | 138.0 | −69.0 | 155.0 |
| liquid crystal layer compensating plate 151 | — | 0 | 182.2 | — |
| liquid crystal layer 152a | — | 0 | −350.1 | — |
| liquid crystal layer compensating plate 150 | — | 0 | 182.2 | — |
| λ/4 plate 147 in which Rth > 0 | 1.0 | 138.0 | 69.0 | 65.0 |
| λ/2 plate 146 in which Rth < 0 | 0.0 | 275.0 | −137.5 | 10.0 |
| polarizer 144 | — | — | — | 0.0 |

TABLE 28

|  | Nz | Re (nm) | Rth (nm) | alignment angle (degrees) |
|---|---|---|---|---|
| polarizer 145 | — | — | — | 90.0 |
| λ/2 plate 148 in which Rth > 0 | 1.0 | 275.0 | 137.5 | 100.0 |
| λ/4 plate 149 in which Rth < 0 | 0.0 | 138.0 | −69.0 | 155.0 |
| liquid crystal layer compensating plate 151 | — | 0 | 182.2 | — |
| liquid crystal layer 152b | — | 0 | −175.1 | — |

Figure 46:
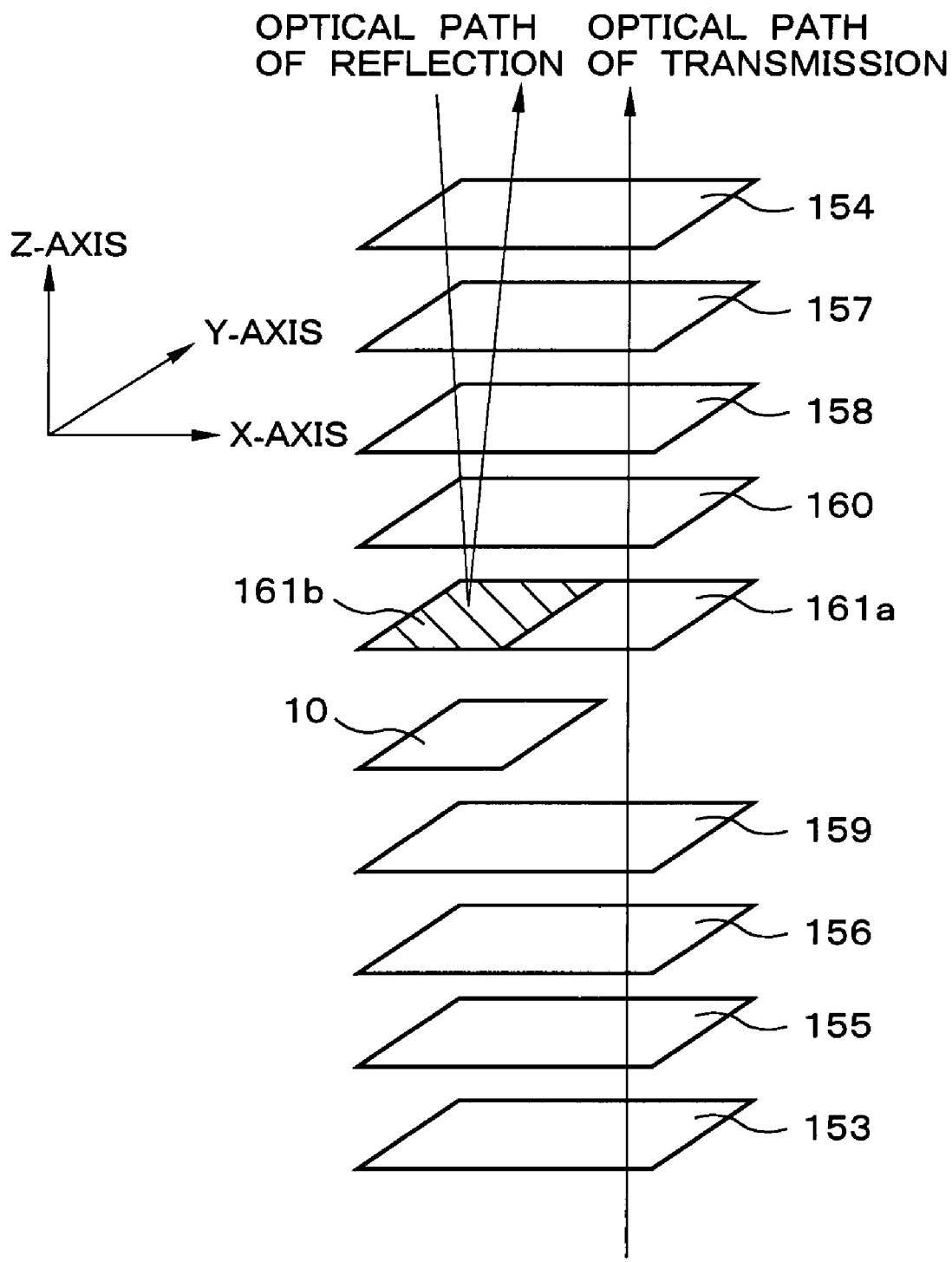
FIG. 46 is a perspective view showing the structure of the liquid crystal display device according to Comparative Structure Example 5.

Comparative Structure Example 5 will next be described. FIG. 46 is a perspective view showing the structure of the liquid crystal display device according to Comparative Structure Example 5. As shown in FIG. 46, Comparative Structure Example 5 differs from Embodiment 7 in that the in-plane retardation plates constituting the circular polarizers all have an Rth greater than zero. Other structural aspects are the same as in Embodiment 7.

Figure 31:
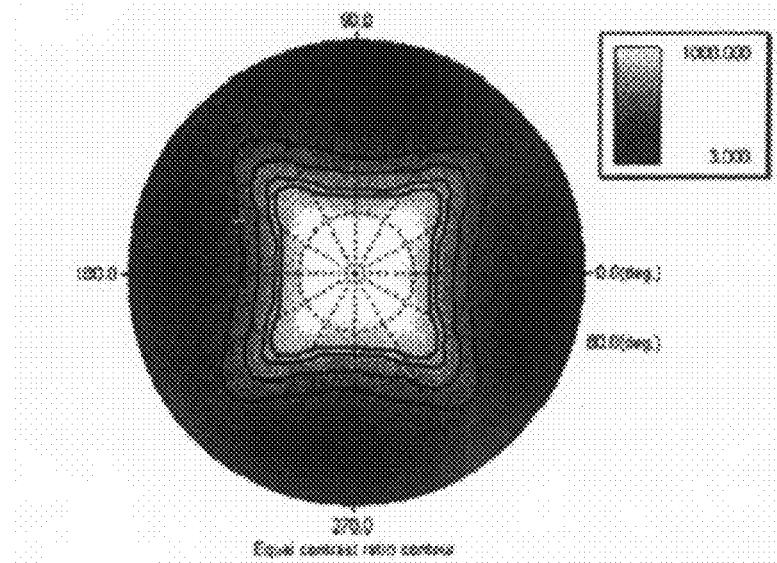
FIG. 31 is an equal contrast ratio diagram showing the results of evaluating the viewing angle characteristics in the transmissive display region of the liquid crystal display device according to Comparative Structure Example 5.
Figure 32:
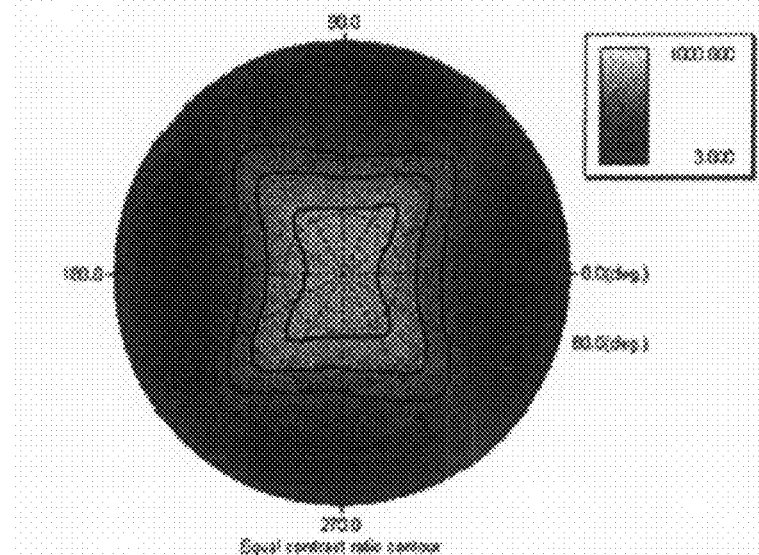
FIG. 32 is a an equal contrast ratio diagram showing the results of evaluating the viewing angle characteristics in the reflective display region of the liquid crystal display device according to Comparative Structure Example 5.

Tables 29 and 30 show the compositions of the transmissive display region and the reflective display region, respectively, of the liquid crystal display device according to Comparative Structure Example 5. FIGS. 31 and 32 are equal contrast ratio diagrams showing the results of evaluating the viewing angle characteristics in the transmissive display region and the reflective display region, respectively, of the liquid crystal display device according to Comparative Structure Example 5.

Since the conditions of the circular polarizers are different, the Rth values found as a result of recalculating the Rth of the liquid crystal layer compensating plates for improving the viewing angle characteristics of the transmissive display differed between the liquid crystal layer compensating plates 150, 151 of Typical Structure Example 17 and the liquid crystal layer compensating plates 159, 160 of Comparative Structure Example 5.

TABLE 29

|  | Nz | Re (nm) | Rth (nm) | alignment angle (degrees) |
|---|---|---|---|---|
| polarizer 154 | — | — | — | 90.0 |
| λ/2 plate 157 in which Rth > 0 | 1.0 | 275.0 | 137.5 | 100.0 |
| λ/4 plate 158 in which Rth > 0 | 1.0 | 138.0 | 69.0 | 155.0 |
| liquid crystal layer compensating plate 160 | — | 0 | 98.3 | — |
| liquid crystal layer 161a | — | 0 | −350.1 | — |
| liquid crystal layer compensating plate 159 | — | 0 | 98.3 | — |
| λ/4 plate 156 in which Rth > 0 | 1.0 | 138.0 | 69.0 | 65.0 |
| λ/2 plate 155 in which Rth > 0 | 1.0 | 275.0 | 137.5 | 10.0 |
| polarizer 153 | — | — | — | 0.0 |

TABLE 30

|  | Nz | Re (nm) | Rth (nm) | alignment angle (degrees) |
|---|---|---|---|---|
| polarizer 154 | — | — | — | 90.0 |
| λ/2 plate 157 in which Rth > 0 | 1.0 | 275.0 | 137.5 | 100.0 |
| λ/4 plate 158 in which Rth > 0 | 1.0 | 138.0 | 69.0 | 155.0 |
| liquid crystal layer compensating plate 160 | — | 0 | 98.3 | — |
| liquid crystal layer 161b | — | 0 | −175.1 | — |

Figure 29:
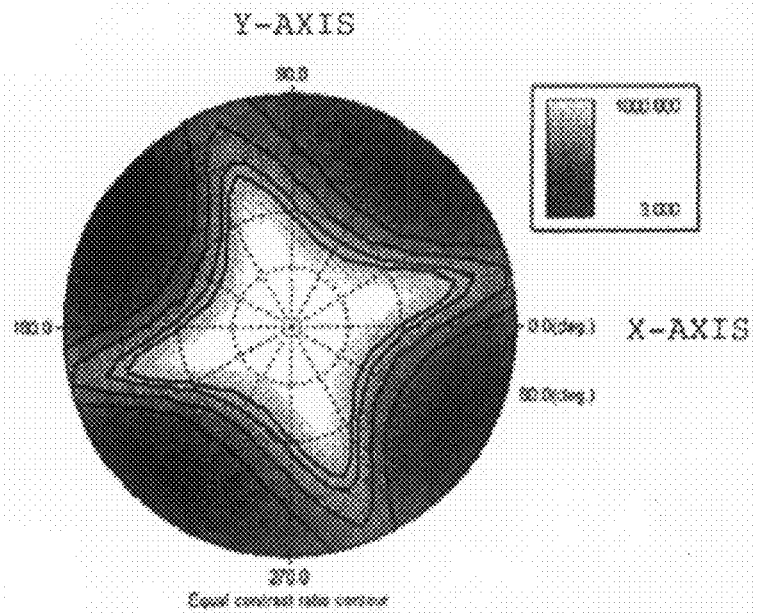
FIG. 29 is an equal contrast ratio diagram showing the results of evaluating the viewing angle characteristics in the transmissive display region of the liquid crystal display device according to Typical Structure Example 17.
Figure 30:
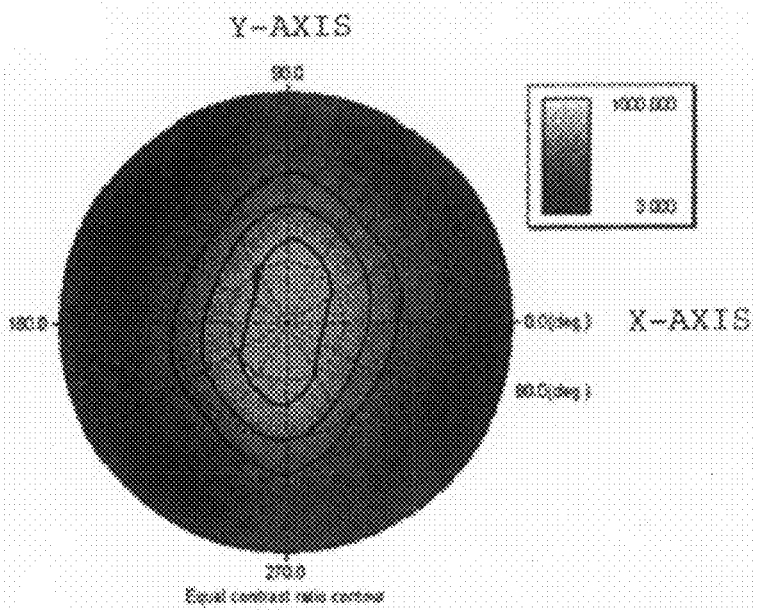
FIG. 30 is an equal contrast ratio diagram showing the results of evaluating the viewing angle characteristics in the reflective display region of the liquid crystal display device according to Typical Structure Example 17.

As shown in FIG. 29, in the viewing angle characteristics of the transmissive display region in Typical Structure Example 17, the regions in which the contrast ratio is 300, 200, 100, 50, and 10 or higher are wider, and the contrast is enhanced overall in relation to Comparative Structure Example 5 (FIG. 31). The viewing angle characteristics of the transmissive display are also enhanced in Embodiment 7 of the present invention by the same combination of in-plane retardation plates as in Embodiment 1 of the present invention.

The effect of the present invention will next be compared in terms of the sum of the retardations in the thickness direction. First, the sum of the retardations in the thickness direction of the in-plane retardation plates for two polarizers is designated as S1. The designation S2 is for the sum of the retardations in the thickness direction of the constituent members for two polarizers during black display in the liquid crystal display device.

Using Typical Structure Example 1 as an example, S1 is the sum of the Rth of the λ/2 plate 5 in which Rth>0, the λ/4 plate 6 in which Rth<0, the λ/4 plate 4 in which Rth>0, and the λ/2 plate 3 in which Rth<0. The sum S2 is the sum of the Rth of the λ/2 plate 5 in which Rth>0, the λ/4 plate 6 in which Rth<0, the liquid crystal layer compensating plate 8, the liquid crystal layer 9a, the liquid crystal layer compensating plate 7, the λ/4 plate 4 in which Rth>0, and the λ/2 plate 3 in which Rth<0.

The S1 and S2 for Typical Structure Examples 1 through 17 are shown in Table 31. The viewing angle characteristics of the transmissive display region are compared with those of Comparative Structure Examples 1 through 5, in which the same number of in-plane retardation plates were used.

TABLE 31

| conditions | | number of in-plane retardation plates | S1 (nm) | S2 (nm) | transmissive viewing angle characteristics |
|---|---|---|---|---|---|
| Typical Structure Example | 1 | 2 | 0.0 | 0.0 | Enhanced relative to Comparative Structure Example 1 |
| | 2 | 2 | 0.0 | 0.0 | |
| | 3 | 2 | 0.0 | 0.0 | |
| | 4 | 2 | 0.0 | 0.0 | |
| | 5 | 2 | 0.0 | 0.0 | |
| | 6 | 2 | 0.0 | 0.0 | |
| | 7 | 2 | 0.0 | 0.0 | |
| | 8 | 2 | 0.0 | 0.0 | |
| | 9 | 2 | 275.0 | 275.0 | |
| | 10 | 2 | 0.0 | 0.0 | |
| | 11 | 2 | 0.0 | 0.0 | |
| | 12 | 3 | 0.0 | 0.0 | enhanced relative to Comparative Structure Example 3 |
| | 13 | 3 | 0.0 | 0.0 | |
| | 14 | 3 | 0.0 | 0.0 | |
| | 15 | 3 | 0.0 | 0.0 | |
| | 16 | 1 | 0.0 | 0.0 | enhanced relative to Comparative Structure Example 4 |
| | 17 | 2 | 0.0 | 14.2 | enhanced relative to Comparative Structure Example 5 |
| Comparative Example | 1 | 2 | 413.0 | 413.0 | standard for comparison |
| | 3 | 3 | 688.0 | 688.0 | |
| | 4 | 1 | 138.0 | 138.0 | |
| | 5 | 2 | 413.0 | 259.5 | |

As shown in Table 31, when S1 was 0.0 and 0.5 for both modes that include the horizontal alignment mode (Typical Structure Examples 1 through 16) and the vertical alignment mode (Typical Structure Example 17), the transmissive viewing angle characteristics were enhanced relative to the Comparative Structure Examples. In the horizontal alignment mode, the transmissive viewing angle characteristics were enhanced relative to the Comparative Structure Examples when S2 was 0.0 and 0.5.

Figure 33:
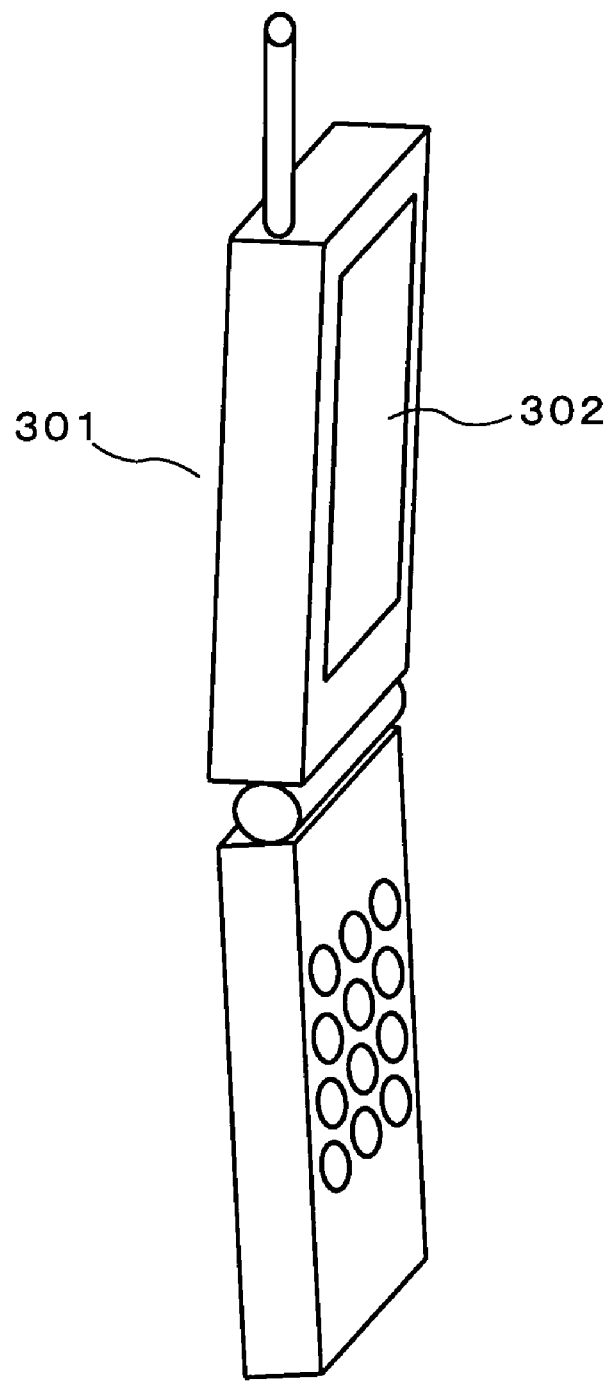
FIG. 33 is a perspective view showing the terminal device in which the liquid crystal display device according to Embodiment 8 is mounted.

FIG. 33 is a perspective view showing a mobile terminal device in which the liquid crystal display device according to Embodiment 8 of the present invention is mounted. As shown in FIG. 33, the liquid crystal display device 302 of the present invention is mounted in a mobile telephone 301, for example. The mobile terminal device is not limited to a mobile telephone, and the present invention may also be applied to PDAs (Personal Digital Assistant), gaming devices, digital cameras, digital video cameras, and various other types of mobile terminal devices. The present invention is also not limited to mobile terminal devices, and may also be applied to notebook personal computers, cash dispensers, automatic vending machines, and various other types of terminal devices.

The present invention can be suitably used in the display devices of mobile telephones, PDAs, gaming devices, digital cameras, video cameras, video players, and other mobile terminal devices; and the display devices of notebook personal computers, cash dispensers, automatic vending machines, and other terminal devices.

What is claimed is:

1. A liquid crystal display device, comprising:
a liquid crystal cell in which a liquid crystal layer is provided between a pair of substrates; and
a circular polarizer provided to each substrate of the liquid crystal cell, each of said circular polarizers having
a plurality of in-plane retardation plates having a retardation Re>0 in an in-plane direction when the retardation Re of an in-plane direction is (nx−ny)×d, and a retardation Rth in a thickness direction is ((nx+ny)/2−nz)×d (wherein nx is a refractive index in a direction in which a maximum refractive index occurs in a plane, ny is a refractive index in an in-plane direction orthogonal to the direction in which the maximum refractive index occurs, nz is a refractive index in a thickness direction, and d is a thickness), and
a polarizer disposed on an opposite side of said liquid crystal layer from said in-plane retardation plates,
wherein, in each of said circular polarizers, at least one of said in-plane retardation plates has a slow axis not perpendicular to an absorption axis of said polarizer,
wherein a first pair of said in-plane retardation plates is formed by i) a first one of the plurality of said in-plane retardation plates in a first of said circular polarizers, and ii) a second one of the plurality of said in-plane retardation plates in a second of said circular polarizers, said first of said circular polarizers being disposed on a first side of the liquid crystal cell and said second of said circular polarizers being disposed on a second side of the liquid crystal cell opposite the first side of the liquid crystal cell, a first of said first pair of said in-plane retardation plates configured such that Rth>0, and a second of said first pair of said in-plane retardation plates configured such that Rth<0,
wherein a second pair of said in-plane retardation plates is formed by i) a third one of the plurality of said in-plane retardation plates in the first of said circular polarizers, and ii) a fourth one of the plurality of said in-plane retardation plates in the second of said circular polarizers, a first of said second pair of said in-plane retardation plates configured such that Rth>0, and a second of said second pair of said in-plane retardation plates configured such that Rth<0,
wherein said first pair of said in-plane retardation plates is closer to the liquid crystal cell than the second pair of said in-plane retardation plates,
wherein said in-plane retardation plates in which Rth>0 and said in-plane retardation plates in which Rth<0 constitute a plurality of said pairs of in-plane retardation plates, and said in-plane retardation plates of each of said pairs of in-plane retardation plates are configured to compensate for each other, and
wherein a sum of Rth of the in-plane retardation plates, that constitute said circular polarizers and are disposed in between said polarizers, is 0.

2. The liquid crystal display device according to claim 1, wherein each of said polarizers has a protective film on said in-plane retardation plates, and a sum of the sum of Rth of the in-plane retardation plates that constitute said circular polarizers in between said polarizers, and a retardation in a thickness direction of said protective film is 0.

3. The liquid crystal display device according to claim 1, wherein at least one of the circular polarizers has an in-plane retardation plate besides said in-plane retardation plates that is disposed between said polarizer and said in-plane retardation plates so that a slow axis of the other in-plane retardation plate is perpendicular or parallel to an absorption axis of said polarizer.

4. The liquid crystal display device according to claim 1, wherein a sum of the retardation between two of said polarizers in a thickness direction of the liquid crystal device is 0 during black display in said liquid crystal display device.

5. The liquid crystal display device according to claim 1, further comprising:
at least one liquid crystal layer compensating plate for optically compensating for said liquid crystal layer, disposed between at least one of said circular polarizers and said liquid crystal cell.

6. The liquid crystal display device according to claim 1, wherein said liquid crystal layer is a liquid crystal layer that is vertically aligned during black display.

7. The liquid crystal display device according to claim 5, wherein
said liquid crystal cell has a reflective display region and a transmissive display region;
said liquid crystal layer has a retardation in an in-plane direction parallel to a display surface; and
at least the liquid crystal layer of said transmissive display region is driven by a lateral field.

8. The liquid crystal display device according to claim 7, wherein
said at least one liquid crystal layer compensating plate comprises a first liquid crystal layer compensating plate provided between said liquid crystal layer and one of said two circular polarizers and a second liquid crystal layer compensating plate provided between said liquid crystal layer and the other of said two circular polarizers;
one liquid crystal layer compensating plate of two of said liquid crystal layer compensating plates reduces a retardation in an in-plane direction of the liquid crystal layer in said reflective display region; and
two of said liquid crystal layer compensating plates reduce a retardation in an in-plane direction of the liquid crystal layer in said transmissive display region.

9. The liquid crystal display device according to claim 8, wherein one liquid crystal layer compensating plate of two of said liquid crystal layer compensating plates reduces a retardation in a thickness direction of the liquid crystal layer in said reflective display region; and
two of said liquid crystal layer compensating plates reduce a retardation in a thickness direction of the liquid crystal layer in said transmissive display region.

10. The liquid crystal display device according to claim 7, wherein said liquid crystal layer compensating plate is provided only between said liquid crystal layer and one of said two circular polarizers, and the single liquid crystal layer compensating plate reduces a retardation in an in-plane direction of the liquid crystal layer in said reflective display region, and a retardation in an in-plane direction of the liquid crystal layer in said transmissive display region.

11. The liquid crystal display device according to claim 10, wherein said liquid crystal layer compensating plate reduces a retardation in a thickness direction of the liquid crystal layer in said reflective display region, and a retardation in a thickness direction of the liquid crystal layer in said transmissive display region.

12. The liquid crystal display device according to claim 8, wherein said liquid crystal layer compensating plates have a retardation in an in-plane direction, and the retardation in the thickness direction is negative.

13. The liquid crystal display device according to claim 8, wherein said liquid crystal layer compensating plates are set to a value so as to cancel out and render isotropic the retardation in the in-plane direction of the liquid crystal layer in said transmissive display region.

14. The liquid crystal display device according to claim 8, wherein said liquid crystal layer compensating plates are set to a value so as to cancel out and render isotropic the retardation in the in-plane direction of the liquid crystal layer in said reflective display region.

15. The liquid crystal display device according to claim 5, wherein a wavelength dependency of an in-plane birefringence of said liquid crystal layer compensating plate increases in monotonic fashion with respect to an increase in wavelength.

16. A terminal device in which the liquid crystal display device according to claim 1 is mounted.

17. A liquid crystal display device, comprising:
an upper substrate;
a lower substrate;
a liquid crystal layer between said upper and lower substrates;
an upper circular polarizer beneath the upper substrate and above a first side of the liquid crystal layer, the upper circular polarizer having an upper pair of in-plane retardation plates and an upper polarizer, the upper pair of in-plane retardation plates being interposed between the upper polarizer and the liquid crystal layer, at least one of said upper pair of in-plane retardation plates having a slow axis not perpendicular to an absorption axis of the upper circular polarizer;
a lower circular polarizer above the lower substrate and beneath a second side of the liquid crystal layer, the lower circular polarizer having a lower pair of in-plane retardation plates and a lower polarizer, the lower pair of in-plane retardation plates being interposed between the lower polarizer and the liquid crystal layer, at least one of said lower pair of in-plane retardation plates having a slow axis not perpendicular to an absorption axis of the lower circular polarizer,
wherein each of the upper and lower pairs of in-plane retardation plates has a retardation Re>0 in an in-plane direction when the retardation Re of an in-plane direction is
$(nx-ny) \times d$
and a retardation Rth in a thickness direction is
$((nx+ny)/2nz) \times d)$
nx being a refractive index in a direction in which a maximum refractive index occurs in a plane,
ny being a refractive index in an in-plane direction orthogonal to the direction in which the maximum refractive index occurs, and
nz being a refractive index in a thickness direction, and d is a thickness,
wherein a first of the upper pair of in-plane retardation plates is configured such that Rth<0, and a second of the upper pair of in-plane retardation plates is configured such that Rth>0,
wherein a first of the lower pair of in-plane retardation plates is configured such that Rth>0, and a second of the lower pair of in-plane retardation plates is configured such that Rth<0,
wherein said first of the upper pair of in-plane retardation plates is between said second of the upper pair of in-plane retardation plates and said liquid crystal layer,
wherein said first of the lower pair of in-plane retardation plates is between said second of the lower pair of in-plane retardation plates and said liquid crystal layer,
wherein said first of the upper pair of in-plane retardation plates is configured to compensate for said first of the lower pair of in-plane retardation plates, and said second of the upper pair of in-plane retardation plates is configured to compensate for said second of the lower pair of in-plane retardation plates, and
wherein a sum of Rth of the in-plane retardation plates, that constitute said circular polarizers and are disposed in between said polarizers, is 0.

18. The liquid crystal display device according to claim 17, wherein an Rth value of said first of the upper pair of in-plane retardation plates and an Rth value of said first of the lower pair of in-plane retardation plates sum to zero, and
wherein an Rth value of said second of the upper pair of in-plane retardation plates and an Rth value of said second of the lower pair of in-plane retardation plates sum to zero.

19. The liquid crystal display device according to claim 17, further comprising:
first and second liquid crystal layer compensating plates configured to optically compensating for said liquid crystal layer, the first liquid crystal layer compensating plate disposed above the first side of the liquid crystal layer, and the second liquid crystal layer compensating plate disposed beneath the second side of the liquid crystal layer.

20. The liquid crystal display device according to claim 1, wherein each of the circular polarizers has two of said in-plane retardation plates, and
wherein said in-plane retardation plates are provided in an order of said in-plane retardation plate in which Rth>0, said in-plane retardation plate in which Rth<0, said in-plane retardation plate in which Rth>0, and said in-plane retardation plate in which Rth<0, as viewed from a display side.

21. The liquid crystal display device according to claim 1, wherein each of the circular polarizers has two of said in-plane retardation plates, and
wherein said in-plane retardation plates are provided in an order of said in-plane retardation plate in which Rth<0, said in-plane retardation plate in which Rth>0, said in-plane retardation plate in which Rth<0, and said in-plane retardation plate in which Rth>0, as viewed from a display side.

22. The liquid crystal display device according to claim 1, wherein each of the circular polarizers has two of said in-plane retardation plates, and
wherein said in-plane retardation plates are provided in an order of said in-plane retardation plate in which Rth>0, said in-plane retardation plate in which Rth>0, said in-plane retardation plate in which Rth<0, and said in-plane retardation plate in which Rth<0, as viewed from a display side.

23. The liquid crystal display device according to claim 1, wherein each of the circular polarizers has two of said in-plane retardation plates, and
wherein said in-plane retardation plates are provided in an order of said in-plane retardation plate in which Rth<0, said in-plane retardation plate in which Rth<0, said in-plane retardation plate in which Rth>0, and said in-plane retardation plate in which Rth>0, as viewed from a display side.

* * * * *